(12) United States Patent
Ma et al.

(10) Patent No.: US 11,640,721 B2
(45) Date of Patent: May 2, 2023

(54) OBJECT DETECTION AND IMAGE CROPPING USING A MULTI-DETECTOR APPROACH

(71) Applicant: Kofax, Inc., Irvine, CA (US)

(72) Inventors: Jiyong Ma, San Diego, CA (US); Stephen M. Thompson, Oceanside, CA (US); Jan W. Amtrup, Silver Spring, MD (US)

(73) Assignee: KOFAX, INC., Irvine, CA (US)

( * ) Notice: Subject to any disclaimer, the term of this patent is extended or adjusted under 35 U.S.C. 154(b) by 237 days.

(21) Appl. No.: 17/006,650

(22) Filed: Aug. 28, 2020

(65) Prior Publication Data

US 2020/0394453 A1    Dec. 17, 2020

Related U.S. Application Data

(63) Continuation of application No. 16/206,926, filed on Nov. 30, 2018, now Pat. No. 10,803,350.

(Continued)

(51) Int. Cl.
*G06K 9/62*     (2022.01)
*G06T 7/90*     (2017.01)
(Continued)

(52) U.S. Cl.
CPC ......... *G06K 9/6227* (2013.01); *G06K 9/6262* (2013.01); *G06N 7/00* (2013.01);
(Continued)

(58) Field of Classification Search
CPC .... G06V 10/993; G06V 10/462; F06V 10/56; G06T 2207/10024; G06T 2207/60144; G06T 7/11; G06T 7/136
See application file for complete search history.

(56) References Cited

U.S. PATENT DOCUMENTS 5,572,654 A    11/1996   Coelho
6,246,804 B1 *   6/2001   Sato ........................ G06F 16/56
                                                                          382/284

(Continued)

FOREIGN PATENT DOCUMENTS

WO           0165486 A1     9/2001
WO      2017173368 A1    10/2017

OTHER PUBLICATIONS

Notice of Allowance from U.S. Appl. No. 16/569,247, dated Aug. 31, 2021.

(Continued)

*Primary Examiner* — Yosef Kassa
(74) *Attorney, Agent, or Firm* — Zilka-Kotab, P.C.

(57) ABSTRACT

According to an exemplary embodiment, a method for pre-cropping digital image data includes: dividing the digital image into segments; computing a color value distance between corresponding pixels of neighboring segments of the digital image; comparing the color value distance(s) against a minimum color distance threshold; clustering neighboring segments having a color value distance less than or equal to the minimum color distance threshold; computing a connected structure based on the clustered segments; computing a polygon bounding the connected structure; comparing a fraction of segments included in the connected structure and the polygon, relative to a total number of segments in the digital image, to a minimum included segment threshold; and in response to determining the fraction of segments in the connected structure and the polygon, relative to the total number of segments meets or exceeds a minimum included segment threshold, cropping the digital image based on edges of the polygon.

20 Claims, 15 Drawing Sheets

Related U.S. Application Data

(60) Provisional application No. 62/593,180, filed on Nov. 30, 2017.

(51) Int. Cl.

| | | |
|---|---|---|
| *G06T 7/13* | (2017.01) | |
| *G06T 7/194* | (2017.01) | |
| *G06T 7/70* | (2017.01) | |
| *G06T 7/12* | (2017.01) | |
| *G06V 10/44* | (2022.01) | |
| *G06V 20/40* | (2022.01) | |
| *G06T 7/11* | (2017.01) | |
| *G06N 20/00* | (2019.01) | |
| *G06N 7/00* | (2006.01) | |
| *G06T 7/00* | (2017.01) | |
| *G06V 10/28* | (2022.01) | |

(52) U.S. Cl.
CPC .......... *G06N 20/00* (2019.01); *G06T 7/0002* (2013.01); *G06T 7/11* (2017.01); *G06T 7/12* (2017.01); *G06T 7/13* (2017.01); *G06T 7/194* (2017.01); *G06T 7/70* (2017.01); *G06T 7/90* (2017.01); *G06V 10/44* (2022.01); *G06V 20/40* (2022.01); *G06T 2207/10016* (2013.01); *G06T 2207/10024* (2013.01); *G06T 2207/20081* (2013.01); *G06T 2207/30176* (2013.01); *G06V 10/28* (2022.01)

(56) References Cited

U.S. PATENT DOCUMENTS

| | | | | |
|---|---|---|---|---|
| 6,611,613 | B1* | 8/2003 | Kang | G06V 40/161 |
| | | | | 382/209 |
| 6,922,485 | B2* | 7/2005 | Hirata | G06V 10/56 |
| | | | | 382/164 |
| 6,990,233 | B2* | 1/2006 | Park | G06V 10/7515 |
| | | | | 382/209 |
| 7,035,477 | B2* | 4/2006 | Cheatle | G06T 7/44 |
| | | | | 382/282 |
| 7,043,385 | B2 | 5/2006 | Stokes | |
| 7,119,924 | B2 | 10/2006 | Prabhakar et al. | |
| 7,133,571 | B2* | 11/2006 | Cheatle | H04N 1/3872 |
| | | | | 382/173 |
| 7,274,470 | B2* | 9/2007 | Lemelin | G06T 7/521 |
| | | | | 356/604 |
| 7,502,521 | B2* | 3/2009 | Sun | G06T 5/005 |
| | | | | 382/254 |
| 7,596,265 | B2* | 9/2009 | Fan | G06V 10/28 |
| | | | | 382/164 |
| 7,945,573 | B1 | 5/2011 | Barnes et al. | |
| 8,027,070 | B2 | 9/2011 | Dalrymple | |
| 8,135,261 | B1 | 3/2012 | Black | |
| 8,275,190 | B2 | 9/2012 | Sakai et al. | |
| 8,644,600 | B2 | 2/2014 | Yang et al. | |
| 8,872,979 | B2* | 10/2014 | Bagga | G06F 16/785 |
| | | | | 382/229 |
| 8,897,565 | B1 | 11/2014 | Palm et al. | |
| 9,049,407 | B2 | 6/2015 | Finlayson | |
| 9,152,860 | B2 | 10/2015 | Cervin et al. | |
| 9,177,225 | B1 | 11/2015 | Cordova-Diba et al. | |
| 9,224,070 | B1 | 12/2015 | Sundareswara et al. | |
| 9,672,510 | B2 | 6/2017 | Roach et al. | |
| 10,331,966 | B1 | 6/2019 | Pribble et al. | |
| 10,783,613 | B2 | 9/2020 | Ma et al. | |
| 10,783,615 | B2 | 9/2020 | Ma et al. | |
| 11,062,163 | B2 | 7/2021 | Thrasher et al. | |
| 11,062,176 | B2 | 7/2021 | Ma et al. | |
| 11,087,407 | B2 | 8/2021 | Macciola et al. | |
| 11,302,109 | B2 | 4/2022 | Shustorovich et al. | |
| 11,321,772 | B2 | 5/2022 | Amtrup et al. | |
| 11,481,878 | B2 | 10/2022 | Ma et al. | |
| 11,593,585 | B2 | 2/2023 | Ma et al. | |
| 2003/0031461 | A1 | 2/2003 | Takayama | |
| 2003/0220875 | A1 | 11/2003 | Lam et al. | |
| 2004/0202349 | A1 | 10/2004 | Erol et al. | |
| 2005/0175243 | A1 | 8/2005 | Luo et al. | |
| 2006/0017959 | A1 | 1/2006 | Downer et al. | |
| 2006/0029276 | A1 | 2/2006 | Nagahashi et al. | |
| 2006/0043264 | A1 | 3/2006 | Sakurai | |
| 2007/0058856 | A1 | 3/2007 | Boregowda et al. | |
| 2007/0204001 | A1 | 8/2007 | Hoopes et al. | |
| 2008/0163103 | A1 | 7/2008 | Reponen et al. | |
| 2008/0177764 | A1 | 7/2008 | Kise et al. | |
| 2008/0226196 | A1 | 9/2008 | Kojima | |
| 2008/0278599 | A1 | 11/2008 | Shiohara | |
| 2009/0262200 | A1 | 10/2009 | Takabatake et al. | |
| 2011/0175984 | A1 | 7/2011 | Tolstaya et al. | |
| 2011/0212717 | A1 | 9/2011 | Rhoads et al. | |
| 2011/0240740 | A1 | 10/2011 | Li et al. | |
| 2012/0011142 | A1 | 1/2012 | Baheti et al. | |
| 2012/0185530 | A1 | 7/2012 | Reza | |
| 2012/0281077 | A1 | 11/2012 | Morales et al. | |
| 2013/0004017 | A1 | 1/2013 | Medasani et al. | |
| 2013/0051671 | A1 | 2/2013 | Barton | |
| 2013/0129248 | A1 | 5/2013 | Doublet et al. | |
| 2013/0155474 | A1 | 6/2013 | Roach et al. | |
| 2014/0086488 | A1 | 3/2014 | Moteki et al. | |
| 2014/0204204 | A1 | 7/2014 | Sumiyoshi et al. | |
| 2015/0371086 | A1 | 12/2015 | Wang et al. | |
| 2016/0182805 | A1 | 6/2016 | Emmett et al. | |
| 2017/0238011 | A1 | 8/2017 | Peiiersson et al. | |
| 2017/0372156 | A1 | 12/2017 | Kalenkov et al. | |
| 2018/0131815 | A1 | 5/2018 | Spivakovsky et al. | |
| 2019/0258895 | A1 | 8/2019 | Sacheti et al. | |
| 2019/0377970 | A1 | 12/2019 | Huber, Jr. et al. | |
| 2020/0380643 | A1 | 12/2020 | Ma et al. | |
| 2020/0394452 | A1 | 12/2020 | Ma et al. | |
| 2020/0394763 | A1 | 12/2020 | Ma et al. | |
| 2021/0027431 | A1 | 1/2021 | Ma et al. | |
| 2021/0383150 | A1 | 12/2021 | Thrasher et al. | |
| 2021/0383163 | A1 | 12/2021 | Ma et al. | |

OTHER PUBLICATIONS

Patent Board Decision on Appeal from U.S. Appl. No. 15/396,306, dated Oct. 29, 2021.
Non-Final Office Action from U.S. Appl. No. 16/997,800, filed Nov. 9, 2021.
Kim et al., "Document Capturing Method with a Camera using Robust Feature Points Detection," International Conference on Digital Image Computing: Techniques and Applications, IEEE, 2011, pp. 678-682.
Bulatov et al., "Smart IDReader: Document Recognition in Video Stream," 14th IAPR International Conference on Document Analysis and Recognition, 2017, pp. 39-44.
Liang et al., "Camera-based analysis of text and documents: a survey," Digital Object Identifier, International Journal on Document Analysis and Recognition, 2005, pp. 84-104.
Non-Final Office Action from U.S. Appl. No. 15/394,731, dated Aug. 16, 2021.
Phillips, P., "Support Vector Machines Applied to Face Recognition," Advances in Neural Information Processing Systems, 1998, pp. 803-809, retrieved from https://papers.nips.cc/paper/1998/file/a2cc63e065705fe938a4dda49092966f-Paper.pdf.
Kung et al., "Biometric Authentication: A Machine Learning Approach," Matlab Projects, Chapter 1, 2004, 13 pages.
Zhao et al., "Face recognition: A literature survey," ACM Computing Surveys, vol. 35, No. 4, Dec. 2003, pp. 399-458.
Turk et al., "Face Recognition Using Eigenfaces," IEEE Computer Society Conference on Computer Vision and Pattern Recognition, 1991, pp. 586-591.
Joachims, T., "Transductive Inference for Text Classification Using Support Vector Machines," International Conference on Machine Learning, 1999, 10 pages, retrieved from https://www.cs.cornell.edu/people/tj/publications/joachims_99c.pdf.
Supplemental Notice of Allowance from U.S. Appl. No. 16/824,518, dated Jul. 15, 2021.

(56) References Cited

OTHER PUBLICATIONS

Notice of Allowance from U.S. Appl. No. 16/267,205, dated Oct. 15, 2020.
Non-Final Office Action from U.S. Appl. No. 16/569,247, dated Oct. 29, 2020.
Notice of Allowance from U.S. Appl. No. 16/569,247, dated Dec. 10, 2021.
Notice of Allowance from U.S. Appl. No. 15/394,731, dated Dec. 27, 2021.
Supplemental Notice of Allowance from U.S. Appl. No. 16/206,912, dated May 28, 2021.
Notice of Allowance from U.S. Appl. No. 16/824,518, dated Jun. 1, 2021.
Supplemental Notice of Allowance from U.S. Appl. No. 16/267,205, dated Jun. 9, 2021.
Thrasher et al., U.S. Appl. No. 17/348,584, filed Jun. 15, 2021.
Ma et al., U.S. Appl. No. 17/348,617, filed Jun. 15, 2021.
Supplemental Notice of Allowance from U.S. Appl. No. 15/394,731, dated Mar. 30, 2022.
Final Office Action from U.S. Appl. No. 16/997,800, dated Apr. 11, 2022.
Corrected Notice of Allowance from U.S. Appl. No. 16/569,247, dated Mar. 16, 2022.
Examination Report from European Application No. 10741580.4, dated Feb. 28, 2022.
Notice of Allowance from U.S. Appl. No. 16/206,912, dated Nov. 16, 2020.
Final Office Action from U.S. Appl. No. 15/394,731, dated Dec. 21, 2020.
Examination Report from European Application No. 20194730.6, dated Dec. 11, 2020.
Final Office Action from U.S. Appl. No. 16/824,518, dated Feb. 23, 2021.
Non-Final Office Action from U.S. Appl. No. 15/396,306, dated Feb. 18, 2022.
Notice of Allowance from U.S. Appl. No. 16/997,800, dated Jun. 27, 2022.
Non-Final Office Action from U.S. Appl. No. 17/006,636, dated Aug. 4, 2022.
Non-Final Office Action from U.S. Appl. No. 16/824,518, dated Sep. 3, 2020.
Corrected Notice of Allowance from U.S. Appl. No. 16/151,090, dated Aug. 28, 2020.
Corrected Notice of Allowance from U.S. Appl. No. 16/194,201, dated Aug. 28, 2020.
Ma et al., U.S. Appl. No. 17/005,147, filed Aug. 27, 2020.
Ma et al., U.S. Appl. No. 17/005,171, filed Aug. 27, 2020.
Ma et al., U.S. Appl. No. 17/006,636, filed Aug. 28, 2020.
Notice of Allowance from U.S. Appl. No. 16/206,912, dated Mar. 8, 2021.
Supplemental Notice of Allowance from U.S. Appl. No. 16/206,912, dated Mar. 17, 2021.
Notice of Allowance from U.S. Appl. No. 16/267,205, dated Mar. 12, 2021.
Non-Final Office Action from U.S. Appl. No. 16/569,247, dated May 12, 2021.
Notice of Allowance from U.S. Appl. No. 16/997,800, dated Sep. 7, 2022.
Wagner et al., "Pose Tracking from Natural Features on Mobile Phones," IEEE International Symposium on Mixed and Augmented Reality, Sep. 2008, pp. 125-134.
Dubrofsky, E., "Homography Estimation," University of British Columbia, Mar. 2009, 32 pages.
Non-Final Office Action from U.S. Appl. No. 17/348,617, dated Sep. 21, 2022.
Non-Final Office Action from U.S. Appl. No. 17/005,147, dated Sep. 9, 2022.
Examination Report from European Application No. 14 861 942.2, dated Jul. 15, 2022.
Non-Final Office Action from U.S. Appl. No. 17/005,171, dated Oct. 21, 2022.
Final Office Action from U.S. Appl. No. 15/396,306, dated Oct. 28, 2022.
Notice of Allowance from U.S. Appl. No. 17/006,636, dated Nov. 15, 2022.
Supplemental Notice of Allowance from U.S. Appl. No. 17/006,636, dated Nov. 25, 2022.
Restriction Requirement from U.S. Appl. No. 17/348,584, dated Nov. 18, 2022.
Notice of Allowance from U.S. Appl. No. 17/348,617, dated Jan. 18, 2023.
Notice of Allowance from U.S. Appl. No. 17/005,147, dated Jan. 25, 2023.
Corrected Notice of Allowance from U.S. Appl. No. 17/005,147, dated Mar. 2, 2023.

\* cited by examiner

OBJECT DETECTION AND IMAGE CROPPING USING A MULTI-DETECTOR APPROACH

FIELD OF INVENTION

The present invention relates to image capture and image processing. In particular, the present invention relates to capturing and processing digital images using a mobile device, with special emphasis on detecting objects such as documents within the image and cropping the image so as to remove background and/or other objects therefrom.

RELATED APPLICATIONS

This application is related to U.S. Pat. No. 9,779,296, granted Oct. 3, 2017 and entitled "Content-Based Detection And Three Dimensional Geometric Reconstruction Of Objects In Image And Video Data."; U.S. Pat. No. 9,760,788, granted Sep. 12, 2017 and entitled "Mobile Document Detection And Orientation Based On Reference Object Characteristics"; U.S. Pat. No. 9,355,312, granted May 31, 2016 and entitled "Systems And Methods For Classifying Objects In Digital Images Captured Using Mobile Devices"; U.S. Pat. No. 9,208,536, granted Dec. 8, 2015 and entitled "Systems And Methods For Three Dimensional Geometric Reconstruction Of Captured Image Data;" and U.S. Pat. No. 8,855,375, granted Oct. 7, 2014 and entitled "Systems and Methods for Mobile Image Capture and Processing"; each of which is herein incorporated by reference in its entirety.

BACKGROUND OF THE INVENTION

As imaging technology improves and promulgates, an increasing number of applications and contexts are being explored to expand and improve upon accomplishments achieved to-date. In the particular context of object detection, and the related determination and/or extraction of information relating to recognized objects, significant work performed to-date affords a plethora of conventional approaches generally capable of performing desired detection and extraction. However, these conventional approaches generally rely on highly tuned image quality and environmental control in order to function properly.

Of course, in all circumstances it is ideal for capture conditions to be optimal for the particular purpose to which the captured image will be applied. Images should be free of blur and distortions, the image should depict the entire object and ideally the object should comprise a significant portion (e.g. at least 50%) of the total area of the captured image. Illumination should be well-balanced so as to clearly depict various features (e.g. different colors, textures, connected components, boundaries, edges, etc.) present in the image foreground and/or background, without over or undersaturating the image and losing associated detail useful for distinguishing the object from the background and/or individual features of the object. The image should be captured with sufficient resolution and color depth so as to allow facile identification of individual features.

Conventional flat-bed scanners, multifunction printer (MFP) devices, and the like advantageously yield images with high resolution, and typically lack distortions associated with conventional cameras and similar optical sensors (particularly perspective distortion arising from orientation of the camera relative to the capture object, and warping or "fishbowl" type effects inherent to images captured with conventional cameras). Images captured using conventional flat-bed scanners, MFPs, etc. also generally exhibit a simple background with known characteristics (e.g. a pure white background) that facilitates distinguishing the background from the object (or foreground) depicted in the image.

However, images captured using flat-bed scanners, MFPs, etc. tend to exhibit oversaturation, which can make detecting the edges of objects (or equivalently, transition from the image background to the object or image foreground) difficult or impossible. Similarly, smaller objects such as identification cards, credit cards, business cards, receipts, etc. may represent only a relatively small portion (e.g. about 20% or less) of the total image area, and/or may be located in an unexpected position and/or orientation within the image. The relatively small size causes difficulty in object detection, since there is relatively less information available for use in determining characteristics of the foreground and distinguishing the same from the background. Unknown/unexpected orientation and position can similarly frustrate the process of determining background and foreground characteristics, for instance because it can be difficult to sample characteristics from a predetermined region with confidence the characteristics truly correspond only to the background or foreground/object.

Images captured using cameras, especially cameras or similar optical sensors included in mobile devices such as smartphones, tablets, personal digital assistants, drones, and the like exhibit a different set of advantages and challenges with respect to object detection and image cropping. For instance, cameras may advantageously capture a plurality of images of an object in rapid sequence (e.g. using a video capture functionality) which increases the amount of information available about both the object and the image background. However, as noted above images captured using cameras and the like are characterized by inherent distortion and/or warping. Moreover, in general the capture conditions surrounding use of a camera are more variable and less capable of control than corresponding conditions when capturing image data using a flat-bed scanner, MFP, or the like. Lighting conditions, camera motion and/or relative position to the object, and presence of complex backgrounds are particularly challenging aspects of capturing image data using a camera and which frustrate or even defeat the ability to perform desired processing of the captured image data, e.g. object detection and accurate cropping.

Accordingly, it would be beneficial to provide new and improved techniques for detecting objects within image data and cropping such images, in a manner that can account for undesirable artifacts including but not limited to: glare, perspective distortion, image warping, low contrast between image foreground and background (e.g. due to oversaturation), relatively low total area of the image foreground, undesirable location/orientation of an object within the image, presence of complex background and/or foreground, and any combination thereof. It would be even more beneficial to provide techniques capable of addressing challenges that arise in the context of scanned images as well as artifacts that arise in the context of camera-captured images, so as to enable processing thereof in accordance with a single overarching protocol that can accurately and precisely identify objects and crop images in a reproducible manner, regardless of the source of the input image data.

SUMMARY

According to one embodiment, a computer-implemented method for pre-cropping digital image data to remove background from the digital image data includes: dividing the digital image into a plurality of segments; computing a color value distance between corresponding pixels of one or more pairs of neighboring segments of the digital image; comparing the color value distance computed for some or all of the pairs of neighboring segments against a minimum color distance threshold; clustering all pairs of neighboring segments having a color value distance less than or equal to the minimum color distance threshold; computing a connected structure based on a shape of the clustered segments; computing a polygon bounding the connected structure; comparing a fraction of segments included in both the connected structure and the polygon, relative to a total number of segments in the digital image, to a minimum included segment threshold; and in response to determining the fraction of segments included in both the connected structure and the polygon, relative to the total number of segments in the digital image meets or exceeds a minimum included segment threshold, cropping the digital image based on edges of the polygon.

Other aspects and embodiments of the present invention will become apparent from the following detailed description, which, when taken in conjunction with the drawings, illustrate by way of example the principles of the invention.

BRIEF DESCRIPTION OF THE DRAWINGS

In FIG. 3E, an object is depicted on a complex background having three different regions each with a unique color profile, according to one embodiment. In FIG. 3F, an object is depicted on a complex background including objects of a similar type as the object desired for detection, according to one embodiment. In FIG. 3G an object is depicted on a complex background having six different regions each with a unique color profile, according to one embodiment. In FIG. 3H, an object is depicted with portions thereof obscured by another object, and other portions thereof obscured by shadow, according to one embodiment.

DETAILED DESCRIPTION

Figure 1:
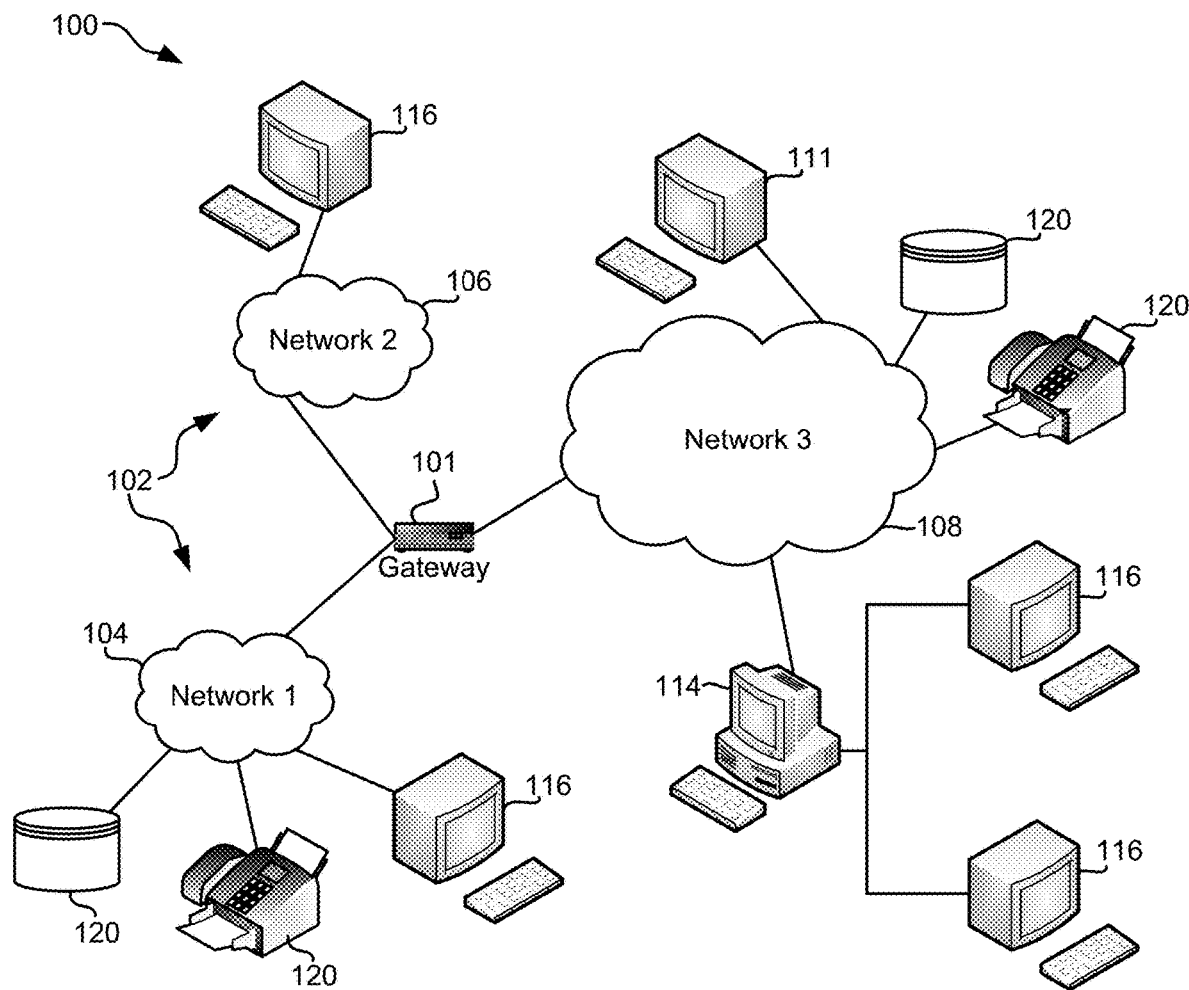
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As referred-to herein, it should be understood that the term "connected component" refers to any structure within an image, preferably a bitonal image that is formed from a contiguous set of adjacent pixels. For example connected components may include lines (e.g. part of a document's structure such as field boundaries in a form), graphical elements (e.g. photographs, logos, illustrations, unique markings, etc.), text (e.g. characters, symbols, handwriting, etc.) or any other feature depicted in a bitonal image. Accordingly, in one embodiment a connected component may be defined within a bitonal image according to the location of the various pixels from which the component is formed.

The term "image feature" is to be understood as inclusive of connected components, but also includes such components as may be defined within color spaces other than a bitonal image. Thus, an image feature includes any structure of an image that is formed from a contiguous set of adjacent pixels. The image feature may be defined according to the location of constituent pixels as noted above for connected components, but may also include other information such as intensity information (e.g. in one or more color channels). In various embodiments, "image features" may include any exemplary type or form as described in U.S. Pat. No. 9,779,296, granted Oct. 3, 2017 and entitled "Content-Based Detection And Three Dimensional Geometric Reconstruction Of Objects In Image And Video Data." In one particular embodiment, image features may comprise "boilerplate content" as defined in U.S. Pat. No. 9,779,296. In still more embodiments, image features may be or include "maximum stable regions" as known in in the art, e.g. https://en.wikipedia.org/wiki/Maximally stable extremal regions (last visited Nov. 20, 2017).

Image "foreground" should be understood as referring to an object of interest, e.g. an object subject to detection within the image data. Exemplary objects include documents, vehicles or parts thereof, persons, faces, or any other object capable of being described according to defining visual characteristics such as shape and color.

Conversely, image "background" as utilized herein refers to any non-foreground object, texture, scene, and combinations thereof. In other words, the background includes everything depicted in the image data other than the object of interest.

A "complex" background or foreground is to be understood as a portion of an image that exhibits/includes either: (1) significant variation in colors, textures, and/or objects; (2) features likely to generate false positive edge/boundary identification, such as straight lines arranged in a polygonal shape (such as a rectangle for a document depicted and/or forming part of an image background), curved lines arranged according to a particular object profile (including simple shapes such as a circle or sphere, or more complex arrangements such as a car, person, face, etc.); or (3) combinations thereof. Exemplary "complex backgrounds" include a scene, such as an environmental scene, social scene; a document such as a poster, magazine cover, photograph, form, sheet of lined or graph paper; textures such as wood grain, marble, carpet, fabric, etc.; patterns such as lines, grids, spirals, mosaics, zig-zags, or any equivalent thereof that would be appreciated by a person having ordinary skill in the art upon reading the present descriptions. Several exemplary embodiments of images having "complex backgrounds" are shown in FIGS. 3E-3H.

An "edge" or "border" of an object shall be understood as referring to a transition from image background to foreground, or equivalently from image background to the object of interest. Transitions from the object of interest/foreground to the background are also "edges" or "borders."

Figure 3A:
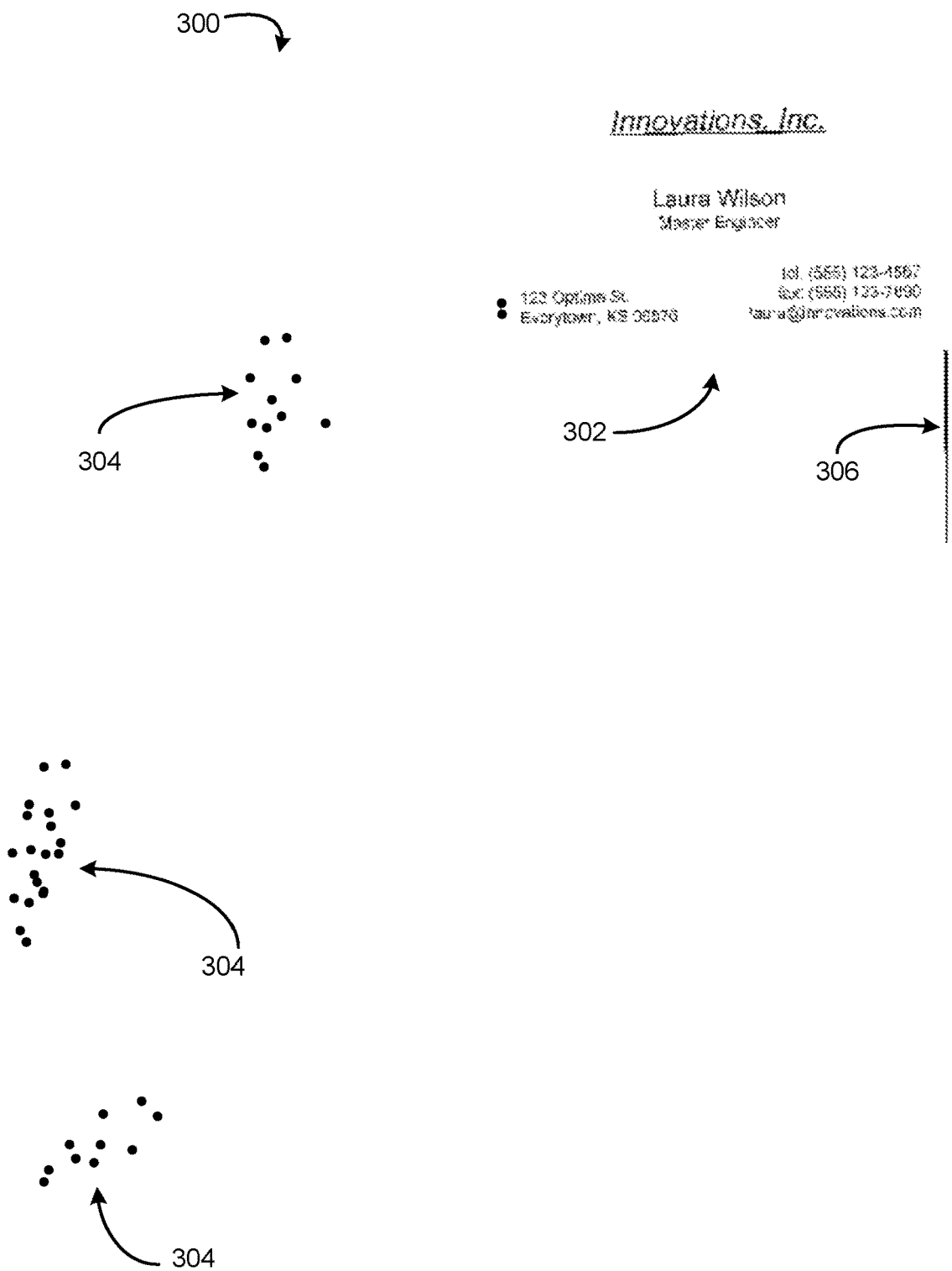
FIG. 3A is a photographic representation of a low-contrast image captured using a conventional flat-bed scanner, according to one embodiment.

Image "distortion," also referred to herein as "perspective distortion" is to be understood as artifacts associated with capturing an image of an object at a capture angle deviating from normal, with respect to the object. Distortion causes the image of the object to depict a different shape than the true object's configuration. For example, an image of a rectangle exhibiting substantial perspective distortion may appear as a trapezoid. Generally, perspective distortion appears as a linear transformation in the captured image, although some forms of perspective distortion may appear as curved. In accordance with one embodiment, an image exhibiting distortion is shown in FIG. 3D.

Image "warping," characterized by "fishbowl" effects and the like, as discussed herein, refer to radial distortion such as barrel distortion, pincushion distortion, mustache distortion, and the like which arise naturally from the symmetry of a photographic lens, and particularly with the use of zoom. Generally, warping effects appear as curvature and magnification/demagnification of portions of the image.

"Oversaturated" and "low contrast" images are to be understood as referring to images in which the amount of contrast between foreground and background elements is sufficiently low that conventional image processing techniques, such as those that attempt to directly detect the object within the image, are incapable of reliably discriminating the boundaries between the foreground and background. In one exemplary instance, images with an average pixel brightness in a local region above a predetermined threshold value of e.g. 220 (on a scale of 0-255) should be considered "oversaturated," while images having a contrast different of about 50 or less, preferably in a range from about 15 to 50, should be considered "low contrast."

Oversaturation and/or low contrast most typically arises from use of conventional flat-bed scanners, MFP devices, or the like, and/or inappropriate use of a flash setting with a conventional camera. Oversaturation generally appears as an excess of white/bright intensity, while low contrast may appear as any combination of similar colors, pixel intensities, etc. that result in sufficient similarity between the foreground and background so as to make distinguishing therebetween exceedingly difficult. In accordance with one exemplary embodiment a low-contrast image is shown in FIG. 3A.

"Glare" may appear substantially as an oversaturated region of an image, and is generally caused by presence of a light source illuminating the region (and any corresponding object that may be present therein) at a particular angle such that much of the light is reflected/deflected directly toward the camera lens. Conversely, "shadows" may appear substantially as an undersaturated region of an image, generally caused by a lack of sufficient illumination in the region, e.g. as occurs where a foreign object is placed in the path between a light source and the target object being captured. Another problem is that the lighting differences between the shadow- and non-shadow regions tend to create a strong edge that is often mistaken for a document boundary using conventional detection techniques.

The present application refers to image processing, and addresses the problems associated with attempting to detect objects of interest within complex and/or difficult image data, and crop such images to exclude the complex/difficult background but retain the object of interest.

In one general embodiment, a computer-implemented method of detecting objects within digital image data includes: receiving digital image data; analyzing the digital image data using one or more detectors, each detector being independently configured to detect objects within digital images according to a unique set of analysis parameters; determining a confidence score for each of a plurality of analysis results produced by the one or more detectors; selecting the analysis result having a highest confidence score among the plurality of analysis results as an optimum object location result; and one or more of: outputting, based on the optimum object location result, a projected location of one or more edges of the object to a memory; and displaying, based on the optimum object location result, a projected location of the one or more edges of the object on a display.

In another general embodiment, a computer-implemented method of detecting objects within digital video data includes: defining an analysis profile comprising an initial number of analysis cycles dedicated to each of a plurality of detectors, each detector being independently configured to detect objects according to a unique set of analysis parameters; receiving a plurality of frames of digital video data, the digital video data depicting an object; analyzing the plurality of frames using the plurality of detectors and in accordance with the analysis profile, wherein analyzing the plurality of frames produces an analysis result for each of the plurality of detectors; determining a confidence score for each of the analysis results; and updating the analysis profile by adjusting the number of analysis cycles dedicated to at least one of the plurality of detectors based on the confidence scores.

In yet another general embodiment, a computer-implemented method of detecting objects within digital image data includes: receiving digital image data; analyzing the digital image data using one or more color transition detectors, each detector being independently configured to detect objects within digital images according to a unique set of analysis parameters; determining a confidence score for each of a plurality of analysis results produced by the one or more color transition detectors; selecting the analysis result having a highest confidence score among the plurality of analysis results as an optimum object location result; and one or more of: outputting, based on the optimum object location result, a projected location of one or more edges of the object to a memory; and rendering, based on the optimum object location result, a projected location of the one or more edges of the object on a display.

In still yet another general embodiment, a computer-implemented method of detecting objects within digital image data includes: receiving digital image data depicting an object; analyzing the digital image data using one or more line segment detectors, each detector being independently configured to detect objects within digital images according to a unique set of analysis parameters; determining a confidence score for each of a plurality of analysis results produced by the one or more line segment detectors; selecting the analysis result having a highest confidence score among the plurality of analysis results as an optimum object location result; and one or more of: outputting, based on the optimum object location result, a projected location of one or more edges of the object to a memory; and rendering, based on the optimum object location result, a projected location of the one or more edges of the object on a display.

According to another general embodiment, a computer-implemented method for detecting objects within digital image data based at least in part on color transitions within the digital image data includes: receiving or capturing a digital image depicting an object; sampling color information from a first plurality of pixels of the digital image, wherein each of the first plurality of pixels is located in a background region of the digital image; optionally sampling color information from a second plurality of pixels of the digital image, wherein each of the second plurality of pixels is located in a foreground region of the digital image; generating or receiving a representative background color profile, the representative background color profile being based on the color information sampled from the first plurality of pixels; generating or receiving a representative foreground color profile based on the color information sampled from the second plurality of pixels and/or the color information sampled from the first plurality of pixels; assigning each pixel within the digital image a label of either foreground or background using an adaptive label learning process; binarizing the digital image based on the labels assigned to each pixel; detecting one or more contours within the binarized digital image; and defining one or more edges of the object based on the detected contour(s).

According to yet another general embodiment, a computer program product for detecting objects within digital image data based at least in part on color transitions within the digital image data includes a computer readable storage medium having embodied therewith computer readable program instructions. The program instructions are configured to cause a processor, upon execution of the computer readable program instructions, to perform a method comprising: receiving or capturing a digital image depicting an object; sampling, using the processor, color information from a first plurality of pixels of the digital image, wherein each of the first plurality of pixels is located in a background region of the digital image; optionally sampling, using the processor, color information from a second plurality of pixels of the digital image, wherein each of the second plurality of pixels is located in a foreground region of the digital image; generating, using the processor, or receiving, by the processor, a representative background color profile, the representative background color profile being based on the color information sampled from the first plurality of pixels; generating, using the processor, or receiving, by the processor, a representative foreground color profile based on the color information sampled from the second plurality of pixels and/or the color information sampled from the first plurality of pixels; assigning, using the processor, each pixel within the digital image a label of either foreground or background using an adaptive label learning process; binarizing, using the processor, the digital image based on the labels assigned to each pixel; detecting, using the processor, one or more contours within the binarized digital image; and defining, using the processor, one or more edges of the object based on the detected contour(s).

In yet further general embodiments, a system for detecting objects within digital image data based at least in part on color transitions within the digital image data includes: a processor, and logic integrated with and/or executable by the processor to cause the processor to: receive or capture a digital image depicting an object; sample color information from a first plurality of pixels of the digital image, wherein each of the first plurality of pixels is located in a background region of the digital image; optionally sample, using the processor, color information from a second plurality of pixels of the digital image, wherein each of the second plurality of pixels is located in a foreground region of the digital image; generate or receiving a representative background color profile, the representative background color profile being based on the color information sampled from the first plurality of pixels; generate or receive a representative foreground color profile based on the color information sampled from the second plurality of pixels and/or the color information sampled from the first plurality of pixels; assign each pixel within the digital image a label of either foreground or background using an adaptive label learning process; binarize the digital image based on the labels assigned to each pixel; detect one or more contours within the binarized digital image; and define one or more edges of the object based on the detected contour(s).

In still yet further general embodiments, a computer-implemented method of pre-cropping a digital image includes: downscaling a received digital image to a predetermined resolution; de-blurring the downscaled image to reduce color variations within the downscaled image; dividing the de-blurred image into a plurality of segments; computing color distances between neighboring ones of the plurality of segments, wherein the distances are color value distances between central pixels of the neighboring segments; comparing the color distances between each segment and each corresponding neighboring segment against a predetermined threshold; clustering segments having color distances less than the predetermined threshold to form a connected structure; computing a polygon bounding the connected structure; determining whether a fraction of the segments included within both the connected structure and the polygon is greater than a predetermined threshold; and in response to determining the fraction of the segments included within both the connected structure and the polygon is greater than the predetermined threshold, cropping the digital image based on the edges of the polygon; and in response to determining the fraction of the segments included within both the connected structure and the polygon is less than or equal to the predetermined threshold, repeating the computing color distances, comparing color distances, clustering segments, computing connected structure, and computing a polygon using a less restrictive color difference threshold.

Of course, the foregoing embodiments may also be implemented as systems and/or computer program products, in various approaches consistent with the inventive concepts presented herein.

General Mobile Networking and Computing Concepts

As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from flat-bed scanners and multifunction peripherals (MFPs). Similarly, images processed using the presently disclosed processing algorithms may be further processed using conventional flat-bed scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
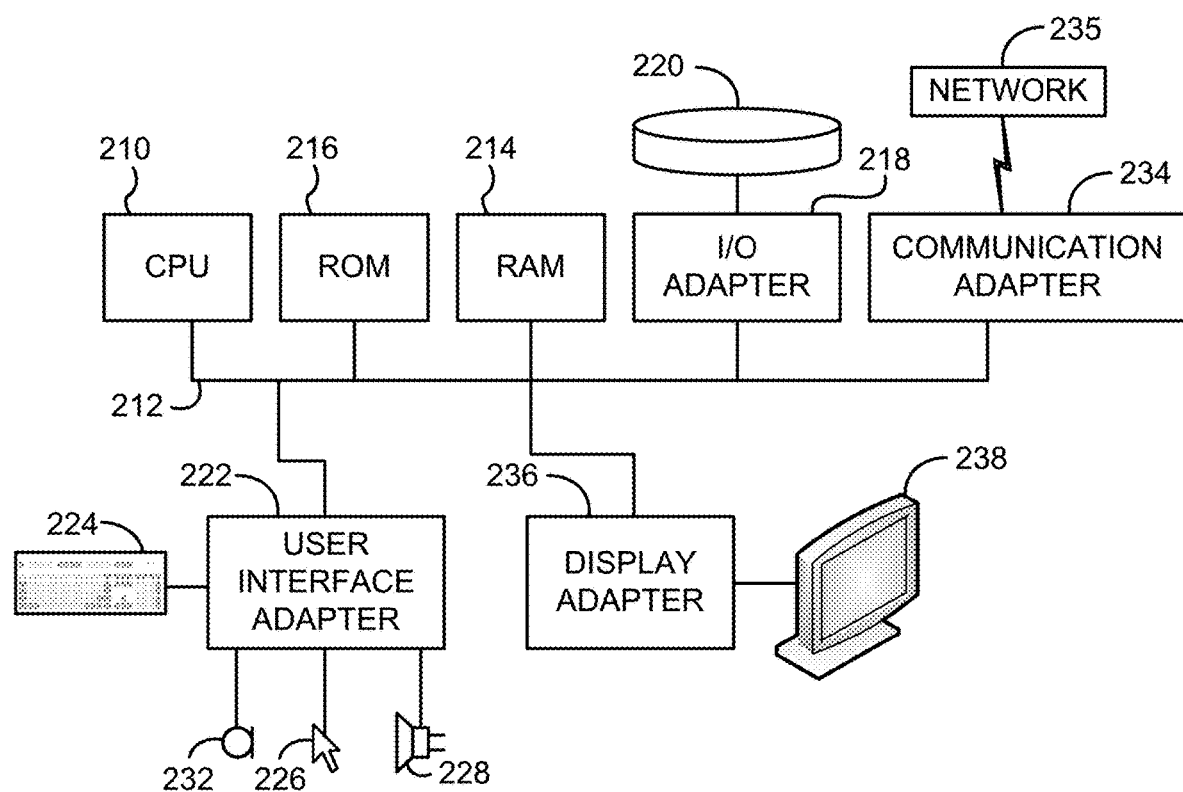
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. Patents, Patent Publications, and/or Patent Applications incorporated herein by reference. For example, digital images suitable for processing according to the presently disclosed algorithms may be subjected to image processing operations, such as page detection, rectangularization, detection of uneven illumination, illumination normalization, resolution estimation, blur detection, classification, data extraction, etc.

In more approaches, the presently disclosed methods, systems, and/or computer program products may be utilized with, implemented in, and/or include one or more user interfaces configured to facilitate performing any functionality disclosed herein and/or in the aforementioned related patent applications, publications, and/or patents, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related patent applications, publications, and/or patents, among others that would be appreciated by one having ordinary skill in the art upon reading these descriptions.

It will further be appreciated that embodiments presented herein may be provided in the form of a service deployed on behalf of a customer to offer service on demand.

Improved Object Detection and Image Cropping

In general, the presently disclosed inventive concepts are concerned with providing a robust object detection and image cropping solution capable of precise, accurate identification of edges/boundaries between object(s) of interest and background as represented in digital images. Importantly, the presently disclosed inventive concepts convey the advantage of enabling robust object detection even in the presence of complex background, within low contrast and/or oversaturated images, within images exhibiting shadows, glare, etc., and regardless of whether the image was generated/captured using a conventional flat-bed scanner, MFP device, and the like or using a camera.

Turning now to FIGS. 3A-3H, various embodiments of images depicting an object under circumstances that make object detection difficult are shown.

FIG. 3A is a photographic representation of a low-contrast and/or oversaturated image 300 captured using a conventional flat-bed scanner, according to one embodiment. In the embodiment of FIG. 3A, the object 302 sought for detection is a business card having black text printed on a white background. Due to the lack of contrast, edges of the business card are not immediately apparent within the scanned image 300. Moreover, various artifacts 304, 306 appear within the image 300, creating opportunities for false positive edge identification, character identification, and associated challenges that may frustrate object detection within the image 300. Indeed, the image is sufficiently saturated that the text appearing on the business card is degraded in the scanned image 300.

Figure 3B:
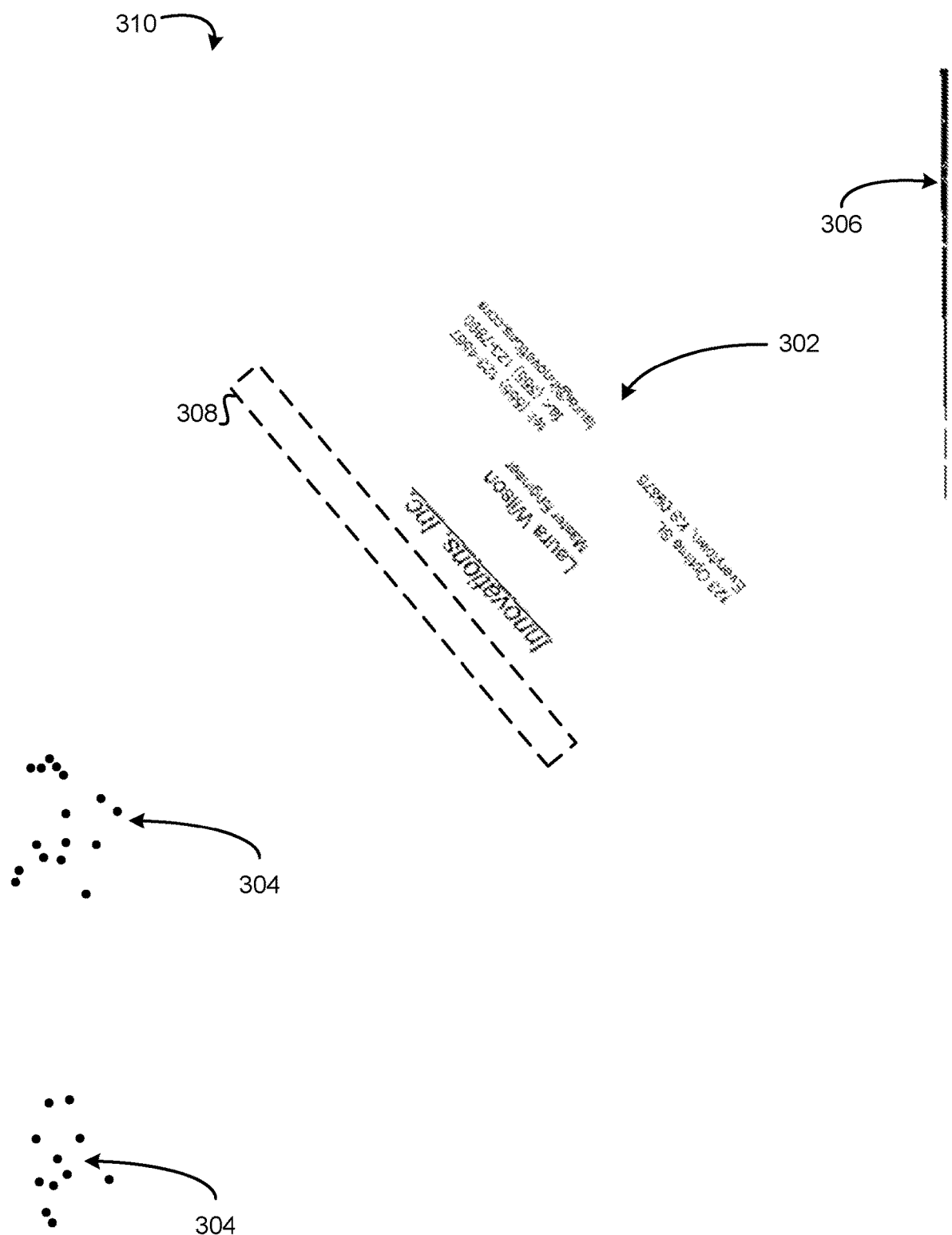
FIG. 3B is a photographic representation of an image captured using a conventional flat-bed scanner, the image having a small object depicted therein, and the object being located in an unconventional location and orientation, according to one embodiment.

FIG. 3B is a photographic representation of an image 310 captured using a conventional flat-bed scanner, the image 310 having a small object 302 depicted therein, and the object 302 being located in an unconventional location and orientation, according to one embodiment. Similar to FIG. 3A, FIG. 3B depicts a business card as the object 302 sought for detection. Also similar to FIG. 3A, the image 310 is characterized by low contrast and/or oversaturation, but to a lesser extent than FIG. 3A. Accordingly, image 310 also includes artifacts 304, 306 that may generate false positive edge location predictions. However, note the points appearing in region 308 substantially rest along a linear path and may indicate a location of an upper edge of the object 302. Even so, the orientation of these points within the overall image 310 does not comport with general assumptions that an object such as a document, when imaged using a traditional flatbed scanner, will be oriented substantially in "portrait" or "landscape" fashion and positioned so as to align with the upper and left borders of the scan area. As explained further below, this unconventional placement may violate an essential assumption regarding object location and frustrate gathering appropriate information to use in distinguishing between foreground (object) and background of the image 310.

Accordingly, in FIG. 3B the primary challenge for object detection is the unconventional positioning/orientation, and relatively low size of the object 302 compared to the total size image of the image 310. As described in further detail elsewhere herein, objects with relatively low area compared to total image area are difficult to detect without precise knowledge regarding the location of the object within the image. Since many object detection techniques rely on determining characteristics of the background and foreground, respectively, in order to distinguish between the two, in situations represented by FIG. 3B it is difficult to ensure the characteristics gleaned as representative of the "background" or "foreground" truly correspond to those portions of the image. This is because the object 302 occupies relatively little of the image (and thus represents relatively little of the information available in the image), and the expected location of foreground and background cannot be relied upon due to the unconventional positioning of object 302 within the image 310.

Figure 3C:
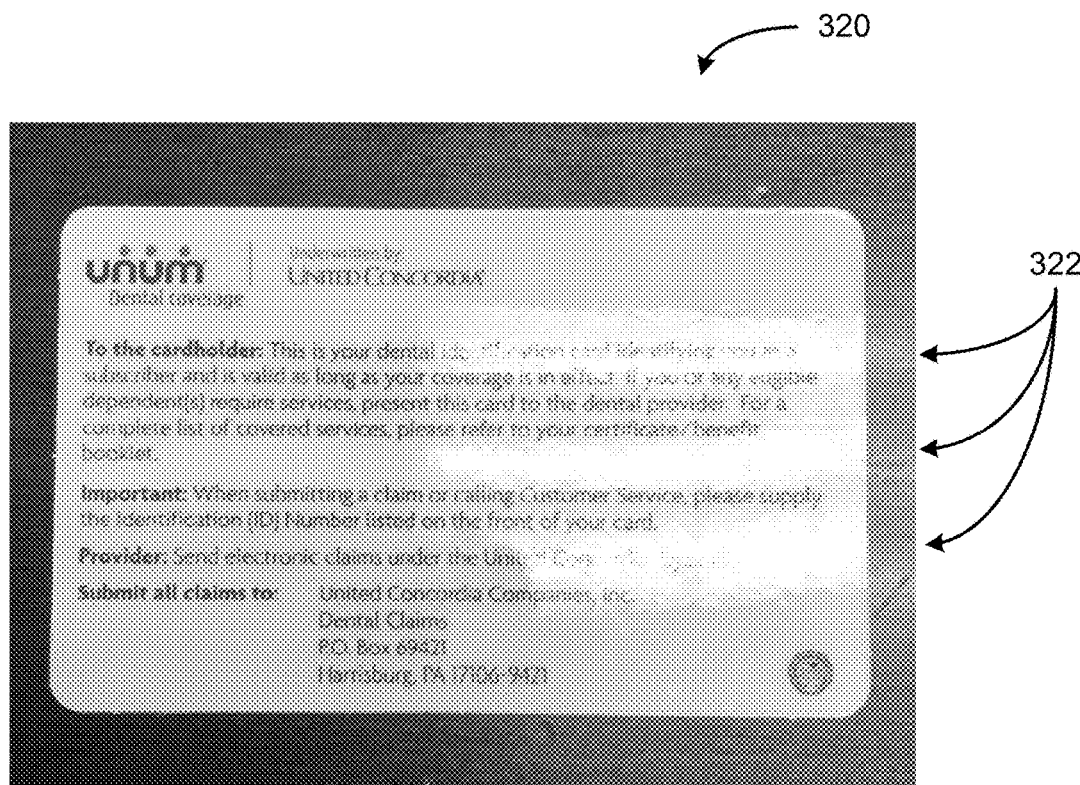
FIG. 3C is a photographic representation of an image captured using a camera and exhibiting glare, according to one embodiment.
Figure 3D:
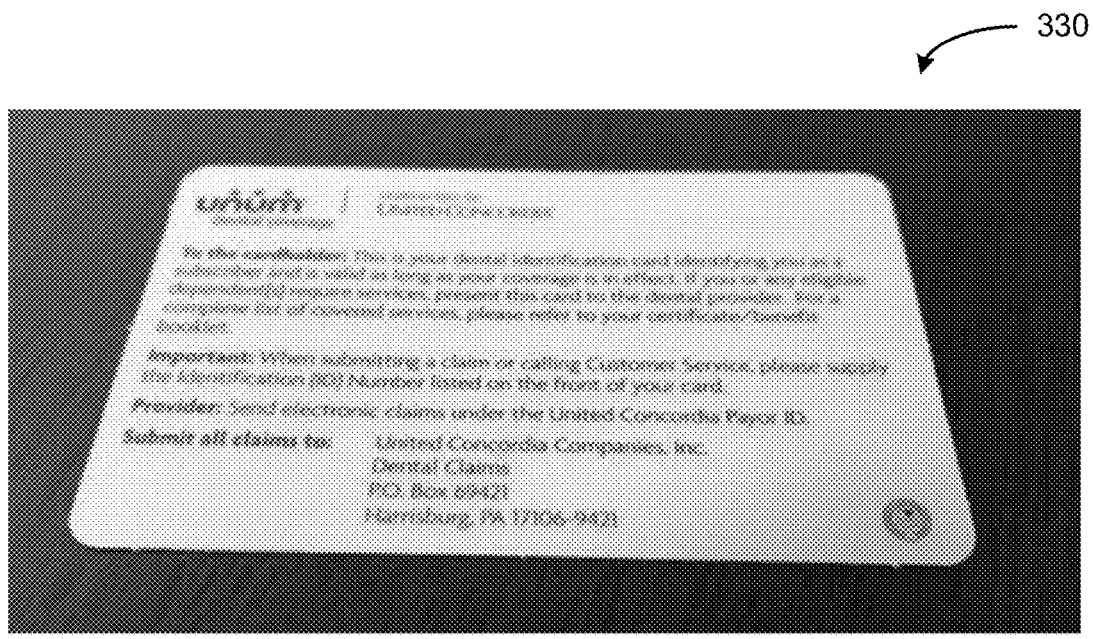
FIG. 3D is a photographic representation of an image captured using a camera and exhibiting distortion, according to one embodiment.

FIG. 3C is a photographic representation of an image 320 captured using a camera and exhibiting glare, according to one embodiment. Glare may have a similar effect as oversaturation, but confined to a local region within an image 320 and potentially having a greater impact on the ability to distinguish between foreground and background within the glare region 322 than other regions of the image 320, even if those other regions are characterized by oversaturation and/or low contrast. In particular, and especially for objects having similar color profile/characteristics between the foreground (object) and background, glare may defeat the ability to distinguish therebetween. In addition, glare may obscure information represented by/on the object and desired for use in downstream workflows/applications relying on the image data.

FIG. 3D is a photographic representation of an image 330 captured using a camera and exhibiting distortion, according to one embodiment. Distortion of this type may cause an object represented in the image 330 to deviate from expected characteristics (particularly shape) and thus frustrate the ability to detect boundaries between the object and background of the image. Such perspective distortions are particularly frustrating in situations where vertices of a polygonal object deviate from expected angles, e.g. where corners of a rectangular document deviate from 90 degrees.

Figure 3E:
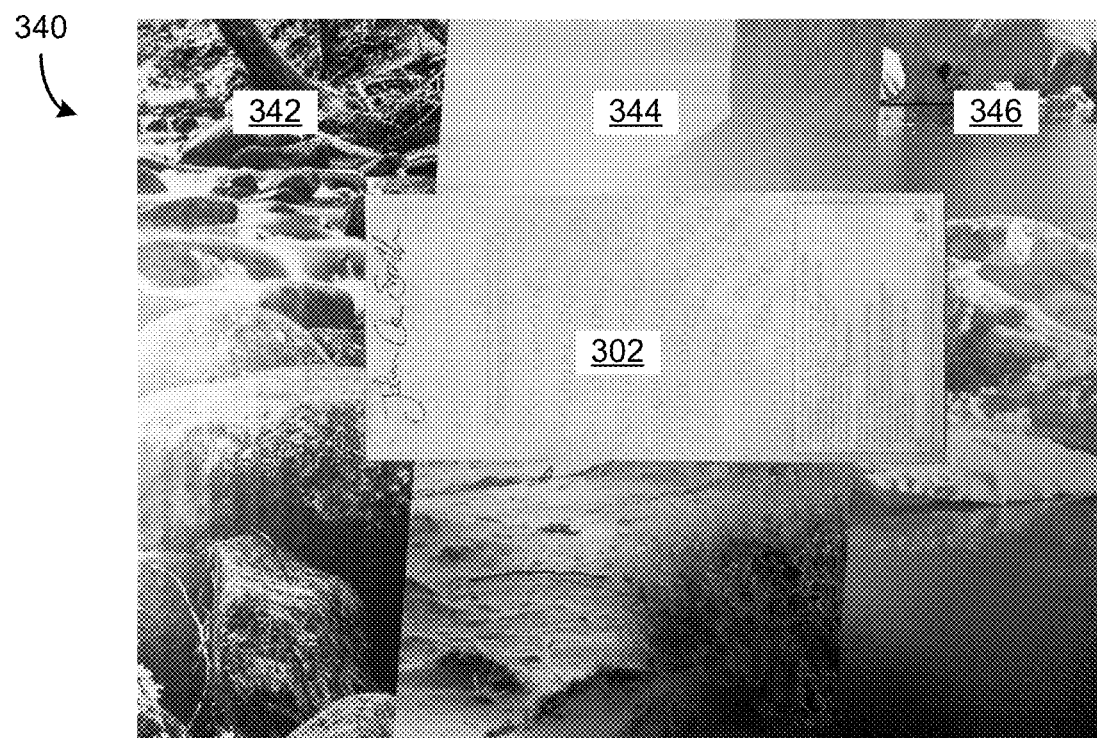
FIGS. 3E-3H are photographic representations of images having a complex background, according to various embodiments.

In FIG. 3E, an object 302 is depicted within an image 340 having a complex background having three different regions each with a unique color profile, according to one embodiment. A first background region 342 is dominated by green colors, while second background region 344 is dominated by red and yellow colors, and third background region 346 is dominated by blue and white colors. The object sought for detection 302 is a check with a substantially gray/beige color profile. In situations such as this, distinguishing background from foreground is exceptionally difficult because the background is not characterized by any single characteristic, or even set of characteristics. Indeed, in FIG. 3E each background region 342-346 is dominated by a different channel in a typical RGB color scheme, making each background region as distinct from each other as from object 302.

Figure 3F:
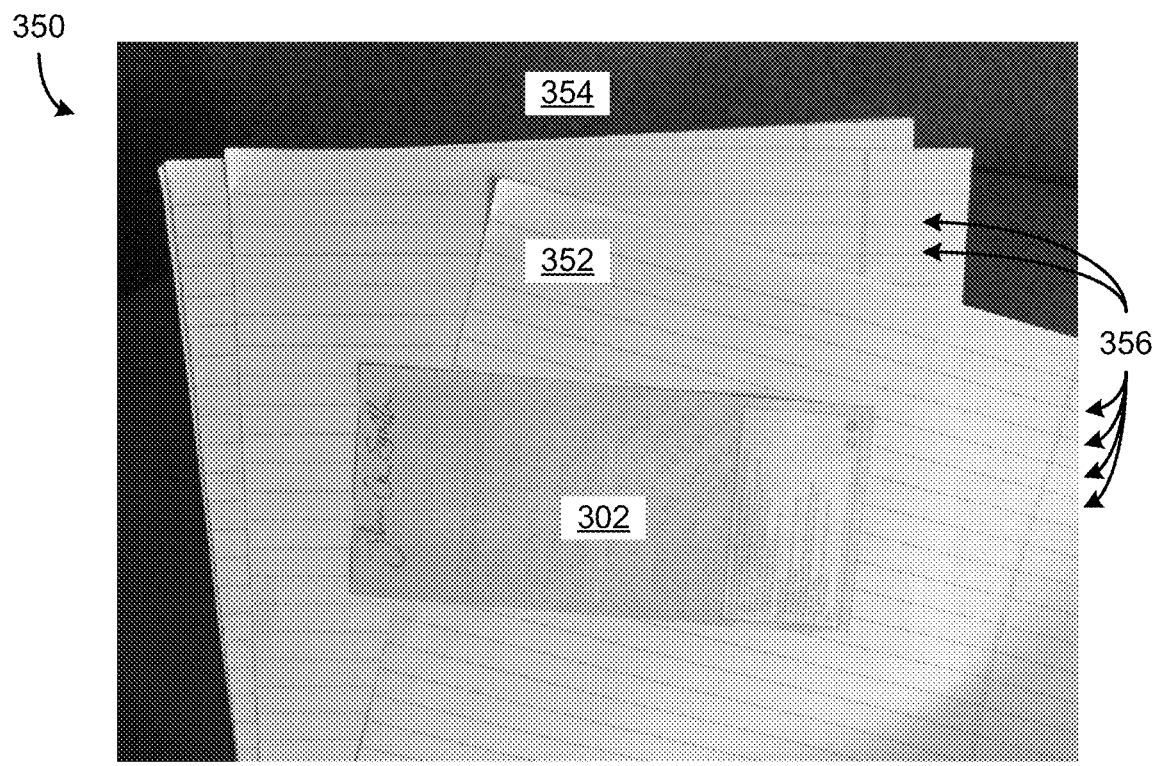

In FIG. 3F, an object 302 is depicted on a complex background including objects of a similar type as the object desired for detection, according to one embodiment. As in FIG. 3E, the object 302 is a check, but unlike FIG. 3E, the complexity of the background of image 350 arises from the inclusion of similar background objects 352 (blank, lined sheets of paper) within the background. The similar color characteristics between the object 302 and background objects 352, coupled with the lines 356 on the background objects 352 frustrate distinction between the object 302 and background objects 352 because the lines are highly likely to generate false positive edge location predictions. This is because the lines 356 exhibit substantially similar characteristics as expected to indicate the location of edges/boundaries between the foreground and background of image 350.

Exacerbating this problem is the fact that, according to embodiments consistent with FIG. 3F, additional background 354 may be included in the image 350. The additional background 354 corresponds to one or more surfaces (e.g. table, floor) upon which the object 302 and/or background objects 352 are arranged, and has significantly different color characteristics than both the object 302 and background objects 352. As such, transitions from the additional background 354 to background objects 352 may be projected as the location of boundaries between foreground (object 302) and background, rather than transitions from the background objects 352 and object 302, as is the desired result of object detection.

Figure 3G:
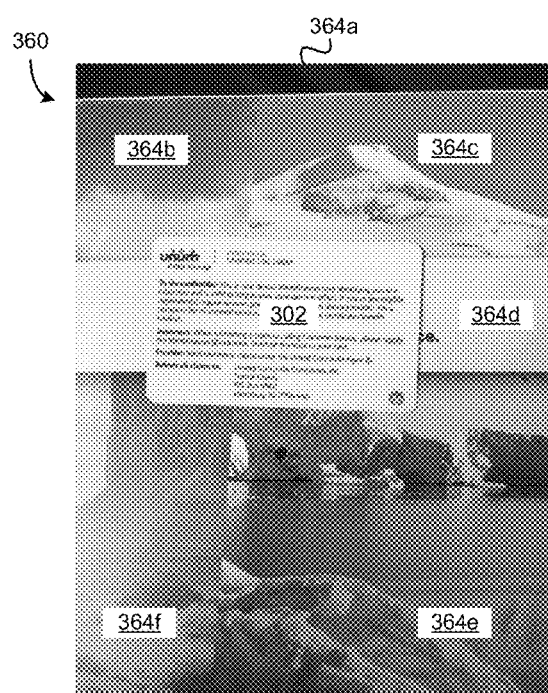

In FIG. 3G an object 302 is depicted on an image 360 having a complex background with six different regions 364a-364f each exhibiting a unique color profile, according to one embodiment. Problems described above with reference to FIG. 3E are also present when attempting to detect objects according to the embodiment of FIG. 3G, but in FIG. 3G certain background regions share color characteristics, in at least portions thereof. For instance, while region 364a is dominated by dark colors and region 364f dominated by bright red and yellow/orange colors, regions 364c, 364d, and 364e each are dominated by substantially white colors, especially in the portions of the image adjoining each region (i.e. along the right edge of image 360 as shown in FIG. 3G. Similarly, the upper left portion of object 302 exhibits similar color characteristics as surrounding background of region 364b, i.e. near the upper left corner of the object 302. Accordingly, a complex background may arise from drastically different color profiles within background and foreground, such as shown in FIG. 3E, and/or due to similarities between different background regions and/or between background and foreground, in various embodiments. A "complex" background shall therefore be understood as broadly inclusive of backgrounds with variable textures, color profiles, including other objects, etc. in various permutations or combinations as described herein, without limitation.

Figure 3H:
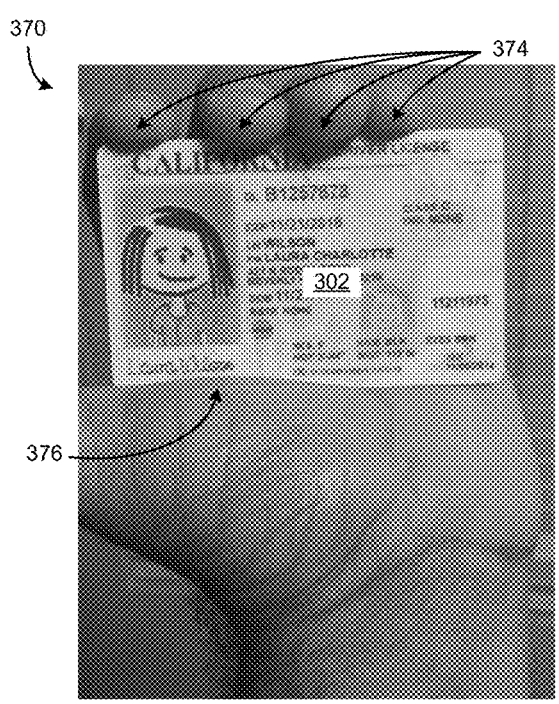

In FIG. 3H, an image 370 of an object 302 is depicted with portions thereof obscured by another object, and other portions thereof obscured by shadow, according to one embodiment. More specifically, as shown in FIG. 3H, object 302 is a driver license held in the hand (other object) of an individual capturing the image 370 thereof. As a result, lower border/edge of the object 302 is partially obscured by the heel of the individual's hand, indicated by arrow 376. Moreover, along the upper boundary/edge of the object 302, fingers and shadows cast thereby obscure the location of the upper border/edge in regions indicated by arrows 374. These obscured/shadowed regions may cause false positive edge location predictions and/or cause the edges of the object 302 to become apparently curved, have extra vertices, or create other obstacles to high fidelity object detection.

The presently disclosed inventive concepts advantageously enable detection of objects of various types under various challenging circumstances such as represented in FIGS. 3A-3H, providing improved ability to detect objects under varied conditions and independent of the source of the image data. Accordingly, the instantly-described embodiments of improved image detection represent an improvement to computer technology via enabling a computer to perform functions (generally, pattern recognition) typically reserved for human performance due to computers' well-known inability or poor capacity for accomplishing such tasks. (Consider, for example, the use of blurred and/or complex image data to distinguish humans from computers in security measures such as CAPTCHA® and the like).

Moreover, by following a multi-pronged approach as described below, object detection may be performed with sufficiently low computational cost so as to enable detection of objects in real-time or near real-time and thus facilitate detection of a wide variety of objects within video data, without the need to manually adapt or otherwise "train" the detection process to detect each of the various types of objects imaged in the video. The use of a multi-detector, in particular, enables this versatile and nimble analysis while providing desirably high recall under a wide range of scenarios. Accordingly, the presently disclosed inventive concepts also represent an improvement to the field of image processing.

Multi-Detector

Again, generally, the presently disclosed inventive concepts provide advantages with respect to object detection, even in the presence of undesirable artifacts or challenges described herein, particularly with reference to FIGS. 3A-3H, via use of a unique multi-detector tool and approach in which various detection algorithms each optimized to overcome one or more specific challenges presented by some or all of the artifacts described immediately above are applied, potentially using different operational settings/parameters to determine an optimum recognition approach or combination thereof.

Recognition results are preferably obtained from using each "detector," which should be understood as referring to a different detection algorithm (e.g. color-based, line segment-based, text-based, etc. as described in greater detail below) or a same/similar algorithm but with different operational settings/parameters. Exemplary parameters that may be varied to generate different "detectors" generally include, but are not limited to, specifying fonts to seek in text line-based detection, such as OCR-B font for detecting MRZ characters, or E13B for detecting MICR characters; specifying a number and/or identity of expected characters in a given text line/block, specifying a number of lines of text of a particular type included in a text block (e.g. two lines for passports, one line for checks, etc.), specifying expected geometric characteristics of features (particularly characters) expected to be included or represented in/on an object sought for detection, specifying a location and/or size of a corridor within which to conduct a refined search for object edges, specifying an expected angle or angle range existing between adjacent sides of an object, specifying an expected minimum contrast threshold for candidate edge pixels, and/or an expected aspect ratio of an object sought for detection, specifying a number of Gaussians to be utilized in analyzing the image data, or any combination thereof in accordance with various embodiments of the presently disclosed inventive concepts.

See also the exemplary configuration file presented below in Table 1, and additional discussion of analysis parameters set forth with respect to method 500 and FIG. 5, below, for additional and/or alternative analysis parameters and exemplary values therefor. It should be understood that the analysis parameters may be employed in the context of any of the exemplary methods 500-900 described herein, without departing from the scope of the present disclosure.

Recognition results from each detector applied to an input image are evaluated using confidence scores. Based on the confidence scores, the best recognition result may be retrieved, and/or multiple detection results may be combined in order to form a composite result. Combining results may help boost overall confidence, and may enable detection in situations where no single approach/algorithm is individually suitable for obtaining results with a desired confidence level. For instance, recognition results may have confidence scores associated with various portions of a detected object (e.g. different corners or sides of a polygon), and the various portions obtained using each detector may be polled to determine an optimum combination having all the best portions obtained from the complete set of detector results.

In accordance with the myriad embodiments described herein, any suitable confidence score or combination thereof may be employed in the context of evaluating the detection result for a given detector.

For instance, in a line segment-based detector, multiple segments which are candidate estimates for the location of an edge of an object may be evaluated for overall fit or linear character, e.g. using a least squares regression or other suitable fitness measure, and a confidence score computed for various sets of the candidate segments. The set with the highest confidence may be chosen as the optimum detection result for the particular edge.

Figure 4A:
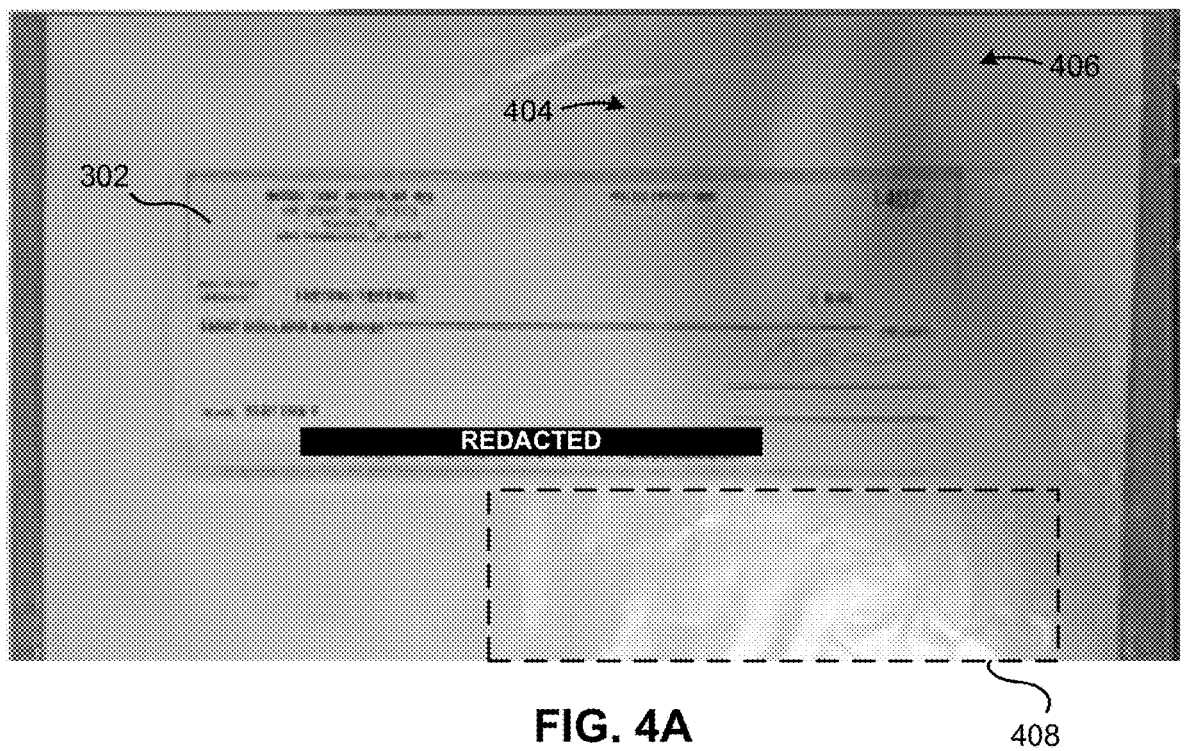
FIG. 4A is a photographic representation of an input image captured using a camera and depicting a document as the object for detection, according to one embodiment.
Figure 4B:
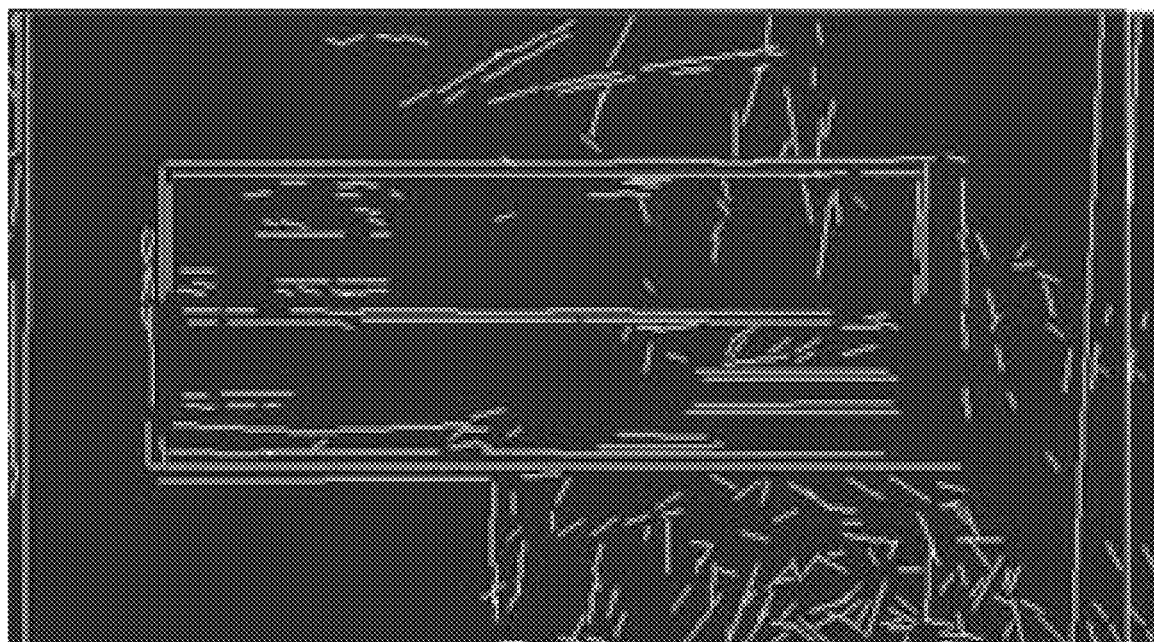
FIG. 4B depicts a graphical representation of a result of a line segment detector applied to the image shown in FIG. 4A, according to one embodiment.

In one approach, and as shown in FIG. 4A, the object is a document having four boundaries defining a tetragon/ quadrilateral. Line segments detected by the line detection algorithm are small fragments of line segments. As shown in FIG. 4B, the detected line segments along the right edge of the document are broken segments. In order to project the document edge, these segments are grouped as one line segment. In order to group line segments located on one line, a line segments clustering algorithm is applied. After grouping these broken line segments, an algorithm searches for the best quadrilateral of the documents by evaluating all possible quadrilaterals that the grouped line segments can form. The particular line segment clustering algorithm and quadrilateral search algorithm may be any suitable algorithm known in the art as being suitable for line segment clustering, or quadrilateral searching, respectively.

In order to rank quadrilaterals, the number of edge pixels projected along the four sides of a given quadrilateral are computed. The best quadrilateral is the one with the largest number of projected edge pixels. Note that in order to count the projected edge pixels along each side of a quadrilateral, the pixels on a line segment needs to be projected onto the side of a quadrilateral.

In addition, two approaches of computing the confidence scores of four sides of quadrilateral can be applied, in various embodiments. One is use the absolute value of the number of edge pixels projected along a side. The other is use the relative value, i.e., ratio of the number of edge pixels projected a long a side to the number of pixels on this side. Both methods are implemented in the new prototype system. The "absolute" confidence value is used in ranking quadrilaterals, afterwards, a "relative" confidence is also evaluated, in one embodiment.

In more embodiments, particularly for text line detection, OCR confidence measures may be utilized, singly or in combination with other confidence comparisons such as a comparison of the expected location of text within an object versus the location of the text relative to an estimated object edge/boundary location as determined by the detector algorithm. For instance, in one approach determining whether a baseline, midline, topline, etc. of recognized text characters is parallel (or substantially parallel, e.g. within about 5 degrees angle of orientation) to a closest estimated object edge/boundary is informative as to the quality/confidence of the OCR operation. Specifically, locating a parallel edge in proximity to detected text indicates a high confidence in the OCR result.

In more embodiments, confidence scores or measures utilized by various detectors may include any combination of: 1) shape confidence score such as an aspect ratio confidence score, and/or a score reflecting proximity to an expected angle between two adjacent sides of an object sought for detection; 2) edge strength confidence scores; 3) confidence scores for locations of four corners as identified by different detectors (in which case a majority vote approach can be used to determine which detector's result is best); 4) expected textual information, (for instance for MRZ documents, if a MRZ text line is found on the detected document, a high confidence score is returned), etc. In preferred embodiments, all detected information is used to determine the best location of an object within the image. The information can be used to train a classifier, and the output of the classifier may include a combined score from multiple detectors, as discussed in greater detail elsewhere herein. The fused score may be taken as a representative confidence score of the multi-detector overall performance, in one embodiment.

The various detection algorithms may advantageously be performed in series or in parallel, and are configured for multi-threaded operation to optimize speed of computation. In particularly preferred approaches, depending on the nature of the object to be detected, and the extent of available a priori knowledge regarding characteristics of the object, an optimum series or sequence of detectors may be defined and applied to achieve the best possible extraction result. Results from one detector may be used to improve detection by another detector, bootstrapping the overall detection process and improving the ultimate result.

Optionally, in some approaches one or more pre-cropping algorithms may be applied prior to executing the multi-detector, and/or as initial iteration(s) of a multi-detector workflow, in order to reduce the amount of background present in the image upon which subsequent detectors operate. Additionally or alternatively, different detectors may share information within a multi-detector environment, such as an embodiment in which two different detectors operate on a different color space than the color information represented in the input image data. So as to minimize computational cost of the overall detection process, the input image color space may be transformed to the desired color space (e.g. RGB to CIELUV) by the first detector, and the transformed color space may be stored or retained in memory, e.g. a buffer, so as to be utilized as needed by subsequent detectors without necessitating repetition of the transformation. This general notion of information sharing between individual detectors shall be understood as extending to all aspects of detector invocation, parameterization, and execution. Any pre-processing result achieved by any given detector in the multi-detector may be leveraged by other detectors without needing to repeat the pre-processing operation.

The multi-detector is also, in accordance with preferred embodiments, adaptive and intelligent. The detector may operate in an iterative fashion, operating on multiple images potentially depicting multiple different types of object of interest. The multi-detector may attempt to recognize a first object using each of a plurality of detectors, optionally in real- or near-real time, and may record the confidence scores associated with each detector's result. As additional image data are presented to the multi-detector, confidence scores may be accumulated over time to develop a profile of detector performance at any given point in the overall detection process.

To provide adaptability, the multi-detector may provide a number of analysis cycles to each detector for each iteration of the detection process. As understood herein, "cycles"

refer to individual images or frames of image data, such that one cycle equals one image or frame, but subsequent cycles may not necessarily represent subsequent images or frames of image data. For instance a first cycle may correspond to a first frame of image data, while a second cycle may correspond to a fourth frame of image data, particularly where the input image data comprise video data. In response to a first detector exhibiting steadily decreasing confidence over a predetermined number of detection iterations, and a second detector exhibiting steadily increasing confidence over the same interval, the multi-detector may devote additional cycles per iteration to the second detector, take cycles away from the first detector, or both, so as to influence the overall results delivered by the detector as a whole.

It is important to note that the intelligent and adaptable capabilities of the presently disclosed inventive multi-detector approach do not require performing/applying all possible or available detector algorithms in any given iteration, nor an iterative approach, in all cases. For instance, if a priori knowledge regarding the type of object to be detected, and optimum detector algorithm(s) to utilize for such types of object, are both available, then it is possible to pre-configure the multi-detector to apply the optimum detector(s) in the first detection attempt.

For instance, in various embodiments optimum detector algorithm(s) may be determined based on the source of input image data. Given the unique challenges associated with detecting objects in images produced using conventional flat-bed scanners/MFPs, etc. versus detecting objects in images produced using a camera, it is possible to define an optimum detector algorithm or set thereof for use in detecting objects according to the source of input image data. As one example, a detector requiring document corners be substantially defined by 90 degree angles may perform better when using flat-bed scanner input image data than camera input image data, because the flat-bed scanner input image data does not exhibit the distortions that cause corners to be distorted away from 90 degrees when captured using a camera.

In more embodiments, an image may be subjected to a classification algorithm, such as described in U.S. Pat. No. 9,355,312, entitled "Systems And Methods For Classifying Objects In Digital Images Captured Using Mobile Devices," in order to determine the best approach to detecting objects within image data. For instance, based on the determined classification, a particular set of detectors may be designated for use in the multi-detector, preferably based on knowledge that such detectors perform well on images classified according to the determined classification for the image analyzed in the first instance. For example, an image classified as being of an identification document such as a passport may be subsequently analyzed using a text line detector specifically configured to detect a particular pattern of text in a particular location of the document, such as a block of text including three lines of MRZ characters, each line being 30 characters long, or a block of text including two lines of MRZ characters, each line being 44 characters long. Upon detecting the appropriate text block, border/edge locations may be projected based on a priori information about the layout of passports (or the particular document/ object type) and detected with high confidence and low computational cost by searching within a narrow window or corridor of the image using optimized detection parameters.

A similar approach applies using MICR characters to locate edges/boundaries of a financial document such as a check, remittance, etc. would be understood by a person having ordinary skill in the art upon reading the present descriptions. In general, a MICR-based approach may include determining whether an image depicts any MICR characters, and if so determining the location and/or identity thereof. In response to determining the object does not depict any MICR characters, this approach may abort, allowing other detectors to proceed with analysis of the image. Conversely, upon determining MICR characters are present, the location and/or identity thereof may inform the detection process as to the type of object represented in the image data, and likelihood that the object represents information useful in a downstream workflow. For example, an indication that an object only depicts numerical MICR characters along a lower portion of the object is indicative of the object being a check or other remittance document. If a downstream workflow relates to financial transactions, then the detector may be parameterized so as to focus more on the particular location where the MICR characters are located, and/or to focus on detecting specific characteristics of the MICR characters, e.g. geometric characteristics so as to facilitate edge location prediction.

In another, similar approach, image characteristics and/or other image features other than textual information (e.g. color profile of a subregion of the image, photographs, drawings, logos, watermarks, seals, emblems, holograms, icons, etc. as would be appreciated by a person having ordinary skill in the art upon reading the present descriptions) may be utilized to facilitate classification of the type of object represented in the image, and an appropriate detector or set of detectors, optionally including a preferred order of application thereof, may be applied to the image data to detect the object. Generally, the image may be classified according to the location of an expected characteristic/feature/set thereof, and an appropriate detector chosen, or parameters thereof set, in a manner designed to optimize detecting objects of that type.

In one embodiment, the classification may be accomplished utilizing a neural network to quickly but efficiently predict the source of the input image data, e.g. to distinguish between camera-captured and scanned images. Upon determining the source of image data, detectors may be chosen and/or configured to best address the unique challenges arising in the context of the particular image capture device. For instance, detectors configured to handle images characterized by oversaturation, low contrast, unknown object location/orientation, etc. may be employed upon determining the image source is a flat-bed scanner, MFP, or the like, while detectors configured to handle distortion and/or complex backgrounds may be employed upon determining the image source is a camera.

Of course, a priori knowledge regarding an input image may be obtained from any suitable source, and may be included with the input image in the form of metadata associated with the image. For instance, metadata may identify the type of device used to capture/generate the image data, information about capture conditions such as capture angle, illumination characteristics, image resolution, etc. as would be understood by persons having ordinary skill in the art and as would be useful for determining appropriate processing conditions for attempting to detect objects within an image having particular characteristics.

In a similar vein, it may be advantageous to apply various detector algorithms, even using default parameters, according to a particular predetermined sequence based on the type of object to be detected within the image data. For instance, if an object to be detected is a document, or even better a document having a structured format such as a form, license, etc., then it may be advantageous to attempt to detect text lines prior to searching the entire image for foreground/background transitions using color information or a line segment-based approach. As will be appreciated by persons having ordinary skill in the art, employing a text line detector first is a computationally efficient approach because text detection is simpler, and allows a significant reduction in the search space to which the color information and/or line segment detectors need be applied. Accordingly, by defining an appropriate sequence of detector application based on the nature of the object sought for detection, the presently disclosed inventive multi-detector concepts can accomplish superior results relative to conventional techniques, or indeed any single detector algorithm described herein, at a minimal computational cost.

In a preferred implementation, a technique for detecting documents in image data employs a multi-detector in optional combination with pre-cropping techniques described in further detail below. The multi-detector utilizes at least a text line detector and a color transition detector, but may optionally utilize a line segment detector in combination or as an alternative to the color transition detector to analyze the image data. Moreover, the detectors are applied in a manner so as to minimize computational cost associated with detection while maximizing detection accuracy. Accordingly, the technique involves determining a source of the image data, and determining an appropriate detector sequence in response to the source of the image data.

For instance, if the source of the image data is determined to be a flat-bed scanner, MFP, or the like, the text line detector is applied as the initial detector so as to define a narrow search window/corridor within which to search for document edges/boundaries using the color transition detector and/or line segment detector. This is advantageous because images of smaller documents or objects produced using a conventional flat-bed scanner/MFP/etc. are more likely to exhibit only a small portion of the total area as foreground (document), and/or for the document to be located in a non-standard position/orientation, such as shown in FIG. 3B. Similarly, text may be easier to locate than edges/borders due to tendency for flat-bed scanner-based images to be oversaturated or otherwise exhibit low contrast, and edge locations may be hypothesized based on assuming the positions thereof are substantially parallel, or perpendicular to the text lines, e.g. top and bottom edges of a document are generally parallel to the baseline of a text block, and sides are typically perpendicular thereto. In further variations, multiple text line detectors may be employed, e.g. using different parameters such as one detector configured to detect MRZ characters, and another detector configured to detect MICR characters.

On the other hand, in response to determining the source of the image data is a camera, a color transition detector may be applied as the first detector since such detectors have been empirically determined to outperform text line detection when the input image data depict the object as a substantial portion (e.g. 75% total area or more) of the image, and the input image data include color information. Indeed, multiple color transition detectors with different operating parameters may be employed to the exclusion of other detectors, in one embodiment.

As noted above, a pre-cropping operation may be performed prior to applying any of the detectors in the multi-detector, or as an initial phase of a multi-detector detection process, in various approaches.

Accordingly, in one embodiment, an object detection process implementing a multi-detector as described herein is represented according to method 500. The method 500 may be performed in any suitable environment, including those shown in FIGS. 1-4B, among others. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), a graphics processing unit (GPU), etc., combinations thereof, or any other suitable computing device known in the art.

Figure 5:
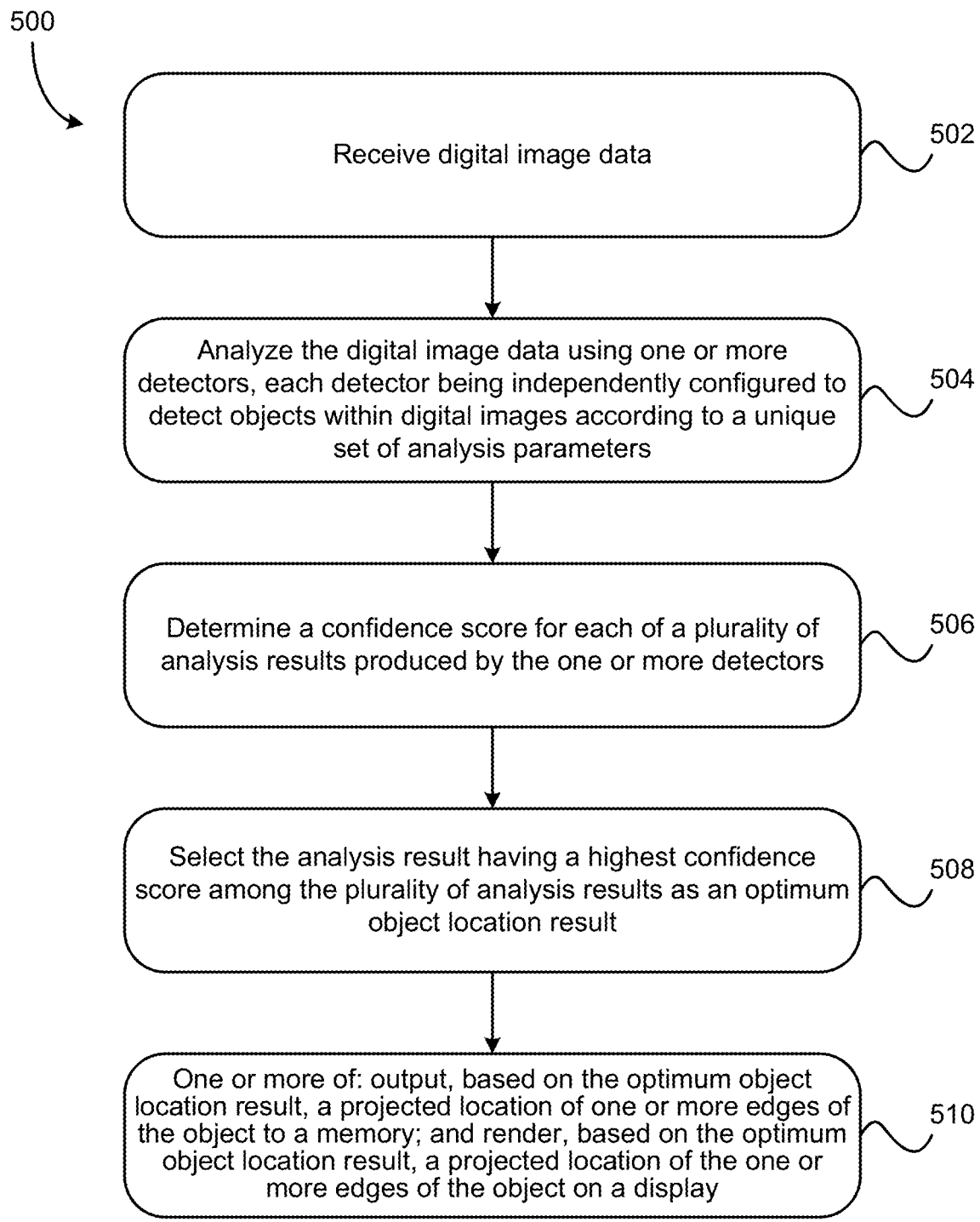
FIG. 5 is a flowchart of a method of detecting objects within digital image data, according to one embodiment.

As shown in FIG. 5, method 500 may initiate with operation 502, where digital image data are received. The image data may or may not depict an object sought for detection, but preferably do depict such an object. The image data may be received directly from a capture device, e.g. a flat-bed scanner, multifunction printer, camera of a mobile device, webcam, video camera, or any suitable capture device as known in the art. Indeed, the presently disclosed inventive techniques advantageously are capable of robust processing of digital image data regardless of source and unique challenges associated therewith. For the purposes of method 500, assume the digital image data comprise a still image.

Method 500 continues with operation 504, where the digital image data are analyzed using a plurality of detectors, such as detectors described in further detail below. Each detector is independently configured to detect objects within digital image data according to a unique set of analysis parameters. Broadly, the parameters may define the type of features the detector seeks to locate as indicative of presence of an object, such as color transitions, line segments, text lines, etc. However, different detectors may also be configured to seek essentially the same type of features, but using different parameters (e.g. parameters with different values that slacken or tighten the constraints by which a given detector will predict/indicate the presence of an object, or edge thereof, such as different constraints on defining adjacent characters as belonging to a same string of characters, or adjacent pixels as belonging to a same connected component, in various illustrative embodiments). Any difference between two given detectors is sufficient to consider the detectors separate analytical tools/processes. It should be understood that the foregoing analysis parameters may be employed in the context of any of the exemplary methods 500-900 described herein, without departing from the scope of the present disclosure.

In various embodiments, the detectors may include any number of detectors, but preferably include at least two detectors. The two (or more) detectors are preferably configured to detect objects according to fundamentally different approaches, e.g. color transition versus text line detection, and even more preferably are selected from: a color transition detector configured to detect transitions between a background and a foreground of digital image data; a line segment detector configured to identify a plurality of line segments corresponding to substantially straight lines or line segments within digital image data; and a text line detector configured to identify blocks of text and orientation thereof within digital image data.

In several embodiments, analyzing a still image to detect objects involves determining which detector "wins" in addition to the confidence of the detection result. For instance, again with reference to still images as input, a text line detector specifically configured to detect objects based on locating a line of MRZ characters is preferred. The MRZ detector, described in detail below, produces a confidence score for detection of the MRZ characters in addition to detection of the object overall. Wherein the MRZ characters have been confidently found, the MRZ detector result is preferred, regardless of whether the overall confidence (i.e. from edge confidences, etc.) for the MRZ detector is superior to other detectors. The MRZ detector has the benefit of a "landmark" (i.e. the MRZ lines) within the object that generic detectors do not, so the MRZ detector confidence is adjusted upward based on theory and empirical observation. At least partially for this reason, an MRZ detector is preferably the first detector used in a sequence of text line detectors, again as described below and according to one exemplary embodiment of the presently described inventive concepts.

Similarly, analysis parameters that may be employed and/or modified during the course of object detection as described herein may include confidence thresholds for different portions of the image and/or object, such as an external area confidence threshold, a middle area confidence threshold, an internal area confidence threshold, and a minimum edge confidence threshold, according to one approach.

In various approaches, each detector employed for object detection may have associated therewith a corresponding confidence threshold, since confidence scores may be calculated in different manners based on the operation of the respective detector. In other embodiments, confidence scores may be calibrated or normalized for comparison to a single confidence threshold. For instance, in one exemplary embodiment a Platt scaling method can be used to calibrate confidence values of different detectors. For each detector, the Platt scaling method is used to estimate the posterior probability of the detected object by minimizing the entropy of positive and negative training examples. A cross validation approach is used during optimization.

In another approach, calibrating the confidence scores involves normalizing all confidence thresholds to a same reference value, then linearly scaling confidence values around the threshold.

Of course, other calibration/normalization techniques may be employed in other embodiments without departing from the scope of the presently described inventive concepts.

In more embodiments, analysis parameters may relate to include a number of analysis iterations to perform, a downscaling target size, a downscaling target aspect ratio, a background margin size, a foreground size ratio, a number of foreground Gaussians, a number of background Gaussians, an overall energy threshold, a number of iterations in which to apply the Gaussian(s); and/or a relative area ratio, in any suitable combination. In preferred implementations, the foregoing analysis parameters are especially pertinent to color transition-based object detection. It should be understood that the foregoing analysis parameters may be employed in the context of any of the exemplary methods 500-900 described herein, without departing from the scope of the present disclosure.

In further embodiments, analysis parameters may designate upper, mid, and/or lower sizes and/or dimensions for downscaled images, maximum angle deviations for forming objects from line segments (which may differ depending on the source of the image data, i.e. scanner/MFP/camera), minimum edge or boundary length for forming objects from line segments, minimum/maximum distances between line segments suitable for grouping into a candidate edge set, whether to utilize a buffer "corridor" in assembling edges from line segment sets, and if so the size and/or angle of the corridor, etc. In preferred embodiments, the foregoing analysis parameters are particularly useful in the context of line segment-based detection. It should be understood that the foregoing analysis parameters may be employed in the context of any of the exemplary methods 500-900 described herein, without departing from the scope of the present disclosure.

In still yet more embodiments, analysis parameters may indicate: whether to perform certain portions of an overall multi-detector-based object detection workflow (e.g. which detector(s) to use, and in what order, whether to perform cropping, whether to perform corner detection, whether to output a downscaled version of the input image data), which resources or types of resources (e.g. multi-core processing) to be used in the analysis, the source of image data (e.g. scanner versus camera versus unknown), and/or what information to output during or upon completing the detection process. Generally, the foregoing analysis parameters are pertinent to any implementation of a multi-detector approach as described herein. It should be understood that the foregoing analysis parameters may be employed in the context of any of the exemplary methods 500-900 described herein, without departing from the scope of the present disclosure.

Generally, analysis parameters may be expressed as Boolean values (e.g. Yes/No), integer values, and/or floating point values.

In one embodiment, for example, an exemplary configuration file specifying suitable parameters for use in a multi-detector-based object detection technique includes the following definitions shown in Table 1 (presented in XML format, but of course other formats may be used without departing from the scope of the present descriptions). These parameters should be understood as illustrative only, and not limiting on the scope of the particular analysis parameters or values thereof in the context of object detection as described herein. It should be understood that the analysis parameters defined in the configuration file represented in Table 1 may be employed in the context of any of the exemplary methods 500-900 described herein, without departing from the scope of the present disclosure.

TABLE 1

```
<?xml version="1.0" encoding="utf-8"?>
<Configuration name="XXXX">
<Section name="MRFDetector">
<Parm name="UseRandomFieldsOnly" type="bool" value="no" />
<Parm name="UsePageSegmentationOnly" type="bool" value="no" />
<Parm name="UseCombined" type="bool" value="yes" />
<Parm name="ExternalAreaConfidenceThreshold" type="float" value="0.75" />
<Parm name="MiddleAreaConfidenceThreshold" type="float" value="0.95" />
<Parm name="InternalAreaConfidenceThreshold" type="float" value="0.97" />
<Parm name="MinimumEdgeConfidenceThreshold" type="float" value="0.625" />
<Section name="RandomFields">
```

TABLE 1-continued

```
<Parm name="MobileImage" type="bool" value="yes" />
<Parm name="ScannerImage" type="bool" value="no" />
<Parm name="UnknownImage" type="bool" value="no" />
<Parm name="IterCount" type="int" value="7" />
<Parm name="AspectRatio" type="float" value="-1" />
<Parm name="RelativeAspectRatioError" type="float" value="0.05" />
<Parm name="DownScaleSize" type="int" value="120000" />
<Parm name="ReturnScaledImage" type="bool" value="no" />
<Parm name="Mode" type="int" value="0" />
<Parm name="Beta" type="float" value="0.025" />
<Parm name="BackgroundMargin" type="int" value="8" />
<Parm name="ForgoundSizeRatio" type="float" value="0.2"/>
<Parm name="NumFgdGaussians" type="int" value="2"/>
<Parm name="NumBgdGaussians" type="int" value="4"/>
<Parm name="EnergyThreshold" type="float" value="0.05"/>
<Parm name="NumItersGaussian" type="int" value="7"/>
<Parm name="RelativeAreaRatio1" type="float" value="0.0001"/>
<Parm name="RelativeAreaRatio2" type="float" value="0.05"/>
<Parm name="CornerDetection" type="bool" value="yes" />
<Parm name="CropImage" type="bool" value="no" />
<Parm name="UseMultiCores" type="bool" value="yes" />
<Parm name="RandomInit" type="bool" value="no" />
<Parm name="SamplingMode" type="int" value="1" />
</Section>
<Section name="PageSegmentation" >
<Parm name="Mode" type="int" value="0" />
<Parm name="MobileImage" type="bool" value="yes" />
<Parm name="ScannerImage" type="bool" value="no" />
<Parm name="UnknownImage" type="bool" value="no" />
<Parm name="SpeedMode" type="int" value="4" />
<Parm name="AspectRatio" type="float" value="-1" />
<Parm name="RelativeAspectRatioError" type="float" value="0.1" />
<Parm name="ReturnScaledImage" type="bool" value="no" />
<Parm name="DownscaleSizeLow" type="int" value="240000"/>
<Parm name="DownscaleSizeHigh" type="int" value="1254528"/>
<Parm name="MiniLengthThreshold" type="float" value="0.1"/>
<Parm name="MaxAngleDeviation" type="int" value="15"/>
<Parm name="BinThreshold" type="float" value="0.05"/>
<Parm name="LineGroupThreshold" type="float" value="1.5"/>
<Parm name="CropImage" type="bool" value="no"/>
<Parm name="UseMultiCores" type="bool" value="yes" />
<Parm name="UseAngleInRanking" type="bool" value="yes"/>
<Parm name="UseCorridor" type="bool" value="no"/>
<Parm name="CorridorMargin" type="float" value="0.10"/>
<Parm name="CorridorMaxAngleDeviation" type="float" value="0.75"/>
<List name="CorridorFourCornersXs">
<Parm type="float" value="0.0"/>
<Parm type="float" value="0.0"/>
<Parm type="float" value="0.0"/>
<Parm type="float" value="0.0"/>
</List>
<List name="CorridorFourCornersYs">
<Parm type="float" value="0.0"/>
<Parm type="float" value="0.0"/>
<Parm type="float" value="0.0"/>
<Parm type="float" value="0.0"/>
</List>
</Section>
</Section>
</Configuration>
```

In operation 506, method 500 involves determining a confidence score for each of a plurality of analysis results produced by the plurality of detectors. Each detector produces a result comprising a prediction of the location of edges or boundaries between the image background and the object, or image foreground. Given a priori knowledge regarding the expected characteristics, e.g. shape, size, color, etc. of the object sought for detection, any number of techniques may be implemented to evaluate confidence in the individual predictions.

In more embodiments, the confidence scores may additionally or alternatively be determined on a more granular scale—e.g. confidence may be evaluated for different portions of an object, such as projected edge and/or corner (vertex) locations, curvature of curved regions of an object, color profile for a shaded region of an object, etc. as would be appreciated by a person having ordinary skill in the art upon reading the present descriptions. For instance, as described in further detail elsewhere herein, line segments and/or curves may be evaluated for fit and an edge location projected based on the segments, with corresponding confidence based on the measure of fit. Details regarding the detection and evaluation of nonlinear edges and nonstandard corners (e.g. edges and/or intersections thereof best described by second- or higher-degree polynomials) may be found in the disclosure of U.S. Pat. No. 9,165,187, granted Oct. 20, 2015 and entitled "Systems and Methods for Mobile Image Capture and Processing," which is herein incorporated by reference.

Similarly, text line detection may be informed based on confidence values derived from character recognition such as optical character recognition (OCR), intelligent character recognition (ICR) or any other suitable recognition technique that would be appreciated by a skilled artisan reading this disclosure.

A more granular approach to confidence evaluation allows advantageous combination of analysis results for individual portions of the object, which may be combined to generate an overall detection result with higher confidence and quality than any individual detector could achieve in solitude. As such, the presently described inventive concepts represent an improvement to object detection within image data based on the use of partial results from various different detection techniques to generate a composite result with higher confidence and quality than previously capable of being achieved using individual detection algorithms.

Method 500 includes operation 508, in which the analysis result (or alternatively, combined portions of various analysis results) having the highest confidence score associated therewith is selected as the optimum object location result.

In cases where the analysis result comprises a combination of various partial results from different detectors, selecting the analysis result having a highest confidence score among the plurality of analysis results as an optimum object location result may additionally include: determining, for each detector, a confidence score for each of a plurality of portions of the object, wherein each portion of the object is determined based on the analysis result; comparing the confidence scores of each of the plurality of portions of the object determined based on the analysis result obtained by one of the detectors to corresponding confidence scores determined for corresponding portions of the object which are determined based on the analysis result obtained by at least one other of the detectors; determining, for each of the plurality of portions of the object and based on the comparison, an optimum one of the analysis results determined by the plurality of detectors; and assembling the optimum object location result based on the optimum analysis result determined for each of the plurality of portions of the object. In one exemplary embodiment in which the object is a document or other object having a polygonal shape, the portions for which confidence measures may be individually determined may include edges and/or corners (vertices).

In more embodiments, object detection may involve applying different detectors specifically configured to detect one or more portions of an object, and combining/selecting results of the various detectors for purposes of overall object detection. Further still, the confidence scores for partial object detectors may be combined with results from overall object detectors to further bootstrap the confidence in the overall detection result.

In one exemplary approach for driver licenses, credit cards, passports, or other documents having rounded corners (which often frustrate detection algorithms attempting to define edge locations based on calculating angles at document corners), one detector could be configured/parameterized to focus on the detection of rounded corners, whereas a second detector could be configured/parameterized to focus on detection of straight edges. The multi-detector then could combine confidence scores for the corner/edge candidates of both detectors to optimize an overall confidence function for the object.

With continuing reference to FIG. 5, and after selecting the optimum object location result, method 500 includes, in operation 510, either or both of outputting based on the optimum object location result, a projected location of one or more edges of the object to a memory; and rendering, based on the optimum object location result, a projected location of the one or more edges of the object on a display, e.g. a display of a computer connected to a flat-bed scanner, or a display of the device housing the camera.

Of course, in various embodiments, method 500 may include additional and/or alternative operations and/or features beyond those described above and shown in FIG. 5, without departing from the scope of the present disclosures. For instance, in one approach method 500 may include downscaling the received digital image data prior to analysis thereof, to reduce computational cost and/or memory footprint associated with performing the presently described inventive detection techniques. The downscaling may preferably maintain the aspect ratio of the input digital image data, but reduce the image to a resolution of approximately 300×400 pixels. Any suitable downscaling technique known in the art may be used for this purpose, without departing from the scope of the inventive concepts presented herein.

Moreover, as noted above the detection techniques presented herein may be applied to cropping of digital images so as to remove substantially all background therefrom, leaving only the detected object as may be desired for downstream processing (such as data extraction) of the cropped image data. Accordingly, in one embodiment method 500 may additionally or alternatively include cropping the digital image data to exclude background therefrom, the cropping being based on the projected location of the one or more edges of the object.

In preferred embodiments, cropping may involve removing artifacts from the image, particularly artifacts such as skew, warping and perspective distortion, etc. that cause the shape or appearance of the object to deviate from normal. For example, in the case of an object in the form of a rectangular document, removing artifacts may involve "rectangularizing" the document, e.g. using techniques as described in U.S. Pat. No. 9,165,187, granted Oct. 20, 2015 and entitled "Systems and Methods for Mobile Image Capture and Processing;" and/or U.S. Pat. No. 9,208,536, granted Dec. 8, 2015 and entitled "Systems And Methods For Three Dimensional Geometric Reconstruction Of Captured Image Data."

For instance, in one approach cropping in a generic sense involves cutting out a rectangular area of the original image, preferably in a way that the object sought for detection is completely inside the cropping rectangle. In addition to that, for rectangular objects (particularly documents), cropping may include taking the boundaries of the object and creating a rectangular image that consists of the object. Accordingly, cropping may be considered a process involving at least one of two operations: first, finding the boundaries of the object, and second, manipulating the image either by conventional cropping, or by projecting the rectangular object boundaries such that a rectangular image is created that only contains the object. For the latter projection step, techniques such as disclosed in U.S. Pat. No. 9,208,536, granted Dec. 8, 2015 and entitled "Systems and Methods for Three Dimensional Geometric Reconstruction of Captured Image Data;" and/or U.S. Pat. No. 8,855,375, granted Oct. 7, 2014 and entitled "Systems and Methods for Mobile Image Capture and Processing" may be employed, in various embodiments. In still more embodiments, though the foregoing projection techniques are preferred, a known algorithm configured to perform perspective transformation on digital image data could be implemented.

In a similar vein, but directed to facilitating object detection and improving the robustness thereof, method 500 may include a pre-cropping operation performed prior to the analysis of the image data by the detectors. The pre-cropping algorithm details will be described in greater detail below in the section entitled "Pre-Cropping." In brief, pre-cropping removes a portion of the background positioned along the outer border of the image, thus reducing the amount of background that need be analyzed to determine transitions/boundaries to the foreground (object) of the image this reduces noise in the background, and generally improves the detection result capable of being obtained using a multi-detector approach such as exemplified by method 500 and FIG. 5.

In order to optimize the detection process, and specifically the types and parameterization of detectors implemented in the analysis of the digital image data, method 500 may include a pre-analysis step in which the digital image data, and/or metadata associated therewith, are analyzed to determine whether a source of the digital image data (e.g. scanner/MFP/camera/etc.) can be determined. The analysis involves applying a neural network to the received digital image data, and/or parsing the metadata, e.g. to determine the source thereof and configure detectors so as to perform optimum detection of objects therein. As noted in the background and introductory definitions in the detailed description, each source of image data conveys concomitant advantages and disadvantages. Knowing which type of capture device was used to generate the image data received for processing facilitates performing a robust detection process using reliable parameters of the most efficient detector(s) available to perform detection.

Accordingly, in various embodiments, the input image data may be characterized by any number or combination of complications. For instance, the object depicted in the digital image data may be characterized by one or more of: being obscured partially or wholly by glare; being obscured partially or wholly by shadow or other objects such as a person's hand holding an object, or other objects present in the field of view; having portion(s) thereof missing from the image (e.g. a cut-off corner); being oversaturated; having a low contrast with respect to a background of the digital image; including perspective distortion; exhibiting warping; being depicted on a complex background; and/or having an image area less than a predetermined minimum threshold of a total area of the digital image data.

The foregoing descriptions of multi-detector embodiments and operation thereof have been provided mainly with reference to still image data or analyzing image frames. Skilled artisans will appreciate that these concepts are equally applicable to processing video data upon realizing the computational cost of the multi-detector process and constituent detector algorithms have been optimized so as to enable real-time or near-real time processing thereof.

Accordingly, as mentioned briefly above, a multi-detector analysis may be applied to a video stream by assigning certain cycles within a video sequence to different detectors, and performing detection in an iterative, adaptive and intelligent manner so as to provide robust yet flexible detection capability.

In various approaches, a video detection implementation utilizing a multi-detector may employ any number of detectors, but in one preferred embodiment three detectors are configured. A first detector is configured to detect MRZ characters and define a likely edge location window/corridor based upon detected MRZ characters. A second detector is configured to detect MICR characters and define a likely edge location window/corridor based upon detected MICR characters. A third detector is a color transition detector. The multi-detector is configured to execute the foregoing detectors in the order set forth above, and by default assigns each detector an equal number of cycles per iteration of the detection process.

For illustrative purposes only, assume the video-based multi detector is being employed as part of an application for services such as Internet service. The applicant must provide proof of identification, proof of residence in the service area, and remit payment for the first installment of the service period. To do so, an applicant furnishes a passport as proof of identification, a utility bill with his/her name matching the passport, and a check to tender the necessary payment. The service provider wishes to capture digital images of all three documents and utilize the digital images to extract necessary information and process the service request.

The service provider initiates a video capture operation using a mobile device or other device having a camera, and invokes the multi-detector while hovering the camera over the documents, which may be arranged in any order, but for sake of demonstration assume are arranged in the order of: passport, utility bill, check. Also assume the documents are placed on a complex background, and the passport is laminated so it tends to exhibit glare when captured using a flash setting or under certain lighting conditions.

The multi-detector is configured with three detectors arranged to operate in the sequence noted above, MRZ→MICR→Color, and begins with a default distribution of equal analysis cycles across all three.

Upon the passport being placed within of the camera's field of view, the MRZ detector attempts to detect MRZ characters, and successfully does so based on the presence of MRZ characters on the passport. As a result, the MRZ detector generates a detection result characterized by 90% confidence.

The MICR detector fares less well, there being no MICR characters to detect, and ultimately returns a bounding box including part of the background and only a portion of the passport, with 15% confidence.

The color transition detector, being the most robust detector disclosed herein, also successfully locates the passport, but has some difficulty interpreting the fold in the document's center, and returns a suitable detection result, but characterized by only 75% confidence.

After this first iteration, which may occur within less than a second, the multi-detector stores the confidence values in a historical record, and dynamically adjusts the analysis profile by altering the number of cycles dedicated to each detector based on results of the prior iteration(s). Notably, for simplicity here adjustment occurs after each iteration, but in practice it may be advantageous to allow the multi-detector several iterations to "burn-in" and reach a more stable confidence estimate, then analyze several iterations' worth of historical information in determining whether, and if so how, to adjust the analysis profile of upcoming iterations. In one embodiment, analysis of the historical record is performed on a periodic basis, e.g. every 5 iterations, and takes into account an average (or optionally, a weighted average) of the previous 3-5 iterations' confidence scores for each detector.

Cycles dedicated to each detector may be adjusted in any suitable manner, but preferably detectors performing relatively well are promoted and have more cycles dedicated thereto, while detectors exhibiting less than desirable performance are demoted and have less cycles dedicated. In a simple example, the detector with the best average performance may be afforded an additional cycle, up to a maximum (which depends on the framerate of the video and the computational power of the device performing the analysis, e.g. 10 cycles per iteration in one embodiment having a 30 fps framerate, or equivalently 20 cycles per iteration for another embodiment having a 60 fps framerate). In more complex embodiments, confidence scores may be weighted according to temporal proximity to the performance analysis, with more recent scores being given more weight than older ones. For instance, in one approach using 5 iterations' worth of historical data, a most recent iteration's score may constitute 50% of the weighted average, a second most recent iteration's score 25%, third most recent iteration's score 12.5%, fourth most recent iteration's score 5%, and oldest iteration's score 2.5%.

Most preferably, in no case is a detector ever demoted to have zero cycles, as doing so would effectively remove the detector from the analysis thereafter, undesirably reducing adaptability of the multi-detector as a whole. Similarly, in particularly preferred embodiments after a certain number of cycles, whether a predetermined number of cycles, or a predetermined number of cycles without any change to the analysis profile, the profile may be reset to a default equal distribution of cycles across all enabled detectors. This reset function advantageously facilitates the detector remaining flexible, and avoids situations in which any given detector is so heavily weighted/favored as to be the only or dominant source of detection functionality.

As noted above, while "cycle" should be understood as synonymous with "frame," it should be appreciated that subsequent cycles of a given detector iteration are not necessarily consecutive. For instance, a MRZ detector may take 1 frame to perform its analysis ($\frac{1}{30}^{th}$ second), a MICR detector may take 2 frames to perform its analysis ($\frac{1}{15}^{th}$ second), and a color transition detector may take 6 frames ($\frac{1}{10}^{th}$ second), such that the initial iteration takes approximately ¼ second.

Referring again to the illustrative embodiment above, in response to the MRZ, MICR, and color transition detector confidences, the multi-detector may demote the MICR detector, promote the MRZ detector, and leave the color transition detector unchanged. This process may repeat for several iterations, e.g. 4-8, while the service provider holds the phone over the passport and until an indication of proper detection (e.g. displaying a bounding box on the video feed, displaying a cropped image of the passport, playing a sound, etc.) is provided to the service provider. At that time, the service provider moves the camera so the utility bill is in view. The multi-detector, having reinforced its allocation of cycles each cycle while the passport was in view of the camera, is now highly adapted to passport detection.

However, since the utility bill does not include any of the MRZ characters the multi-detector has relied upon thus far to robustly detect the passport, the MRZ detector reports poor results with low confidence, e.g. 25%. Similarly, the MICR detector continues reporting poor results with 15-20% confidence. The color transition detector improves, having no internal border/fold to struggle with in detecting the utility bill, and despite the complex background exhibits a robust confidence of 92%. In response, the multi-detector demotes the MRZ detector and promotes the color transition detector until the analysis profile provides routine, robust detection of the utility bill. At such time, an image of the bill is automatically captured and an indication of completed detection provided to the service provider.

In a manner similar to the adjustment from the passport to the utility bill, the multi-detector applies the MRZ, MICR, and color transition detectors and evaluates confidence thereof. Since the check does include MICR characters, the MICR detector exhibits a sudden increase in confidence, and produces robust detection results with 80% or greater confidence. The MRZ detector remains in the poor performance zone, there being no MRZ characters on the check. The color transition detector remains at robust performance in excess of 90%. In response to the MICR detector's improved performance, and so as to maximize the total amount of information available to synthesize into a final detection result, the MICR detector is promoted while the MRZ and color transition detector remain substantially unchanged. While the color transition detector remains at high confidence and the detection results therefrom may be fully adequate in most instances, it is advantageous to retain this information and analyze the color transition detector's results in line with those obtained from the promoted MICR detector, optionally combining partial or complete detection results as noted hereinabove to bootstrap the overall confidence in the detection result achieved by the multi-detector as a whole. Again, upon reaching a predetermined confidence overall, the multi-detector triggers an auto-capture operation and provides an indication of successful detection to the service provider operating the camera.

In some embodiments, the auto-capture and detection process may be triggered based on determining the confidence scores of one or more of the detectors have reached a predetermined stability, e.g. a confidence score has not varied by more than 5% over a span of 3 or more cycles, 5 or more cycles, 1 second, 3 seconds, 5 seconds, etc. as would be appreciated by a person having ordinary skill in the art upon reading the present disclosures.

In more embodiments, an object detection process implementing a multi-detector and specifically configured to process video data in real-time or near real-time is represented according to method 600. The method 600 may be performed in any suitable environment, including those shown in FIGS. 1-4B, among others. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), a graphics processing unit (GPU), etc., combinations thereof, or any other suitable computing device known in the art.

Figure 6:
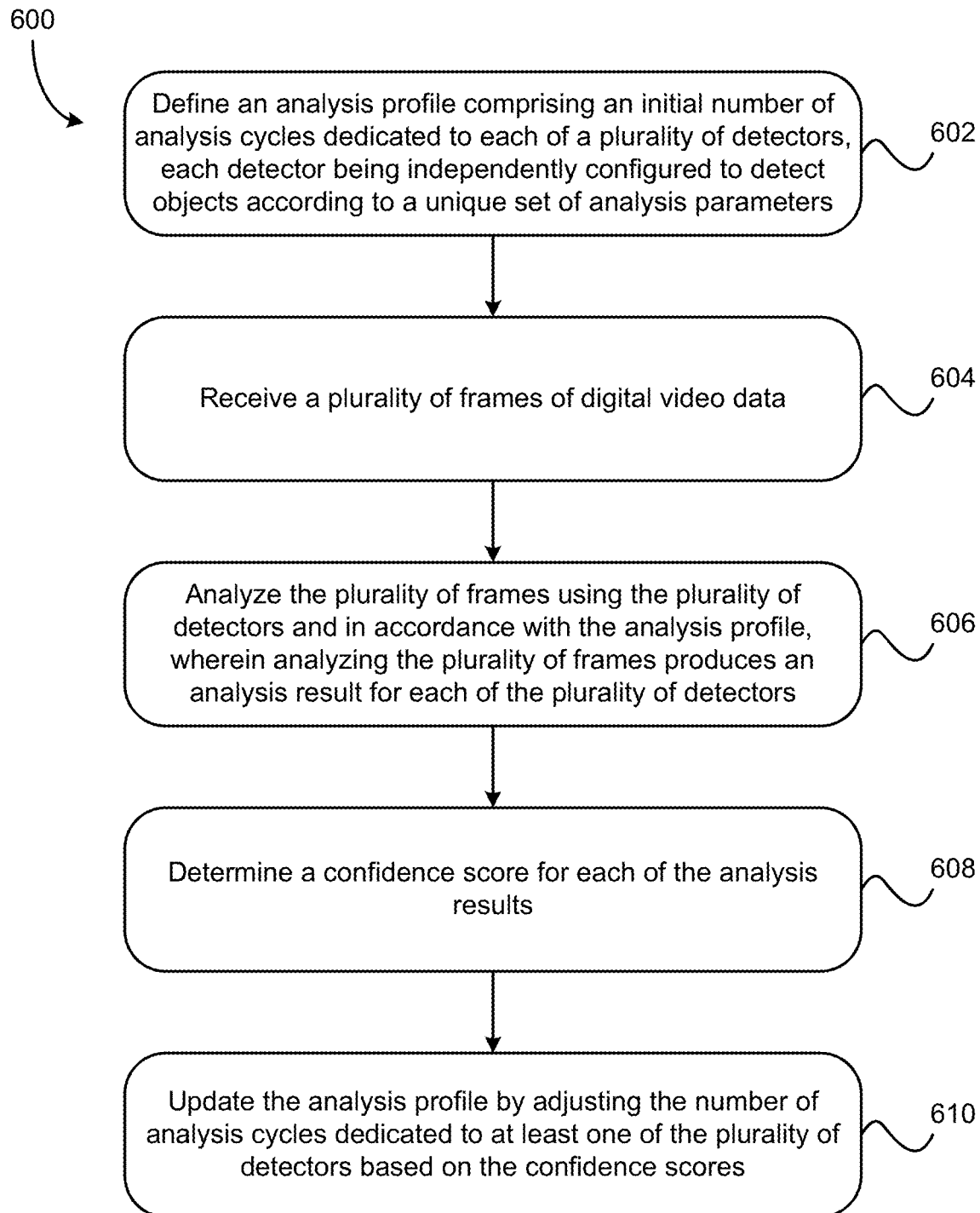
FIG. 6 is a flowchart of a method of detecting objects within digital video data in real-time or near-real time, according to one embodiment.

As shown in FIG. 6, method 600 may initiate with operation 602, where an analysis profile is defined. The analysis profile defines an initial number of analysis cycles that will be dedicated to each of a plurality of detectors in an upcoming object detection analysis procedure. The initial number of analysis cycles dedicated to each of the plurality of detectors is preferably an equal distribution of cycles to each of the plurality of detectors, in one approach.

According to preferred embodiments, each analysis cycle corresponds to a particular frame of video data based on timing, but it should be understood that consecutive cycles do not necessarily correspond to consecutive frames of the video data, since a given analysis being performed during a cycle may take an amount of time corresponding to multiple frames to complete. Put another way, each detector is assigned a certain number of "cycles" for each iteration of the analysis (defined by the detectors assigned to analyze the video data). Each cycle initiates with a particular frame of the video stream, but the particular analysis performed during that cycle may take an amount of time corresponding to multiple subsequent frames of the video stream being captured. As such, consecutive "cycles" of the analysis may, but do not necessarily, correspond to consecutive "frames" of the video stream. For instance, if a cycle requires $1/10^{th}$ of a second to complete (three frames, assuming a framerate of 30 fps) and initiates on frame 1, then cycle 2 will initiate on frame 4 of the video data.

More preferably, each detector is independently configured to detect objects using a unique set of parameters. The detectors and characteristics thereof as employed in the context of method 600 may include any combination of features, parameters, limitations, etc. described herein, in various approaches.

Method 600 continues with operation 604, where a plurality of frames of the video data are received. The video data may be received by a processor, memory, etc. of any suitable computing device, preferably a device capable of carrying out method 600 and also the same device that captured the video data. Preferably, the video data depict at least one object sought for detection, but in various embodiments the presently disclosed inventive techniques may be employed to determine when no object is present, e.g. based on the multi-detector returning results indicating low confidence in all detection attempts. In the context of method 600 and the exemplary implementation thereof shown in FIG. 6, the video data preferably depict a plurality of unique objects not capable of facile detection using a single approach or algorithm.

In operation 606, method 600 involves analyzing the plurality of frames using the plurality of detectors and in accordance with the analysis profile. Analyzing the plurality of frames essentially involves performing/applying the respective detection algorithm and particular parameters specified by each individual detector defined/set in the multi-detector, and produces at least one analysis result for each of the plurality of detectors. As noted above, each detector is assigned a number of analysis "cycles" to be performed during each iteration of the overall operation 606. Detectors assigned multiple cycles will produce multiple analysis results, each corresponding to a different frame of the video stream and providing additional information regarding the confidence/robustness of the overall result obtained by analyzing the video data using the particular detector. Again, in various approaches and depending on the amount of time required to apply the algorithm specified by the particular detector, an analysis cycle may correspond to a single frame of video data, or multiple frames of video data. As such, consecutive analysis cycles may, but do not necessarily, correspond to consecutive frames of the video data.

As shown in FIG. 6, method 600 also includes operation 608, in which confidence scores for each analysis result are determined. Confidence may be evaluated in any suitable manner, e.g. as described above with reference to method 500 and FIG. 5.

Based on the confidence scores determined in operation 608, in operation 610 method 600 includes updating the analysis profile. The update essentially involves adjusting the number of analysis cycles dedicated to some or all of the configured detectors so as to improve performance with respect to the current object in a subsequent attempt, or to prepare the detector to detect a new object with potentially different/unique characteristics. In the former case, promoting the detector by increasing the number of analysis cycles may be appropriate, while in the latter case "resetting" the multi-detector by setting each cycle value to or close to the initial, default configuration may be helpful.

Preferably, the adjustments made in operation 610 to the analysis profile: (1) afford additional cycles to detectors having confidence results greater than or equal to a predetermined promotion confidence threshold; and (2) reduce, but never eliminate, a number of analysis cycles for detectors having confidence results less than a predetermined demotion confidence threshold. In one embodiment, detectors having a confidence greater than 80 on a scale from 0 to 100 may be promoted, and detectors having a confidence less than 50 on the same scale may be demoted, although other values may be chosen depending on the nature of the analysis and inherent difficulty in detecting objects of a particular type. For instance, more complex objects that may be less facile to detect may be associated with lower promotion and/or demotion confidence thresholds.

In more approaches, detector promotion/demotion may not be a threshold-based evaluation. For instance, in one embodiment the detector with the highest confidence among all detectors within the given analysis iteration may be promoted, and the detector(s) with the lowest confidence within the given analysis iteration may be demoted. In more embodiments, particularly where scores are computed as a function of historical performance of a detector over time (e.g. for video analysis), the 'score' may be an (optionally weighted) average of the confidences from the detector over some previous sliding window of time. Once the scores are computed based on the historical confidences, the number of analysis cycles assigned to each detector is proportional to its score, in preferred approaches. That is, scores across detectors can be viewed as a histogram, as can the analysis cycles across detectors, and those histograms will be proportional in accordance with preferred embodiments of the presently disclosed inventive concepts.

It is important not to eliminate any given detector from the overall detection process so as to retain the flexibility to detect multiple different objects having potentially drastic differences in visual characteristics. For instance, in the exemplary workflow set forth above, the MICR detector was essentially useless until the camera was positioned in view of the check, but upon such positioning the MICR detector exhibited robust performance and was able to provide a substantial contribution to the confidence of the overall detection result. In similar scenarios a given detector may be suitable only for detecting one of a plurality of object types, but may also be the only detector suitable for detecting such object types. As such, detectors should generally not be excluded from the analysis of the video data, but instead the impact thereof adjusted based on the number of cycles dedicated to detecting an object using the given detector.

In a particularly preferred implementation of method 600, the analyzing, the determining, and the updating are all performed in an iterative fashion until the confidence scores attain stability and do not change by, e.g. ±5% from iteration to iteration, indicating the detection result has achieved optimal outcome. At this time, an image of the object may be captured (i.e. in an operation distinct from the video capture, and/or by designating a given frame of the video data as representative of the object), and displayed on a display, e.g. with a bounding box/border/edge line set overlaying the edges of the detected object. Additionally or alternatively the image may be stored to memory, optionally along with coordinates defining the edge locations for the object depicted in the image. The displayed/stored image may optionally be cropped so as to remove background therefrom as part of the display/storage process.

In addition, after each iteration the confidence scores for each detector and/or corresponding analysis result may be collected and stored in an historical archive. An historical archive allows the use of multiple iterations' confidence scores in making an ultimate prediction as to the location of a given object or edge thereof within the image data. In addition, an historical archive can facilitate the detection of diverse object types by enabling an intelligent "reset" function, trigger, or time period so that objects depicted early in a given video stream do not irrevocably influence the allocation of analysis cycles in a manner optimized for detecting objects of a particular type, to the detriment of detecting other types of objects.

Accordingly, in various approaches method 600 may include storing the confidence score determined for each detector in a historical record. In such instances, the updating of cycles dedicated to each detector is based on confidence scores determined for each of the detectors in a plurality of prior iterations, e.g. a predetermined number of iterations and/or a predetermined amount of time. In one illustrative embodiment, confidence scores for a current iteration may be analyzed in conjunction with confidence scores obtained for the previous 5-10 iterations. In another embodiment, confidence scores from a number of iterations corresponding to passage of an amount of time ranging from about 2 to about 5 seconds may be considered in determining how to adjust cycles for upcoming iterations.

Generally, combining the confidence scores comprises a simple averaging of the scores. In still more approaches, the various confidence scores for different iterations may be weighted and combined according to a weighted average. For instance, confidence scores may be weighted according to chronological proximity to a current iteration, and the weighting preferably is proportional to the chronological proximity of the confidence score to the current iteration. In one embodiment, a most proximate confidence score receives a highest weight.

In one specific implementation, which is to be considered illustrative only and not limiting on the scope of the present disclosure, the confidence scores represent about 50 iterations of analysis by a particular detector, and the weights are assigned to each iteration according to a function $C=1-(i/i_{max})$, where i is the current iteration number, and $i_{max}$ is the total number of iterations taken into consideration for computing the confidence score. In such implementations, each weight is preferably a value in a range from 0 to 1.

As described above with reference to FIG. 5 and method 500, method 600 involves the use of multiple detectors in unison to accomplish an improved detection result. The detectors implemented in the context of method 600 may be substantially the same as those utilized for performing method 500, e.g. color transition, text line, line segment, etc., and may be employed in a particular order and/or using particular parameters, optionally determined based on pre-analyzing the digital video data using a neural network configured to identify the source of the video data (e.g. the type of camera, and intrinsic characteristics such as focal length, resolution, color scheme, etc.).

It should be appreciated that any feature or operation described herein with respect to the general use of a multi-detector to improve object detection may be combined with, integrated into, leveraged by, or utilized in any suitable manner in combination with any of the various other features described herein, including but not limited to particular detector algorithms, pre-cropping, etc. as described herein.

Detector Algorithms

The instant disclosure will now explore various illustrative and definitive aspects of detector algorithms suitable for use in a multi-detector approach as described hereinabove. It should be appreciated that the exemplary detector algorithms described herein are provided by way of example, and are not intended to be limiting on the scope of the present disclosures. Instead, any suitable detection algorithm that would be appreciated by a person having ordinary skill in the art may be utilized in the context of the general multi-detector approach set forth hereinabove. Preferably, such detector algorithms should be capable of accurately and robustly detecting objects of at least one particular type and further are capable of being expressed in terms of a confidence score so as to enable evaluation of performance and adjustment in real-time as-needed under the circumstances of the detection application.

The presently disclosed inventive concepts notably include the use of multiple "detectors" in order to provide robust object detection capability regardless of the source of input image data, and in the presence of various artifacts such as glare, shadows, low-contrast, oversaturation, unexpected target object size, location, orientation, etc. within the image, and/or others described above, in any combination or permutation. The following descriptions set forth several such exemplary detectors, which may be embodied as software, virtual components of a computer system, or any other suitable implementation that would be appreciated by a skilled artisan reading the present disclosure. Moreover, multiple detectors may be utilized in a given detection workflow, possibly including multiple detectors of different types described herein, in addition or alternative to including multiple detectors of the same type, but employing different parameters to detect objects within image data. Any suitable combination of detectors described herein may be employed without departing from the scope of the inventive concepts presented.

Color Transition-Based Detection

Various embodiments of a detector operating on the core principle of detecting transitions in color information within a document will now be described for illustrative purposes. Skilled artisans reading these descriptions should appreciate the exemplary embodiments and configurations set forth herein are provided for demonstrative purposes only, and should not be considered limiting on the scope of the inventive concepts presented herein. Various features disclosed individually with respect to a given color transition detector should be understood as fully compatible with other features disclosed with respect to other color transition detectors, line segment detectors, and/or text line detectors, in various embodiments.

In essence, the color transition detector may be embodied as a semi-supervised, adaptive learning algorithm that operates under two assumptions, the second of which is optional.

The first assumption is that pixels in spatial proximity to four sides/edges of an image correspond to background (in other words, the foreground/object is depicted in the center, and surrounded by background pixels along the edges of the image). In one embodiment, the region around the outer edge of the document assumed to be background may be defined by, or comprise, a corridor approximately 8 pixels wide/tall along the respective edge of the image.

The second (optional) assumption is that the object to be detected within the image is represented by pixels close to the center of the image. Notably, the object need not be constrained to the center, but ideally the center of the image depicts at least a portion of the object. In one embodiment, the "center" of the image comprises at least a region defined by 20% of a total image height, and 20% of a total image width, and is centered within the image both in terms of height and width. Note that in several embodiments this assumption need not be satisfied, and the color transition detector is fully capable of detecting objects not represented within the center of the digital image data, though centrally-located objects are preferred. See further descriptions below regarding the use of inverted color values for an exemplary implementation of color transition detection where the object is not centrally-located within the digital image data.

With these assumptions in mind, and in accordance with one exemplary embodiment, a color (e.g. RGB) input image is received, and the input image is scaled down to a predetermined resolution such as 300×400 pixels. Preferably, downscaling is performed in a manner that preserves the aspect ratio of the original image input into the multi-detector.

Pixels from the outer border region (assumed to be background) are sampled and a representative color profile of the background is compiled based on these sampled pixels. Similarly, pixels within the central region of the image may be sampled and used to generate a representative color profile of the foreground (or object, equivalently).

To account for scenarios in which the object may not necessarily be represented in the central region of the image, the color values for pixels in the center region may be constructed as inverted color values of the background pixels, in one embodiment. In other words, the number of pixels initially selected for the foreground should ideally equal the number of pixels initially selected for the background, and the color values of the foreground pixels are set as the inverse of the background pixel color values, i.e. inverted background color.

Given the assumption that the pixels close to four sides of an image are from the background, the center pixels may be or may not be from a document. A statistical model is adaptively learned by minimizing the potential energy defined in the image. The final segmentation is the solution of the minima of the potential energy. Contour detection is applied to a binary image, the largest contour is the edge of the document, and the four sides of the documents are approximated by lines derived by least squared fitting. In various embodiments, contour detection may be performed using any known technique that a skilled artisan reading these descriptions would consider suitable in the context of the inventive concepts disclosed herein.

In addition to downscaling the image, a color space transformation is preferably applied to adjust for differences in common representations of color in digital format versus human perception of color. Preferably, the color space transformation transforms red-green-blue (RGB) color channel information common to most digital images to a CIELUV color space more representative of human perception of colors. The CIELUV transformation produces a plurality of Luv vectors each modeled as a random vector in the 3D CIELUV color space. In further embodiments, detectors may operate simultaneously on different color spaces to attempt object detection.

For instance, different detectors may be configured to analyze the image data within different color spaces. In one embodiment, a color transition-based detector may operate best on a Luv color space, while a line segment-based detector may operate best on a HSV color space. Other color spaces may be employed in conjunction with these or other detectors, in various embodiments and without departing from the scope of the present descriptions. Accordingly, color space may be an analysis parameter modified during the course of detection using a multi-detector approach as described herein and in accordance with several exemplary embodiments.

Upon transforming the image, and having the representative sampled color profile information available for foreground and background, according to one approach applying the color transition detector involves adaptively learning a statistical model by minimizing the potential energy defined in the image. The final detection result is achieved via finding the solution of the minima of the potential energy. A binary image is generated based on the assignment of various pixels as either foreground or background as given by the solution with the minimum total energy across all pixels in the image, as described in greater detail below (individual pixel energy is defined in equation 2). For instance, in one approach all foreground pixels may be designated white, and all background pixels may be designated black, so as to form the binary image.

In addition, in preferred approaches, contour detection is applied to the binary image. The largest contour in the binary image is defined as the edge of the document, and the sides of the documents are approximated by lines derived by least squared fitting. A detection confidence score is computed with edge strength and shape information. In a particularly preferred embodiment, the data generation for foreground or background samples is dictated by application of multiple Gaussians. A Gaussian density f(x) is defined as follows, where x is a 3D color Luv vector, $\mu$ is the mean vector and $\Sigma$ is a covariance matrix. Each pixel p has a color Luv value, which defines a map from p to x, the map is defined as color (p)=x or shortly denoted as $x_p$:

$$f(x)=|2\pi\Sigma|^{-1/2} \exp(-\frac{1}{2}(x-\mu)'\Sigma^{-1}(x-\mu)) \qquad \text{Eqn. 1:}$$

The number of Gaussians generally depends on the number clusters in the foreground or background images, and ideally is balanced against the acceptable runtime for the analysis, as the number of Gaussians employed is a significant factor in overall computational cost of the color transition-based detection approach. In one embodiment, a Gaussian for modeling foreground pixels is denoted as f(x) and a second Gaussian for modeling background pixels is denoted as g(x), which takes the same form as f(x), but employs different values for the statistical parameters $\Sigma$ and $\mu$. A color vector x at each pixel in foreground image is generated by one of Gaussians, f(x), while a color vector at each pixel in background image is generated by one of Gaussians, g(x). In accordance with this embodiment, the potential energy at each pixel consists of two parts: one is the negative log likelihood of a Gaussian, the other is an interaction energy $\beta$ providing contextual information of neighboring pixels, which describes energy between two adjacent particles (here, pixels). In one embodiment, the contextual information is or corresponds to the color information of neighboring pixels, such as immediately adjacent upper, bottom, left and right neighbor pixels.

The local potential energy at each pixel is defined as:

$$LocalEnergy(x_p) = \qquad \text{Eqn 2}$$
$$SingletonEnergy(x_p) + \sum_{q \in Neighbor(p)} DoubletonEnergy(x_p, x_q)$$

Moreover, the singleton energy and doubleton energy are defined as:

$$SingletonEnergy(x_p)=-\log(PDF(x_p)), \qquad \text{Eqn. 2A.}$$

where PDF(x) is a probability distribution function given by f(x) or g(x); and $$DoubletonEnergy(x,y) \qquad \text{Eqn. 2B.}$$

is defined as $-\beta$ if the y and x values are from the same Gaussian probability density function (PDF), otherwise, the doubleton energy value for (x,y) is $\beta$, $\beta$ describes the interaction energy between two adjacent pixels in terms of a probability of transforming from one color cluster to another when moving from a given pixel to a neighboring adjacent pixel. Accordingly, $\beta$ acts as a penalty value for any transition between two different color clusters exhibited by neighboring pixels. Accordingly, transitions between color clusters occur only if there are significant color differences between two adjacent pixels, due to the influence of $\beta$. $\beta$ is assigned a negative value to describe two adjacent pixels without any such color cluster transition.

Those having ordinary skill in the art will appreciate that, in various embodiments, PDF(x) is a simplified notation referring to a function selected from among a plurality of probability distribution functions. Preferably, PDF(x) is chosen from among a plurality of Gaussians each describing representative foreground or background color within the digital image. Accordingly, for different pixels x, the function PDF(x) may vary without departing from the scope of the presently described inventive concepts. The particular function used for modeling a given pixel x may depend on a final clustering result achieved by an iterative clustering procedure.

In preferred embodiments consistent with the foregoing equations, the doubleton energy represents constraints of a state transition from a foreground pixel to a background pixel. Doubleton energy may also be expressed as log value of such a state transition probability. In particularly preferred embodiments, there are two states: one for foreground, the other is for background. However, skilled artisans will appreciate that additional states and energy functions may be employed without departing from the scope of the present descriptions. For example, in order to distinguish between different types of objects simultaneously present in an image or video stream, one state may correspond to background, a second state may correspond to objects of an undesired type (e.g. an object not sought for detection, such as a face, or particular document type other than a sought document type, such as the lined pages shown in FIG. 3F), and a third state may correspond to objects of a desired type (e.g. the check 302 shown in FIG. 3F).

Of course, other forms of singleton and/or doubleton energy functions can also be defined and implemented without departing from the scope of the presently disclosed inventive color transition detectors.

As described in further detail below, the color transition detection process includes minimizing the total energy of singleton and doubleton functions given the color data derived from the image. Minimizing the energy in such embodiments is equivalent to maximizing the log likelihood of the Gaussian statistical model that was used to generate the image. The model with the optimal parameters is best fitted to the image in terms of maximum likelihood.

The pixel neighborhood employed in conjunction with the foregoing definitions includes all adjacent pixels in each cardinal direction (i.e. immediately adjacent upper, lower, left and right pixels) but not diagonally adjacent neighbors. In alternative approaches, other "neighborhoods" may be employed, such as a neighborhood including only diagonally adjacent pixels, or a neighborhood including cardinally and diagonally adjacent pixels. In one approach, a neighborhood including only cardinally adjacent pixels is preferred for reasons of computational efficiency. In other approaches, neighborhoods including as many pixels as possible (i.e. cardinally and diagonally adjacent) is preferred for maximum data sampling and confidence in the detection result.

As referred to herein, the center is pixel p, and the others are pixel q. The normalization term Z which makes the local probability summation equal 1 is ignored in the above equation. Z is the summation of exp (–LocalEnergy($x_p$)) for all pixels $x_p$ in the image.

In various embodiments, a subset of pixels are initially labeled by default, optionally according to a binary system such that if the label for foreground pixels is 1, the label for background pixels is 0. Given an image, and partial labeling information along the four outer sides of an image as background, and/or the labeling of pixels near the center of the image as foreground, the image segmentation operatively identifies the labels for other un-labeled pixels in a manner substantially as follows.

In preferred approaches, the label learning is a semi-supervised, adaptive, and non-linear process. The objective function is to minimize the total potential energy across the image, which is defined as the sum of all local potential energies defined in Equations 1-2B, above.

The learning process is "semi-supervised" in situations where the only information about labeled data is the pixels close the border, e.g. for scenarios in which a document is not located at or near a central region (e.g. a region occupying about 20% of a central most area) of the image. Since this breaks the convenient assumption that the object is within the central region, foreground labeled data is not available.

The adaptive nature of the label learning process refers to the algorithm's ability to identify unlabeled data, and constantly update the labeled data set for learning.

The label learning process involves selecting or estimating an initial Gaussian model of foreground and/or background pixels from labeled data. For un-labeled pixels, the likelihoods of those pixels are computed using the current iteration's foreground and background models. If a color component vector is assigned a higher likelihood from the foreground model compared with background model, the pixel is labeled as a "likely foreground pixel", otherwise it is labeled as "likely background pixel". The model is then updated with new/modified parameters based on new labeled pixels, and the process repeated iteratively until the model parameters converge. Empirically, convergence to a predetermined threshold epsilon value may be obtained after relatively few, e.g. 4-8, iterations, making the detection process highly efficient and capable of use in real-time on video data as input. As such, the number of iterations required to reach the threshold epsilon value may be used as a convergence criterion, in various embodiments.

Upon obtaining a predicted edge location based on the labeling (foreground/background) of individual pixels under the stable, convergent model, a segmentation confidence score is computed using edge strength and shape information.

In various embodiments, for instance, confidence scores may be computed based on edge strength, angles of adjacent sides of a polygon, angles between opposite sides of a polygon, and/or color/texture contrast between foreground and background of an image.

First, regarding edge strength confidence, this measure is applicable in situations where edges of the object are not necessarily straight lines, and may even follow an irregular path such as a stochastic zig-zag pattern. In such cases, a sum of the pixels forming the edge are counted, and a ratio between this number of edge pixels and a total number of pixels included in a bounding box calculated surrounding the edge forms the confidence score. The closer the ratio is to unity, the higher the confidence in the particular edge.

Similarly, angle confidences may be calculated based on deviations from an expected angle formed between two adjacent, or even opposite, sides of polygon. In the simple case of a tetragon corresponding to a rectangular object, angle confidence may be measured in accordance to a deviation from right angles between adjacent sides of the tetragon. If the angles between adjacent sides deviate from 90 degrees, but do so in a manner that is a valid three-dimensional projection of a rectangle (e.g. as shown in FIG. 3D), then the confidence in the predicted tetragon is high.

For instance, in embodiments operating on input image data from a traditional scanner, MFP, or the like where perspective distortions and warping effects are not expected to be present, the tolerable angle range between two side is in a range from about 85 degrees to about 95 degrees, preferably a range from about 87.5 degrees to about 92.5 degrees, and most preferably in a range from about 88 degrees to about 92 degrees, i.e., 2 degree variation.

On the other hand, for embodiments where input image data were captured using a camera, and thus perspective distortion and/or warping effects are expected, the tolerable angle range is preferably in a range from about 60 degrees to about 120 degrees, more preferably in a range from about 70 degrees to about 110 degrees, and most preferably in a range from about 75 degrees to about 105 degrees.

In still more embodiments, angles between two opposite corners of a polygon, preferably a tetragon, may be evaluated and a sum thereof calculated. Tolerable sums of opposite angles of a tetragon are in a range from about 150 degrees to about 210 degrees, preferably a range from about 160 degrees to about 200 degrees, and most preferably in a range from about 165 degrees to about 195 degrees.

It should be understood that each of the foregoing ranges is described as an inclusive range, such that values falling on the endpoints of the ranges are considered within the range.

Upon evaluating the appropriate angles, a confidence value for the corner(s) is assigned a value of 1 (on a 0.0-1.0 scale or a 0-100 scale, equivalently) if an angle (or sum thereof) is in within the stated tolerable range, otherwise the confidence of the corner is assigned a value of zero.

With respect to computation and use of confidence scores based on contrast between the image foreground (detected object) and background, for objects exhibiting a substantially uniform color or images having a substantially uniform background color profile, the contrast of foreground and background may be determined by comparing the difference between foreground color and background color one or more in color spaces (e.g. RGB, CIELUV, CMYK, etc.).

However for objects and image backgrounds with complex texture or colors, it is more difficult to measure the contrast. In one approach, a pixel located proximate to a projected object edge location, e.g., within a corridor or a region close to the object, is selected and compared against the contrast of the object portion of the image and the background portion of the image within the corridor/region close to the object.

For instance, in one embodiment the confidence score may be based on color or texture changes from foreground to background pixels. The first task is to identify locations of transitions from foreground and background. The statistical model learned from the image may be used to detect the locations, as described hereinabove with reference to color transition detection. The features for the statistical model consist of color and texture information.

When the locations are identified, the candidate edges of the object are subjected to a fitness analysis, e.g. for a rectangular object the candidate edges are fitted by a regression algorithm such as a least mean squares (LMS) approach. For each side, a corridor is formed. One simple way to compute the confidence for this side is to count how many foreground pixels are present in this corridor. In this approach, the candidate edge pixels are labeled by the statistical segmentation model which uses color and texture information, in one approach.

Another option is to build a new statistical segmentation model which uses image data in the defined corridor to refine the original segmentation model. Of course, skilled artisans reading the present descriptions will appreciate the foregoing are only exemplary approaches to compute the confidence score based on image contrast in color or textured images/image data.

Under varied illumination (e.g. oversaturation/undersaturation) and/or low contrast conditions, estimating the contrast without knowing the location of the object within the image data is a particular challenge. One indirect way to measure the contrast is to evaluate edge confidence scores, where a higher edge confidence score value indicates a high contrast between the background and foreground.

Figure 7:
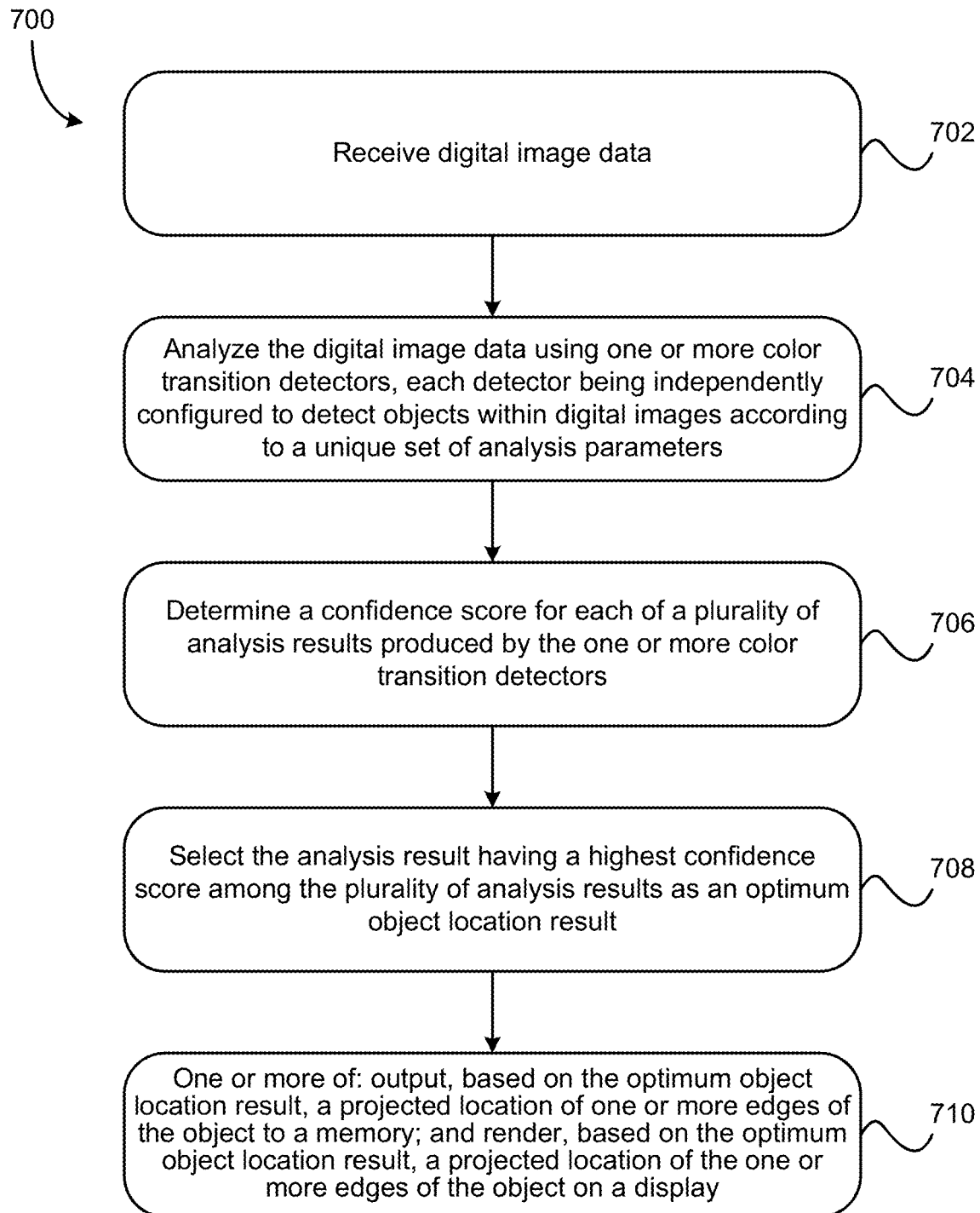
FIG. 7 is a flowchart of a method for detecting objects according to color information, according to one embodiment.

Accordingly, commensurate with the foregoing general descriptions of color transition-based detection, and in accordance with several illustrative embodiments of the presently disclosed inventive concepts, exemplary approaches to color transition-based detection are shown in FIG. 7, and described below with reference to method 700. The method 700 may be performed in any suitable environment, including those shown in FIGS. 1-4B, among others. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), a graphics processing unit (GPU), an application specific integrated circuit (ASIC), a field programmable gate array (FPGA), etc., combinations thereof, or any other suitable computing device known in the art.

As shown in FIG. 7, method 700 may initiate with operation 702, where digital image data are received. The image data may or may not depict an object sought for detection, but preferably do depict such an object. The image data may be received directly from a capture device, e.g. a flat-bed scanner, multifunction printer, camera of a mobile device, webcam, video camera, or any suitable capture device as known in the art. Indeed, the presently disclosed inventive techniques advantageously are capable of robust processing of digital image data regardless of source and unique challenges associated therewith.

Method 700 further includes operation 704, in which the digital image data are analyzed using one or more color transition detectors. Each detector is independently configured to detect objects within digital image data according to a unique set of analysis parameters. Broadly, the parameters may define the type of features the detector seeks to locate as indicative of presence of an object, such as color transitions, line segments, text lines, etc. However, different detectors may also be configured to seek essentially the same type of features, but using different parameters (e.g. parameters with different values that slacken or tighten the constraints by which a given detector will predict/indicate the presence of an object, or edge thereof, such as different constraints on defining adjacent characters as belonging to a same string of characters, or adjacent pixels as belonging to a same connected component, in various illustrative embodiments). Any difference between two given detectors is sufficient to consider the detectors separate analytical tools/processes. It should be understood that any of the analysis parameters described herein may be employed in the context of methods 700, without departing from the scope of the present disclosure.

In preferred approaches, the analysis parameters employed in the context of method 700 include one or more parameters selected from: a number of analysis iterations to perform, a downscaling target size, a downscaling target aspect ratio, a background margin size, a foreground size ratio, a number of foreground Gaussians, a number of background Gaussians, an overall energy threshold, a number of iterations in which to apply the Gaussian(s); and/or a relative area ratio, in any suitable combination.

Of course, method 700 may include one or more of selecting and parameterizing the one or more detectors based at least in part on a determined source of the digital image data. For instance, parameters known to work best on scanned image data may be selected, or parameters known to work best on camera-captured image data may be selected, depending on the determined source.

In operation 706, a confidence score for each of a plurality of analysis results produced by the one or more color transition detectors is determined. The confidence score may be computed using any technique described herein, and may include computing confidence scores for the analysis result(s) individually, in combination, or even computing confidence scores for only portions of a given analysis result (e.g.

scores for each edge, corner, etc. which may be combined to produce an overall higher confidence result, as detailed hereinabove).

With continuing reference to FIG. 7, operation 708 of method 700 involves selecting the analysis result having a highest confidence score among the plurality of analysis results as an optimum object location result. As noted above with regard to operation 706 and computing confidence scores, in some approaches determining the result with the highest confidence score may involve combining individual confidence scores for portions of the digital image data, or even optionally combining multiple analysis results to achieve a higher confidence score for the overall detection result.

Upon selecting the optimum object location result, in operation 710 the result is used to output to memory, and/or render on an appropriate display, a projected location of the one or more edges of the object. This projection may take the form of 2D pixel coordinates of corners and/or edge pixels within the digital image data, a bounding box displayed in a particular color on the display, etc. as would be appreciated by persons having ordinary skill in the art upon reading the present descriptions.

Of course, in various embodiments, method 700 may include additional and/or alternative operations and/or features beyond those described above and shown in FIG. 7, without departing from the scope of the present disclosures.

For instance, in one approach, no portion of the object is present within a central area of the digital image, where the central area comprises approximately 20% of a total area of the digital image surrounding a central-most pixel of the digital image. In this manner, embodiments of the presently disclosed inventive detection algorithms overcome a common problem associated with conventional detection techniques which rely on the assumption that the object sought for detection is in the central area of the image (i.e. is the "focus" of the image).

In more approaches, method 700 may include cropping the digital image data to exclude background therefrom, the cropping being based on the projected location of the one or more edges of the object. Cropping, in the context of method 700, may include excising a rectangular portion of the received image data that depicts only the object sought for detection, equivalently removing portions of the received image data outside the projected location of the one or more edges of the object, and/or transforming the portion of the image data within the projected location of the one or more edges of the object so as to fit a predetermined shape, such as a rectangle. Transformations may generally include perspective transform techniques such as described and referenced hereinabove, in various approaches.

In particularly preferred approaches, method 700 may further include, e.g. as part of the analysis, utilizing one or more text line detectors to generate an initial prediction of the projected location of the one or more edges of the object. This text-line based detection is more computationally efficient than analyzing an entire image using a color transition detector, but performs less well in terms of accurately and precisely identifying object edge locations. However, using text-line detection as an initial pass to define/refine the search area within which to apply a color transition detector can significantly reduce computational cost of detection overall, while also increasing the precision and accuracy of edge detection. Accordingly, analyzing the digital image data using the one or more color transition detectors may be performed within one or more regions of the digital image data defined by the initial prediction accomplished using the one or more text line detectors, the one or more regions excluding at least a portion of the digital image data.

In a similar vein, and optionally in combination with text-line detection, in several approaches method 700 may include applying one or more pre-cropping algorithms to the digital image data prior to analyzing the digital image data. Applying the one or more pre-cropping algorithms effectively reduces background noise represented in the digital image data by excluding outer border regions of the digital image data from the analysis. Accordingly, this pre-cropping may also serve to refine the search area, while improving the computational efficiency and quality of edge detection overall.

In some approaches of method 700 analyzing the digital image may include transforming the digital image data from a native color space to a second color space, or multiple other color spaces. As referenced hereinabove, multiple color spaces may be analyzed simultaneously to improve robustness of the overall detection result, and/or different color spaces may be implemented in conjunction with different detectors and/or based on the source of the image data to optimize the multi-detector overall performance.

As described in greater detail above, in preferred embodiments method 700 includes, as part of the analysis of the digital image data, adaptively learning a statistical model descriptive of color transitions between adjacent pixels in the digital image data, the statistical model describing the color transitions in terms of an energy function; minimizing the energy function across all pixels in the digital image data; and designating each of the pixels in the digital image data as either a foreground pixel or a background pixel based on the minimized energy function.

Notably, method 700 may additionally include computing confidence scores for the projected edges of the object. Preferably, the confidence score is based at least in part on one or more of: an edge strength of each of the one or more edges of the object; a value of one or more angles formed between adjacent of the one or more edges of the object; a sum of two angles formed by opposite corners of a polygon representing the object; and a color contrast between a foreground of the digital image data and a background of the digital image data.

Figure 10:
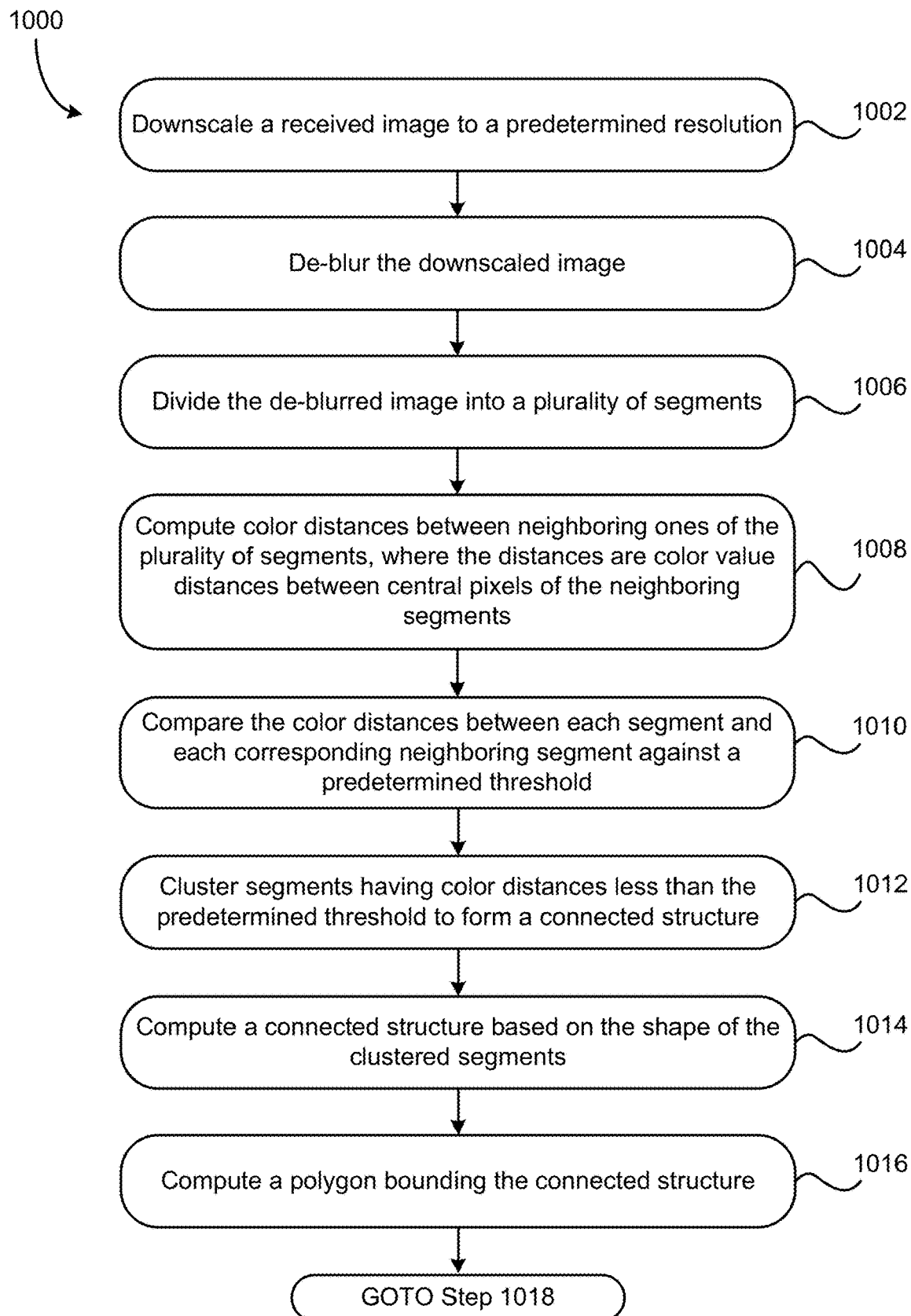
FIG. 10 is a flowchart of a method for pre-cropping digital image data depicting an object so as to reduce the amount of background in the pre-cropped digital image, according to one embodiment.
Figure 10:
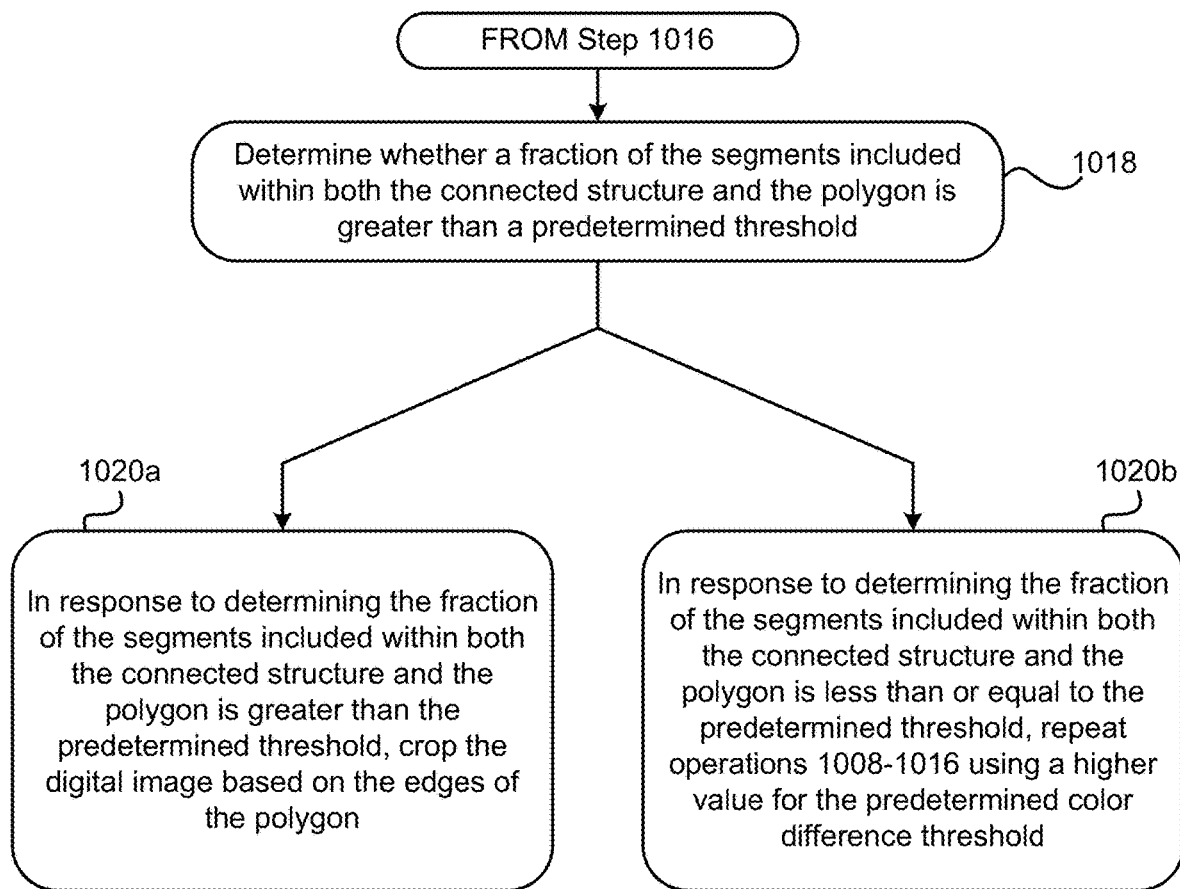

Of course, method 700 may include any combination of the foregoing features/operations, as well as additional or alternative features described generally with respect to a multi-detector as set forth above and represented in FIGS. 5-6 and 10, particularly concerning real-time detection of objects within video data per method 600.

Figure 8:
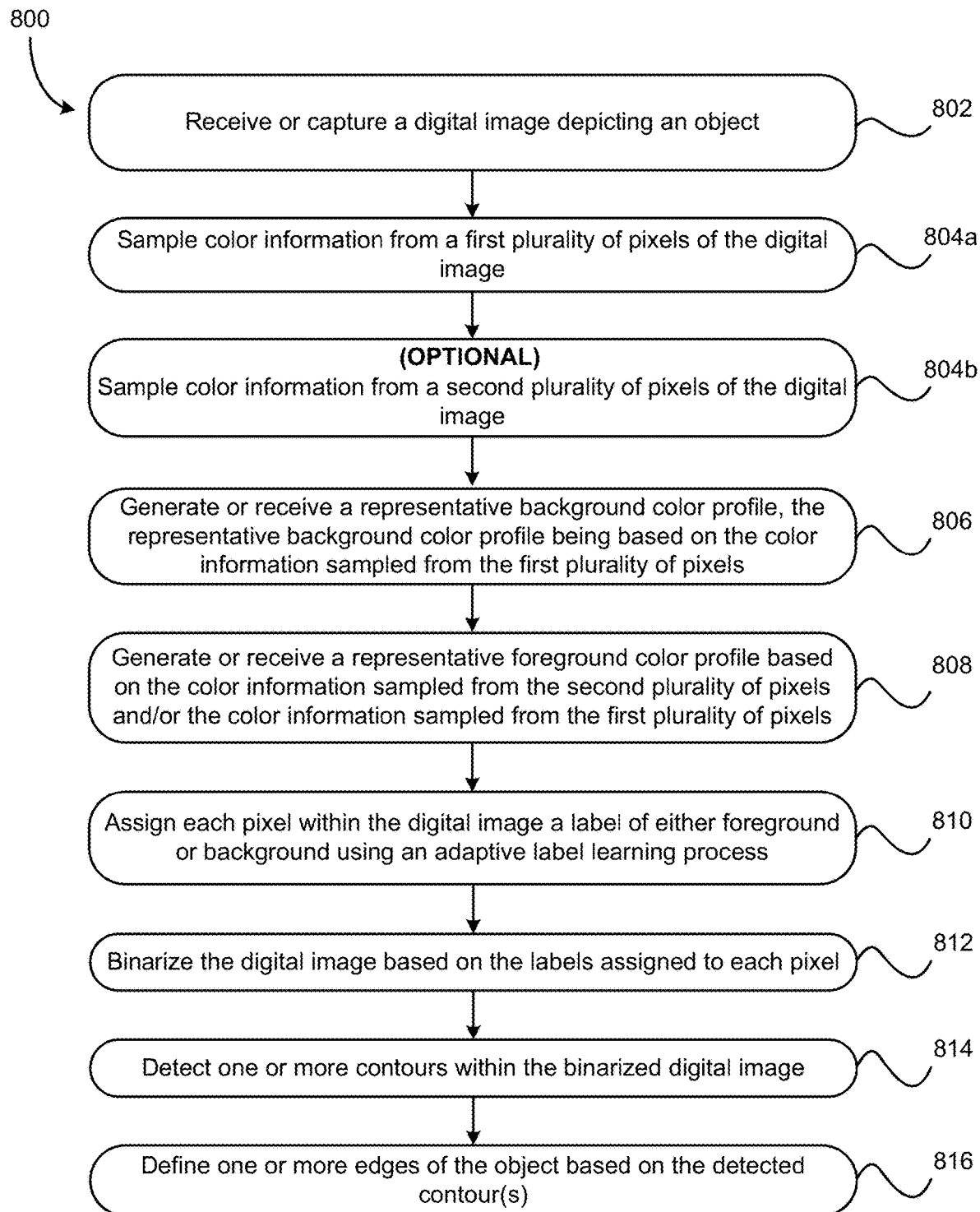
FIG. 8 is a flowchart of a method for detecting objects within digital image data based at least in part on color transitions within the digital image data.

In still more approaches, a method 800 of detecting objects within digital image data based at least in part on color transitions within the digital image data is shown in FIG. 8, according to one embodiment. Of course, more or less operations than those specifically described in FIG. 7 may be included in method 800, as would be understood by one of skill in the art upon reading the present descriptions.

Each of the steps of the method 800 may be performed by any suitable component of the operating environment. For example, in various embodiments, the method 700 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), a graphics processing unit (GPU), an application specific integrated circuit (ASIC), a field programmable gate array (FPGA), etc., combinations thereof, or any other suitable computing device known in the art.

In accordance with the embodiment of FIG. 8, method 800 includes operation 802, where a digital image depicting an object is received, or captured. The digital image may be captured in any suitable format, and preferably is a color image.

Operation 804a of method 800 involves sampling color information from a first plurality of pixels of the digital image, and optional operation 804b involves optionally sampling color information from a second plurality of pixels of the digital image. Each of the first plurality of pixels is located in a background region of the digital image, while each of the second plurality of pixels is located in a foreground region of the digital image. As described in greater detail above, the sampled color information is preferably representative of the background or foreground, respectively. However, only the background color information is necessary, as in some embodiments color of the foreground may be estimated or inferred by inverting color of the background, essentially defining two zones within the image: background and "not-background" (equivalent to foreground for purposes of various embodiments the inventive concepts described herein).

With continuing reference to method 800 and FIG. 8, operation 806 includes generating or receiving a representative background color profile. The representative background color profile is based on the color information sampled from the first plurality of pixels.

Similarly, operation 808 includes generating or receiving a representative foreground color profile based on the color information sampled from the second plurality of pixels and/or the color information sampled from the first plurality of pixels. Where the representative foreground color profile is based on the color information sampled from the second plurality of pixels, the representative foreground color profile truly represents foreground element(s) within the digital image. On the other hand, the color information from the second plurality of pixels may not be available, in which case the representative foreground color profile is based on the color information sampled from the first plurality of pixels, and preferably in based on inverted values of the color information sampled from the first plurality of pixels. In this way, the representative foreground color profile is essentially a "not background" region, which also serves to distinguish from background pixels and is effective for locating object edges in accordance with the presently described inventive concepts.

Each pixel within the digital image is assigned a label of either foreground or background using an adaptive label learning process in operation 810. The adaptive label learning process is capable of identifying unlabeled data, and updating the labeled data set for further learning. As described in greater detail above, the adaptive label learning process essentially seeks to classify each pixel as either foreground or background such that the image may be binarized and edges identified therein.

Accordingly, method 800 also includes binarizing the digital image in operation 812. The binary value assigned to each pixel is based on the respective labels assigned to the pixels, e.g. foreground pixels may be assigned a value of one and background pixels a value of zero.

Contour detection is performed on the binarized image data in operation 814, and candidate edges are evaluated from the identified contours. Preferably, a largest (longest) among the identified contours is chosen as a first edge of the object, and additional edges are sought via statistical approximation such as least mean squares (LMS) fitting, particularly for polygonal objects, and especially four-sided objects such as documents. The contour detection technique invoked to identify the contours within the binarized image may be any suitable contour detection technique known to those having ordinary skill in the art.

In operation 816, method 800 includes defining edge(s) of the object based on the detected contours. As noted above, the edges may be defined based on a result of the statistical approximation, such as LMS fitting.

In various approaches, method 800 may additionally or alternatively include any combination, permutation, selection, etc. of the following features, operations, etc. without departing from the scope of the inventive concepts presented herein.

In one embodiment, method 800 may include computing a segmentation confidence score for the defined edge(s) of the object. The segmentation confidence score may be computed using one or more measures selected from the group consisting of: edge strength, angle between adjacent edges of the object, angle between opposite edges of the object, color contrast between foreground and background of the image, a least mean squares fitness, and combinations thereof.

Method 800 is preferably performed on image data in which the object is surrounded by either at least 2 rows of background pixels or at least 2 columns of background pixels on each side, such that the pixels from which color information is sampled for determining the representative background color profile truly represent the background of the image. Further, where the object is located centrally within the digital image, detection thereof is simplified. Most preferably, the object occupies at least 20% of a total area of the digital image and is located substantially in the center of the digital image.

Referring now to the adaptive label learning process invoked in operation 810, notably the process may include selecting or estimating at least one initial Gaussian model of the representative foreground color profile and/or the representative background color profile; and performing a maximum likelihood analysis of un-labeled pixels of the digital image using the at least one initial Gaussian model, according to preferred embodiments.

The maximum likelihood analysis ideally includes minimizing a total potential energy across all pixels within the digital image based on the representative foreground color profile and the representative background color profile. According to such approaches, a potential energy of each pixel is defined by: a negative log likelihood of a Gaussian model; and an interaction energy $\beta$ describing a probability of adjacent pixels exhibiting a transition from one color to another.

In one exemplary embodiment, the potential energy of each pixel may be defined according to equation 2, above, where the SingletonEnergy($x_p$) is defined as $-\log(PDF(x_p))$; PDF(x) is a probability distribution function; and the DoubletonEnergy(x,y) is defined as either $-\beta$ or $\beta$. Most preferably, the probability distribution function PDF(x) is defined as $f(x)=|2\pi\Sigma|^{-1/2}\exp(-\frac{1}{2}(x-\mu)'\Sigma^{-1}(x-\mu))$, where x is a 3D color Luv vector, $\mu$ is a mean vector; and $\Sigma$ is a covariance matrix. The values of $\mu$ and $\Sigma$ may be different for $\beta$ than for $-\beta$.

Furthermore, in various approaches the adaptive learning process may be iterative, and for each iteration of the adaptive learning process, one or more Gaussian models of the representative foreground color profile and/or the representative background color profile is/are updated based on labels assigned to pixels in an immediately previous iteration of the adaptive learning process. For the first iteration of the process, the Gaussian models may be based on the representative foreground color profile and/or the representative background color profile sampled from the digital image.

Accordingly, in one preferred approach the adaptive label learning process comprises: selecting or estimating at least one initial Gaussian model of the representative foreground color profile and/or the representative background color profile; and performing a maximum likelihood analysis of un-labeled pixels of the digital image using the at least one initial Gaussian model.

Further still, the adaptive label learning process is preferably performed until parameters of the Gaussian model(s) achieve convergence, e.g. as measured or determined based on a predetermined threshold epsilon convergence value. In various embodiments, the number of iterations required to achieve the threshold epsilon value may be used as a convergence criterion. Empirically, the inventors have discovered that when using a single predetermined epsilon value, the Gaussian parameters achieve convergence in about 4 to about 8 iterations of the adaptive label learning process.

An exemplary implementation of method 800 may include performing a color space transformation on the digital image. The color space transformation may involve a RGB to CIELUV transformation, or a transformation from any color space represented in the digital image to CIELUV, in various embodiments. Moreover, the color space transformation preferably produces a plurality of Luv vectors; and each Luv vector is modeled as a random vector in a 3D CIELUV color space.

Of course, method 800 may include any combination of the foregoing features/operations, as well as additional or alternative features described generally with respect to a multi-detector as set forth above and represented in FIGS. 5-6 and 10, particularly concerning real-time detection of objects within video data per method 600.

Line Segment-Based Detection

We turn now to detectors that operate based primarily on detection and clustering of line segments to project the location of edges/boundaries between an image background and the foreground or object sought for detection. Generally speaking, the inventive line segment-based detection described herein is preferably implemented as a cascaded process. In each level of the cascade, multiple line or line segments are searched for within an image. Multiple images having different resolutions may be generated and analyzed in accordance with various embodiments of the presently disclosed line segment-based detection algorithms.

Generally, line segments are adaptively detected and tracked within an image. The sides of an object, e.g. for a document four sides, are determined by ranking all appropriate polygonal (e.g. tetragonal for a document) candidates with confidence scores. The confidence scores are measured by accumulating evidence of line segments close to an edge.

More specifically, and in accordance with a preferred embodiment of line segment detection as described herein, an input image is binarized using multiple binarization thresholds, at least one of which is adaptively determined from the image. The adaptively determined threshold may be, or may be calculated based on, the mean and variance of the edge image prior to applying the binarization thresholds thereto, in accordance with one embodiment.

These thresholded images may be utilized to generate an "edge image" representing gradients derived from the original, color image, and line segments are detected from within the edge image so as to generate a set of candidate edges based on clustering of the detected segments.

With continuing reference to the preferred embodiment of line segment detection, an edge image is extracted from a color image. This involves pre-processing the color image to generate amplitude values of a gradient at each pixel, as well as an orientation of the gradient at each pixel. The orientation of the gradient is represented by a two-dimensional unit vector. Binary images are derived from the edge image by thresholding according to the amplitude and/or orientation of the gradient, i.e. in one embodiment if the amplitude value of the gradient at a pixel is above a predetermined threshold or an adaptively determined threshold as described above, the pixel is labeled as a candidate edge pixel, and otherwise the pixel is labeled as a background pixel. All candidate edge pixels are preferably utilized to identify line segments within the edge image. Notably, the thresholds utilized in generating the binary images are in the form of angles (for gradient orientation evaluation) and amplitudes (for gradient amplitude evaluation). In one approach, a threshold for gradient amplitude may be determined based on the span (or range) of the amplitude values for line segments predicted in the edge image. The output of the binarization process is a set of candidate edge pixels and respective 2-dimensional pixel locations within the image.

Upon completing the foregoing pre-processing, line segment detection begins in earnest, and operates on the same gradient orientation and magnitude information referenced above to identify the candidate edge pixels. In one particularly preferred approach, line segment detection proceeds substantially as follows.

First, a candidate edge pixel is selected, e.g. arbitrarily, at random, based on a predetermined sequence, etc. in various embodiments and as would be understood by a person having ordinary skill in the art upon reading the present descriptions, from among the set of candidate edge pixels to serve as an initial pixel, and set an initial line segment set using the selected candidate edge pixel. Note that additional candidate edge pixels may be included in the line segment set in subsequent operations and/or iterations of the line segment detection process. For instance, in one embodiment eight "neighbor pixels" surrounding the initial pixel (or in subsequent iterations, current pixel) are evaluated with respect to gradient orientation. If a neighboring pixel has approximately a same gradient orientation with that of the initial/current pixel, this neighboring pixel is added into the line segment set, and is labeled as "visited". This procedure is applied recursively, until such time as no further neighboring pixels satisfy the inclusion criterion.

Note that the measurement to see if a pixel has approximate same gradient orientation with that of the initial pixel is preferably a similarity of those two gradients, i.e., mathematically, it is defined as the dot product of the two unit 2D vectors of those two gradients. If the similarity is above a predetermined threshold, those two pixels have approximately the same orientation and are considered part of the same line segment set. For instance, in one embodiment the threshold value is given by a function cos(t), where t is the value of the angle(s) deviation from normal, e.g. ninety degrees in the case of a rectangular object. In one approach, a threshold value of cos(t) corresponding to an angular deviation of about 2 degrees or less may be employed, particularly for image data generated by a scanner or MFP, while in more approaches a threshold value of cos(t) corresponding to an angular deviation of about 5 degrees or less may be employed, particularly for image data generated by a camera.

Upon completion of the neighbor-clustering process, the set of pixels clustered thereby define a "line segment set," and pixels in the line segment set are used to estimate the start and end points of a line segment.

In one embodiment, identification/estimation of the start and end points of line segments involves applying a principal component analysis (PCA) to the line segment set, and an identifying/calculating an eigenvector corresponding to the maximum eigenvalue as the principal axis of the line segment, while the eigenvector corresponding to the smallest eigenvalue is taken as the normal direction of the line segment.

After the line segment direction is computed, all pixels are projected along this direction, and the start and end points of the line segment are identified as the two points with the longest distance. Note that the line segment passes through the center of the line segment, which is computed as the average of those pixels in the line segment set.

To define additional line segment sets, candidate edge pixels which were not evaluated (i.e. those not labeled "visited" during the initial recursive search), the search algorithm is applied again with a new initial candidate edge pixel in order to find a new line segment set. This process of identifying an initial candidate edge pixel, recursively building a line segment set therefrom based on neighbor clustering, and selection of new "initial" candidate edge pixels continues until all candidate edge pixels are evaluated (i.e. until all pixels in the candidate edge set are labeled "visited").

In accordance with one exemplary embodiment of the foregoing line segment detection procedure, an input image is represented by FIG. 4A, while the corresponding output of predicted line segments is shown in FIG. 4B. Note that the line segment prediction may be confused by the presence of artifacts such as shadows 404, 406, as well as glare and/or textures (folds, ridges) in the background of the image, such as shown in region 408. In FIG. 4B, a plethora of line segments that do not correspond to edges of the object 302 are generated based on these artifacts. In order to minimize the impact of such artifacts, multiple binary images may be generated using different gradient amplitude and/or orientation thresholds, and different line segment sets generated for each image. For example, to exclude outliers, the intersect of line segment sets across multiple binary renderings of a single input color image may be used as a candidate edge line segment set, in one approach.

In a similar manner, line segment-based detection may be complemented by other detection techniques which do not rely on identification of edge candidates based on gradient analysis, such as text line detection, and the results may be combined to accomplish a higher-confidence overall detection result, as described in greater detail hereinabove.

With continuing reference to line segment-based detection, upon generating a candidate edge line segment set, a polygon corresponding to an expected shape of the object sought for detection may be determined from the line segments. For instance, in the case of a document the polygon may be a quadrilateral, or tetragon. In various embodiments, two-dimensional or three-dimensional polygons may be assumed as the corresponding shape and utilized to facilitate object detection without departing from the scope of the present disclosure. While the following descriptions are provided in the context of a document or other four-sided object, it should be understood that the general principles may be adapted to operate on other polygons in the context of the inventive concepts presented herein.

With continuing reference to FIGS. 4A-4B, the shape of the four boundaries of a document is a tetragon/quadrilateral. Line segments detected by the line segment detection algorithm described above form small fragments of overall line segments corresponding to object boundaries, lines within the object, etc.

As shown in FIG. 4B, the detected line segments along the right boundary of the document consist of broken segments, and should be grouped as one line segment. In order to group line segments located on one line, a line segments clustering algorithm is applied.

While any clustering algorithm that would be considered suitable by a person having ordinary skill in the art after reviewing the instant disclosure may be employed without departing from the scope of the inventive concepts presented herein, in several embodiments a brute-force approach for clustering line segments may be employed. The clustering may be based on evaluating a distance margin between adjacent segments, a distance margin between non-adjacent segments, an overall segment distance, or any other suitable criterion such as fitness to a regression curve, minimum segment length, etc. as would be appreciated by a skilled artisan reading the present descriptions.

In cases where a line segment-based detector is seeking a single "proposed" line, the detector may proceed by attempting to identify all line segments close to this proposed line, for example if the minimum of distances of the start and end points of the line segments are within a predetermined margin threshold relative to the line, the line segment in question is grouped into the candidate line segment set, or line group. The process iterates until no new line segments are found. In this way, all line segments close to the line are identified as one group. For low resolution images, the threshold may be predefined as a value of about 2 pixels, while for high resolution images, the threshold may be predefined as a value of about 8 pixels or more, in one exemplary embodiment.

In more embodiments, given another "proposed" line, the foregoing approach may be employed to find all line segments close to this new given line, and again the process may be performed iteratively for each new line until all suitable line segment candidate sets are identified.

A proposed line can be found/defined from among the set of all line segment candidates, e.g. using a Hough line detection algorithm, in one approach.

With continuing reference to the distance margin based clustering, in one embodiment a pixel distance between an endpoint of a first segment and a start point of a second, adjacent segment may be determined. In response to determining the distance is less than a predetermined distance threshold, e.g. 1.5 pixels, the first and second segment may be determined to belong to a same cluster and grouped together. This process may proceed until all appropriate adjacent clusters are grouped, and an overall edge prediction determined based thereon.

In various embodiments, the predetermined distance threshold may vary depending on the resolution of the image. For instance, for a low resolution image (e.g. from about 256×256 to about 640×640 pixels, preferably about 490×490 pixels), a default distance threshold may be in a range from about 1.5 pixels to about 3.5 pixels, or any value therebetween, while for a mid-resolution image (e.g. from about 640×640 pixels to about 1024×1024 pixels, preferably about 864×864 pixels) a default distance threshold may be in a range from about 2.6 pixels to about 6.2 pixels, and for a high resolution image (1024×1024 pixels or above, preferably 1120×1120 pixels or above) a default distance threshold may be in a range from about 3.4 pixels to about 8 pixels. Each of the foregoing exemplary distance threshold values and ranges set forth above were determined empirically determined using sample images.

In another embodiment, distances between two line segments (as opposed to between start and end points thereof) may be determined, and compared to a predetermined minimum distance threshold. In response to determining the segments have a distance less than the threshold, the segments may be grouped into a cluster for purposes of subsequent edge position projection. For example, in one embodiment the distance between two line segments may be measured by computing the maximum projection distance of all points on a first line segment to the corresponding points of another line segment. This distance can be derived as the maximum projection distance of the start and end point of a line segment to the other line segment.

After grouping of broken line segments, an algorithm is employed to search for the best quadrilateral of the documents by evaluating all possible quadrilaterals that the grouped line segments can form, for instance based on calculating edge locations and/or intersections therebetween according to various polynomial expressions of different degree, e.g. as described in U.S. Pat. No. 8,855,375, granted Oct. 7, 2014 and entitled "Systems and Methods for Mobile Image Capture and Processing". Quadrilaterals, in various embodiments, may be formed based on identifying line segments in close proximity to a proposed line as described hereinabove. A regression algorithm or other suitable equivalent thereof may be applied to the set of line segments to define the location of the respective edge of the quadrilateral.

In order to rank quadrilaterals, the number of candidate edge pixels projected along the four sides of a quadrilateral are computed. The best quadrilateral is the one whose edges include the largest number of projected candidate pixels determined from analyzing the binarized images and generating the line segment sets. In one approach, in order to count the projected candidate edge pixels along each side of a quadrilateral, the pixels of a line segment are projected onto the side of a quadrilateral.

In addition, two approaches of computing the confidence scores of each side of the polygon (four sides of the quadrilateral) are preferably applied in concert to best evaluate the overall confidence in the predicted polygon. In one embodiment, a first approach to evaluating confidence employs the absolute value of the number of candidate edge pixels projected along a given side of the polygon. In a second approach, the relative value, i.e., a ratio of the number of candidate edge pixels projected along a given side of the polygon to the total number of pixels on the given side is employed. Both methods are preferably implemented, and in particularly preferred embodiments the "absolute" confidence value is used in ranking quadrilaterals, afterwards, a "relative" confidence is also evaluated to "double-check" the validity of the estimation.

In particularly preferred embodiments, the foregoing line segment detection process is performed in a multi-pass procedure so as to increase recall. The multi-pass procedure is implemented as a cascaded process.

In each stage, multiple detectors (e.g. implementations of the neighbor pixel clustering using different thresholds) are employed, and if none detect an object of the expected characteristics, the multi-pass procedure proceeds to the next stage. In the next stage, more line segments or line hypothesis are generated by relaxing the thresholds. This procedure is repeated until sufficient candidates are obtained to estimate an appropriate polygon.

In the particular case of enveloped objects, such as laminated documents, the first pass is to detection a candidate polygon. If a suitable polygon is detected, the edges of the polygon are preferably extended into a corridor region of the image, e.g. a region corresponding to about 10% of a maximum detected polygon length and width. In the second pass, the corridor region is searched to find additional edge candidates using the line segment detection process described hereinabove.

In addition, multiple resolution images such as low resolution, middle resolution and high resolution are generated. The tetragon search algorithm is applied to all images in different resolutions to further improve robustness and confidence of the ultimate detection result.

Figure 9:
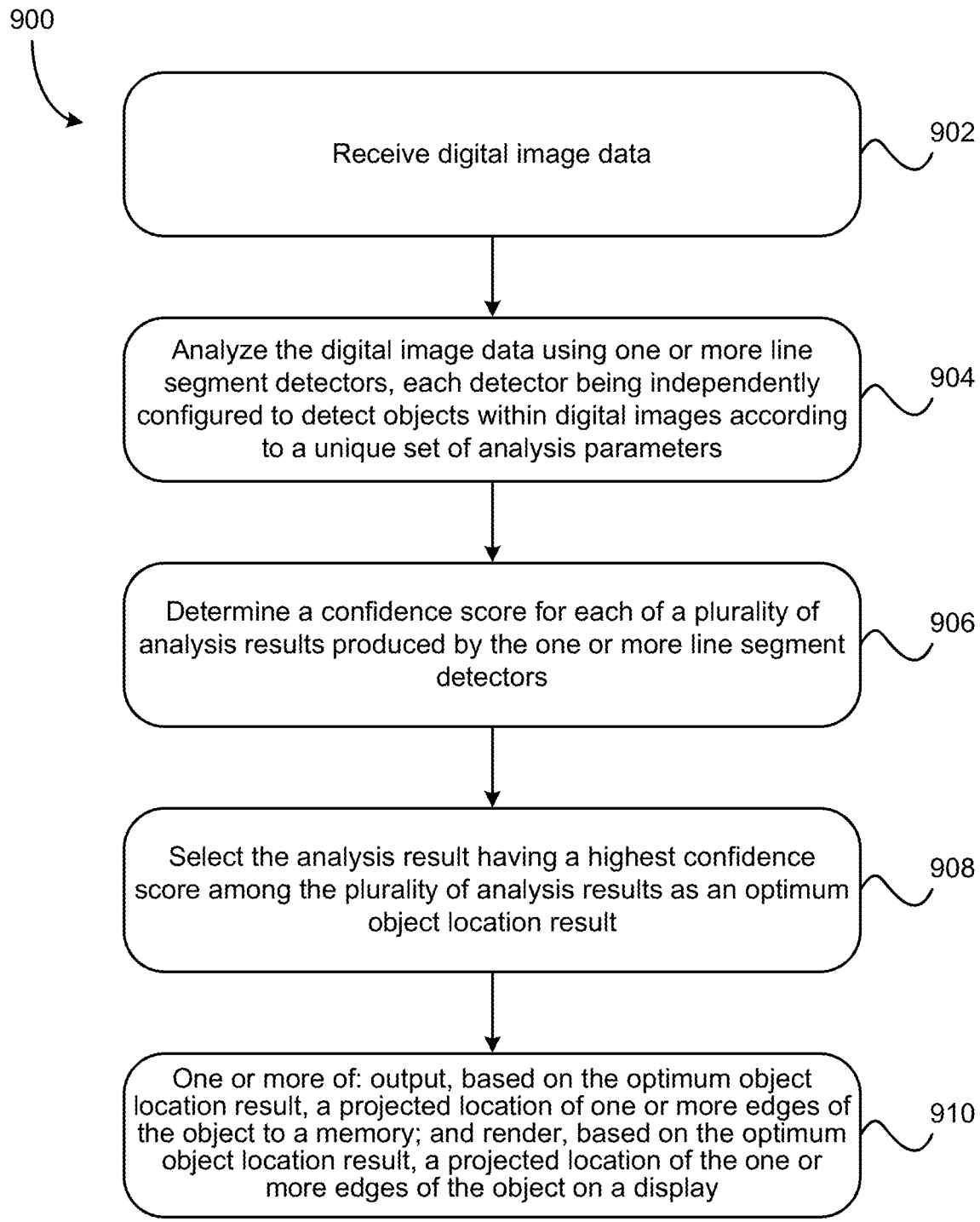
FIG. 9 is a flowchart of a method for detecting objects using a line-segmentation approach, according to one embodiment.

Accordingly, commensurate with the foregoing general descriptions of line-segment based detection, and in accordance with several illustrative embodiments of the presently disclosed inventive concepts, exemplary approaches to line segment-based detection are shown in FIG. 9, and described below with reference to method 900. The method 900 may be performed in any suitable environment, including those shown in FIGS. 1-4B, among others. Of course, more or less operations than those specifically described in FIG. 8 may be included in method 900, as would be understood by one of skill in the art upon reading the present descriptions.

Each of the steps of the method 900 may be performed by any suitable component of the operating environment. For example, in various embodiments, the method 900 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), a graphics processing unit (GPU), an application specific integrated circuit (ASIC), a field programmable gate array (FPGA), etc., combinations thereof, or any other suitable computing device known in the art.

As shown in FIG. 8, method 900 may initiate with operation 902, where digital image data are received. The image data may or may not depict an object sought for detection, but preferably do depict such an object. The image data may be received directly from a capture device, e.g. a flat-bed scanner, multifunction printer, camera of a mobile device, webcam, video camera, or any suitable capture device as known in the art. Indeed, the presently disclosed inventive techniques advantageously are capable of robust processing of digital image data regardless of source and unique challenges associated therewith.

Method 900 further includes operation 904, in which the digital image data are analyzed using one or more line segment detectors. Each detector is independently configured to detect objects within digital image data according to a unique set of analysis parameters. Broadly, the parameters may define the type of features the detector seeks to locate as indicative of presence of an object, such as color transitions, line segments, text lines, etc. However, different detectors may also be configured to seek essentially the same type of features, but using different parameters (e.g. parameters with different values that slacken or tighten the constraints by which a given detector will predict/indicate the presence of an object, or edge thereof, such as different constraints on defining adjacent characters as belonging to a same string of characters, or adjacent pixels as belonging to a same connected component, in various illustrative embodiments). Any difference between two given detectors is sufficient to consider the detectors separate analytical tools/processes. It should be understood that any of the analysis parameters described herein may be employed in the context of methods 900, without departing from the scope of the present disclosure.

In preferred approaches, the analysis parameters employed in the context of method 900 include one or more parameters selected from: an upper target downscaled image size; a lower target downscaled image size; a middle target downscaled image size; a camera-based maximum angle deviation for forming objects from line segments detected in the digital image data; a scanner-based maximum angle deviation of adjacent line segments suitable for forming objects from the digital image data; a minimum length of line segments suitable for forming objects from the digital image data; a maximum distance between line segments suitable for forming objects from the digital image data; a flag indicating whether to compute an optional buffer corridor within which to search for line segments in forming objects from the digital image data; a size of the optional buffer corridor; and an orientation angle of a longitudinal axis of the optional buffer corridor.

Of course, method 900 may include one or more of selecting and parameterizing the one or more detectors based at least in part on a determined source of the digital image data. For instance, parameters known to work best on scanned image data may be selected, or parameters known to work best on camera-captured image data may be selected, depending on the determined source.

In operation 906, a confidence score for each of a plurality of analysis results produced by the one or more line segment detectors is determined. The confidence score may be computed using any technique described herein, and may include computing confidence scores for the analysis result(s) individually, in combination, or even computing confidence scores for only portions of a given analysis result (e.g. scores for each edge, corner, etc. which may be combined to produce an overall higher confidence result, as detailed hereinabove).

With continuing reference to FIG. 8, operation 908 of method 900 involves selecting the analysis result having a highest confidence score among the plurality of analysis results as an optimum object location result. As noted above with regard to operation 906 and computing confidence scores, in some approaches determining the result with the highest confidence score may involve combining individual confidence scores for portions of the digital image data, or even optionally combining multiple analysis results to achieve a higher confidence score for the overall detection result.

Upon selecting the optimum object location result, in operation 910 the result is used to output to memory, and/or render on an appropriate display, a projected location of the one or more edges of the object. This projection may take the form of 2D pixel coordinates of corners and/or edge pixels within the digital image data, a bounding box displayed in a particular color on the display, etc. as would be appreciated by persons having ordinary skill in the art upon reading the present descriptions.

Of course, in various embodiments, method 900 may include additional and/or alternative operations and/or features beyond those described above and shown in FIG. 8, without departing from the scope of the present disclosures.

For instance, in one approach analyzing the digital image data comprises identifying and tracking a plurality of line segments within the digital image data, at least some of the line segments corresponding to the edges of the object.

Optionally, the method 900 may also include generating an edge image from the digital image data, where the digital image data comprise color information, and the edge image comprises a plurality of pixels each having a gradient orientation and a gradient amplitude associated therewith.

Further still, in various embodiments, the method 900 may include generating a plurality of binarized images from the edge image, the generating being based on a plurality of binarization thresholds, at least one of the binarization thresholds being adaptively determined from the edge image, and each binarization threshold corresponding to either or both of a predetermined gradient amplitude and a predetermined gradient orientation.

Further still, method 900 may involve a neighbor-based recursive clustering of pixels according to similar gradient characteristics, so as to form line segments. Such approaches preferably include: selecting an initial candidate edge pixel within the digital image data; clustering neighboring pixels having a gradient orientation substantially similar to a gradient orientation of the initial candidate edge pixel; and recursively repeating the clustering with further neighboring pixels until no neighboring pixels are characterized by a gradient orientation substantially similar to the gradient orientation of the initial candidate edge pixel.

Once line segment sets are determined, e.g. using a clustering approach as described above, method 900 may employ principal component analysis (PCA) on each set, and computing an eigenvector corresponding to a maximum eigenvalue of the principal component analysis as a principal axis of an overall line segment represented by the plurality of line segments. In this way, line segments may be evaluated for further clustering and/or inclusion in a candidate edge line segment set. The further clustering may involve clustering overall line segments characterized by a relative distance less than a predetermined minimum distance threshold.

In more approaches, method 900 may include cropping the digital image data to exclude background therefrom, the cropping being based on the projected location of the one or more edges of the object. Cropping, in the context of method 900, may include excising a rectangular portion of the received image data that depicts only the object sought for detection, equivalently removing portions of the received image data outside the projected location of the one or more edges of the object, and/or transforming the portion of the image data within the projected location of the one or more edges of the object so as to fit a predetermined shape, such as a rectangle. Transformations may generally include perspective transform techniques such as described and referenced hereinabove, in various approaches.

In particularly preferred approaches, method 900 may further include, e.g. as part of the analysis, utilizing one or more text line detectors to generate an initial prediction of the projected location of the one or more edges of the object. This text-line based detection is more computationally efficient than analyzing an entire image using a line segment detector, but performs less well in terms of accurately and precisely identifying object edge locations. However, using text-line detection as an initial pass to define/refine the search area within which to apply a line segment detector can significantly reduce computational cost of detection overall, while also increasing the precision and accuracy of edge detection. Accordingly, analyzing the digital image data using the one or more line segment detectors may be performed within one or more regions of the digital image data defined by the initial prediction accomplished using the one or more text line detectors, the one or more regions excluding at least a portion of the digital image data.

In a similar vein, and optionally in combination with text-line detection, in several approaches method 900 may include applying one or more pre-cropping algorithms to the digital image data prior to analyzing the digital image data. Applying the one or more pre-cropping algorithms effectively reduces background noise represented in the digital image data by excluding outer border regions of the digital image data from the analysis. Accordingly, this pre-cropping may also serve to refine the search area, while improving the computational efficiency and quality of edge detection overall.

Of course, method 900 may include any combination of the foregoing features/operations, as well as additional or alternative features described generally with respect to a multi-detector as set forth above and represented in FIGS. 5-6 and 10, particularly concerning real-time detection of objects within video data per method 600.

Text Line-Based Detection

Text-based detection algorithms can be a very powerful tool in overall detection of objects of interest, particularly where a priori knowledge is available regarding the relationship of the text to object edges/boundaries. In such cases, it is possible to significantly narrow the search space within which object edges/boundaries need be located. Accordingly, particularly in embodiments where the object of interest is a document having a known, predefined structure in terms of location of text (e.g. a standard form, such as a driver license or passport, a check, a credit card, a mortgage application, tax form, insurance claim, etc.), it may be advantageous to utilize text-based detection, e.g. as a preliminary pass in an overall detection process, so as to narrow the region within which more complicated, e.g. color-based and/or line segment-based detection, need be performed. Text-based detection may therefore offer both the advantage of more accurate object detection, as well as a more efficient process, since the color-based and/or line segment-based analyses only need be performed within the narrowed search area, not on the image as a whole.

In one embodiment, text-based detection may involve/include any functionality described in related U.S. Pat. No. 9,760,788, entitled "Mobile Document Detection and Orientation Based on Reference Object Characteristics," the contents of which are herein incorporated by reference.

In more embodiments, techniques such as disclosed in U.S. Pat. No. 9,760,788, as well as those described herein, may be implemented using a maximum stable region approach. In brief, upon determining a region (e.g. a potential character) is a "maximum stable region" according to the known meaning thereof in the art, text block/line locations may be estimated (e.g. based on geometric characteristics thereof) and fed into a clustering algorithm to generate edge location candidates. Based on the edge location candidates, line segments corresponding, e.g. to the baseline, midline, etc. of the text blocks and/or individual characters may be computed and utilized to predict edge locations using a clustering approach. For instance, in one embodiment a clustering approach such as described hereinabove regarding line segment-based detection may be employed.

Pre-Cropping

As referred to generally above, in some approaches the presently disclosed inventive object detection processes may be implemented in conjunction with a pre-cropping procedure. Pre-cropping an image prior to input to the multi-detector described above advantageously reduces the amount of background present in the image, bootstrapping the sampling of foreground (object) information and facilitating improved recall and computational efficiency in the overall detection process. In brief, pre-cropping involves analyzing an image to determine a rough location of an object, and relies on an assumption that the object is located centrally within the image.

Accordingly, in one embodiment, a technique for pre-cropping digital image data so as to remove background therefrom is represented according to method 1000. The method 1000 may be performed in any suitable environment, including those shown in FIGS. 1-4B, among others. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where an input image is downscaled to a predetermined resolution. Downscaling advantageously reduces the amount of information present in the image, most of which is unnecessary for the rough prediction performed in the pre-cropping stage of the inventive detection procedure described herein. In one embodiment, the image may be downscaled to a preferred resolution of about 400×300 pixels. More preferably, the downscaling is performed in a manner that preserves the aspect ratio of the input image. In one approach, downscaling may be performed using a publicly-available API in the openCV library.

In operation 1004, method 1000 proceeds with application of a de-blurring algorithm to reduce the impact of photographs, signatures, and other prominent features of the image that may otherwise generate a false positive indication of an edge of an object. Any known de-blurring technique may be utilized without departing from the scope of the presently described inventive concepts. In one embodiment, de-blurring may be implemented using a publicly-available API in the openCV library.

As shown in FIG. 10, method 1000 also includes operation 1006, wherein the de-blurred image is divided into a plurality of preferably square segments. The particular size and number of segments may be modified based on the resolution of the original image, the downscaled image, or any other suitable criterion that would be appreciated by a person having ordinary skill in the art upon reading the present descriptions. In preferred embodiments, the downscaled image is divided into 1200 equal-sized segments, forming a 40×30 grid where each segment is approximately 10×10 pixels in size. Of course, for other downscaled resolution images, the grid may have a different number and/or size of segments and/or different grid dimensions. For downscaled images having a resolution of 400×300 pixels a 10×10 pixel segment size was empirically determined to be the best performing implementation operating under acceptable computational cost constraints.

As noted above, pre-cropping per method 1000 assumes the object sought for detection is present at the center of the image. Accordingly, in operation 1008 color distances between neighboring segments are computed, where the distances are color value distances between central pixels of the neighboring segments. In other words, a color of a central pixel of a first segment is compared against a color value of a central pixel of a second, adjacent segment, and the difference therebetween obtained. In various embodiments, neighboring segments may include only those segments immediately adjacent a given segment in the four cardinal directions, only those segments immediately adjacent a given segment in directions diagonal from the current segment, or both.

In more approaches, the color representative of each segment may be determined based on sampling color information from a plurality of pixels within the respective segment. For instance, in several embodiments a small window or neighborhood of pixels located at or near the center of the segment may be sampled for color information, and this information combined in an appropriate manner to determine the representative color for the segment.

Regarding sampling color information from various pixels to determine a representative color for each segment, in one exemplary approach a central pixel and immediately adjacent pixels in cardinal directions (i.e. up, down, left and right, or north, south, east and west) may be sampled, in which a total of 5 pixels contribute to the representative color. In another approach, a central pixel and immediately adjacent pixels in diagonal directions may be sampled, again generating a representative color based on information from 5 pixels. In more embodiments, the central pixel and all cardinally and diagonally adjacent pixels may be sampled, yielding a representative color for the segment based on color information gleaned from 10 pixels. In still more embodiments, a central pixel, all immediately adjacent pixels, and all pixels surrounding the immediately adjacent pixels may be sampled, yielding a representative color determined based on information from 25 pixels.

The sampled color information may be combined in any suitable manner, such as by computing an average, median, mode, range, etc. of color values across each channel, a weighted average of color values, etc. as would be appreciated by a person having ordinary skill in the art upon reading the instant descriptions. For instance, in one embodiment weights may be applied based on pixel position relative to the center of the segment, with more central pixels being given greater emphasis/weight than surrounding pixels. In another embodiment, weights may be assigned based on the color channel sampled. In still more embodiments, weights may be assigned based on expectations and/or a priori knowledge regarding the type of object sought for detection, and color characteristics thereof. Of course, combinations of weighting assignment schemes may be employed without departing from the scope of the present disclosure.

For instance, intensity values from a particular color channel or channels may be emphasized or deemphasized based on expectations regarding the object sought for detection. In one approach, an object sought for detection is known to include a feature such as a marking, logo, texture, etc. in a central region thereof, the feature being characterized by a particular color profile. If the color profile of the central feature is known to exclude (on include only minimal) contributions from a particular color channel, then that channel may be deemphasized via appropriate weighting so as to reduce the impact of random noise on the representative color calculation. Alternatively, to reduce false positive clustering, the particular color channel known to be absent or minimally present in the central feature of the object sought for detection may be emphasized via a higher weighting, increasing the likelihood that the distance caused by a given segment including the absent/minimally present color channel contribution.

In particularly preferred embodiments, the color distances computed in operation 1008 are based on color values transformed from an RGB space to a CIELUV color space, most preferably CIE94, as defined and described in further detail at https://en.wikipedia.org/wiki/Color_difference as of Nov. 30, 2017, herein incorporated by reference.

In operation 1010, the color distances between a given segment and each neighboring segment are compared against a predetermined threshold, and in operation 1012 segments having a distance less than the predetermined threshold are clustered to form a rough estimate of segments of the image which depict the object (as opposed to the background).

Upon determining the segments believed to belong to the object (foreground), in operation 1014 a connected structure may be computed based the shape of the segments clustered in operation 1012. Briefly, this connected structure may have any shape, but preferably conforms substantially to the expected shape of the object to be detected in the image.

At any rate, the shape of the object is determined and in operation 1016 a polygon corresponding to the expected shape of the object sought for detection is formed so as to bound the outer portions of the shape formed from the connected segments. A third boundary corresponding to edges of the image is also employed to evaluate the clustering and predict suitable cropping boundaries for the image.

In one embodiment, the bounding polygon may be defined based on applying a Canny algorithm to the downscaled, deblurred image to estimate edge pixels within the image data. Thereafter, a Hough transform may be applied to identify lines from the estimated edge pixels, and a polygon generated from the identified lines. The polygon generation may be accomplished using any suitable technique known in the art, but in preferred embodiments generally involves attempting to form a tetragon using each possible combination of four lines selected from the edge image (generated by Hough transform). For each set of lines that does not conform to a predetermined set of geometric parameters (e.g. specifying appropriate angles formed by intersections between adjacent lines in each set of four candidate lines, as described hereinabove), the set is omitted from further consideration (although individual lines within the set may be further considered in combination with different lines to form different sets). After forming all possible tetragons, and filtering in this manner, the remaining list of candidate tetragons are evaluated for confidence by calculating a score as the product of a value of the tetragon square and a sum of individual line confidences returned by the Hough algorithm. The tetragon with the highest score is selected as the representative tetragon of the object in the image.

In preferred approaches, the value of the tetragon square is an approximation of fitness to a square. Each corner (or computed intersection between adjacent sides) of the projected tetragon is assigned a value $p_1 \ldots p_4$. The square of the distance between corners $p_1$ and $p_2$ (designated $p_{12}$), between corners $p_2$ and $p_3$ (designated $p_{23}$), between corners $p_3$ and $p_4$ (designated $p_{34}$), and between corners $p_4$ and $p_1$ (designated $p_{41}$), are each computed, giving an approximation of the length of each side of the tetragon. The square distance of opposite sides are summed, i.e. a sum of $p_{12}$ and $p_{34}$ is computed (designated as $as_1$), and a sum of $p_{23}$ and $p_{41}$ is computed (designated as $as_2$). Finally, the value of the tetragon is given by the product of $as_1$ and $as_2$ (designated $s_{12}$). The tetragon with the highest value $s_{12}$ is chosen as the representative tetragon of the object in the image, in accordance with preferred embodiments.

In operation 1018, the connected structure is compared against the bounding polygon, and if the fraction of segments included within both the connected structure and the polygon is greater than a predetermined threshold, then in operation 1020a the boundary between the object and the image background is set based on the polygon boundaries. For instance, in one approach a dividend of the square length of the bounding polygon (i.e. a sum of square lengths of each side of the polygon) and the square length of the sides of the image as a whole is ideally less than a predetermined threshold of about 0.2, particularly where the polygon is a tetragon. Moreover, ideally the fraction of segments included within both the connected structure and the bounding polygon is greated than a predetermined threshold of about 0.6, again particularly where the polygon is a tetragon.

Otherwise, in operation 1020b operations 1008-1016 are iteratively repeated with progressively higher color difference threshold values until the threshold is exceeded by the number of segments in the connected structure. In one embodiment, increasing color difference thresholds may have values of about 1.6, 2.1, 3.1, 3.6, 4.1, 5.1, 6.6, 8.6, and 11.1, each to be used in a successively more "greedy" iteration of the segment clustering process. Thresholds may proceed according to a linear step, e.g. of about 0.5, or in a nonlinear fashion, as described in the exemplary embodiment immediately above, in accordance with various embodiments.

Upon achieving a polygon surrounding an object with a fraction of segments exceeding the predetermined threshold, the polygon boundary may be utilized as a crop line to refine the image and remove background pixels outside the polygon boundary in operation 1014. The resulting pre-cropped image may be fed to the multi-detector as input for further improved object detection, according to various embodiments.

While the present descriptions of improved object detection and image cropping have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may include a computer readable storage medium having program code embodied therewith, the program code readable/executable by a processor to cause the processor to perform steps of a method as described herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

Accordingly, one embodiment of the present invention includes all of the features disclosed herein, including those shown and described in conjunction with any of the FIGS. Other embodiments include subsets of the features disclosed herein and/or shown and described in conjunction with any of the FIGS. Such features, or subsets thereof, may be combined in any way using known techniques that would become apparent to one skilled in the art after reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for pre-cropping digital image data to remove background from the digital image data, comprising:
    dividing the digital image into a plurality of segments;
    computing a color value distance between corresponding pixels of one or more pairs of neighboring segments of the digital image;
    comparing the color value distance computed for some or all of the pairs of neighboring segments against a minimum color distance threshold;
    clustering all pairs of neighboring segments having a color value distance less than or equal to the minimum color distance threshold;
    computing a connected structure based on a shape of the clustered segments;
    computing a polygon bounding the connected structure;
    comparing a fraction of segments included in both the connected structure and the polygon, relative to a total number of segments in the digital image, to a minimum included segment threshold; and
    in response to determining the fraction of segments included in both the connected structure and the polygon, relative to the total number of segments in the digital image meets or exceeds a minimum included segment threshold, cropping the digital image based on edges of the polygon.

2. The method as recited in claim 1, comprising, in response to determining the fraction of segments included in both the connected structure and the polygon, relative to the total number of segments in the digital image does not meet or exceed the predetermined minimum included segment threshold, increasing the minimum color distance threshold by a predetermined amount:
    clustering all pairs of neighboring segments having a color value distance less than or equal to the increased minimum color distance threshold;
    computing a new connected structure based on a shape of the clustered segments;

computing a new polygon bounding the connected structure;

comparing a fraction of segments included in both the new connected structure and the new polygon, relative to a total number of segments in the digital image, to the minimum included segment threshold; and in response to determining the fraction of segments included in both the new connected structure and the new polygon, relative to the total number of segments in the digital image meets or exceeds the minimum included segment threshold, cropping the digital image based on edges of the polygon.

3. The method as recited in claim 2, comprising, in response to determining the fraction of segments included in both the new connected structure and the new polygon, relative to the total number of segments in the digital image does not meet or exceed the predetermined minimum included segment threshold, iteratively further increasing the increased minimum color distance threshold, and repeating the clustering, the computing of new connected structure(s), the computing of new polygon(s), and the comparing of fractions of segments in the new connected structure(s) and the new polygon(s) to the minimum included segment threshold until determining the fraction of segments included in both the new connected structure and the new polygon, relative to the total number of segments in the digital image meets or exceeds the minimum included segment threshold; and in response to determining the fraction of segments included in both the new connected structure and the new polygon, relative to the total number of segments in the digital image meets or exceeds the minimum included segment threshold, cropping the digital image based on edges of the polygon.

4. The method as recited in claim 1, wherein each segment is characterized by a rectangular shape, and wherein each segment is characterized by having a same height and a same width.

5. The method as recited in claim 1, wherein the color distance value is computed based on one or more measures selected from:

an intensity value of one or more color channels for each of the corresponding pixels;

a mean intensity value across two or more color channels for each of the corresponding pixels;

a median intensity value of one or more color channels for each of the corresponding pixels; and a range of intensity value across one or more color channels for each of the corresponding pixels.

6. The method as recited in claim 1, wherein the corresponding pixels comprise:

single center pixels from each respective pair of neighboring segments;

a set of pixels immediately surrounding a central point of each respective pair of neighboring segments; or the single center pixels from each respective pair of neighboring segments and a set of pixels immediately surrounding the single center pixels from each respective pair of neighboring segments.

7. The method as recited in claim 6, wherein the corresponding pixels comprise:

the single center pixels from each respective pair of neighboring segments and pixels that are located cardinally adjacent the single center pixels;

the single center pixels from each respective pair of neighboring segments and pixels that are located diagonally adjacent the single center pixels;

the single center pixels from each respective pair of neighboring segments, pixels that are located cardinally adjacent the single center pixels, and pixels that are located diagonally adjacent the single center pixels; or the single center pixels from each respective pair of neighboring segments, pixels that are located cardinally adjacent the single center pixels, pixels that are located diagonally adjacent the single center pixels, and pixels that are located cardinally or diagonally adjacent to the pixels that are located cardinally adjacent the single center pixels and/or the pixels that are located diagonally adjacent the single center pixels.

8. The method as recited in claim 6, comprising applying a weighted adjustment to a contribution of each of the corresponding pixels to the color distance value, wherein the weighted adjustment is based on: a pixel distance between the corresponding pixel and a central point of the segment containing the corresponding pixel, and/or expected color characteristics of the object; and wherein the color distance value is computed based on one or more measures selected from:

an intensity value of one or more color channels for each of the corresponding pixels;

a mean intensity value across two or more color channels for each of the corresponding pixels;

a median intensity value of one or more color channels for each of the corresponding pixels; and a range of intensity value across one or more color channels for each of the corresponding pixels.

9. The method as recited in claim 1, wherein the neighboring segments of the digital image comprise:

segments that are located cardinally adjacent one another;

segments that are located diagonally adjacent one another; or segments that are located cardinally adjacent one another and segments that are located diagonally adjacent one another.

10. The method as recited in claim 1, wherein the color distance value is computed based on color information represented according to a CIELUV color space.

11. The method as recited in claim 1, wherein computing the polygon comprises:

estimating a plurality of edge pixels within the digital image;

identifying a plurality of lines based on the plurality of estimated edge pixels;

forming a set of candidate polygons from the plurality of identified lines;

filtering the set of candidate polygons to remove one or more outlier candidate polygons, wherein the outlier candidate polygons are characterized by including at least one vertex angle having a value outside a predetermined range of expected vertex angle values;

computing a confidence score for each candidate polygon remaining in the set of candidate polygons after removing the outlier candidate polygons; and selecting the candidate polygon having the highest confidence score as the polygon bounding the connected structure.

12. The method as recited in claim 11, wherein the predetermine range of expected vertex angle values includes angle values from about 60 degrees to about 120 degrees.

13. The method as recited in claim 11, wherein the outlier candidate polygons are additionally or alternatively characterized by including at least one pair of opposite vertex angles having a sum value outside a predetermined range of expected summed opposite vertex angle values.

14. The method as recited in claim 13, wherein the predetermined range of expected summed opposite vertex angle values includes summed values from about 150 degrees to about 210 degrees.

15. The method as recited in claim 11, wherein estimating the plurality of edge pixels comprises a Canny edge estimation.

16. The method as recited in claim 11, wherein identifying the plurality of lines based on the plurality of estimated edge pixels comprises a Hough transform.

17. The method as recited in claim 11, wherein the confidence score for each candidate polygon is based on one or more factors selected from:
- a binary score for one or more vertices of the candidate polygon;
- a polygon fitness to shape score; and/or
- a line confidence score for one or more lines of the candidate polygon.

18. The method as recited in claim 17, wherein the binary score for a given vertex has a value of zero if the given vertex angle is characterized by a value outside the predetermined range of expected vertex angle values, or a value of one if the given vertex angle is a value within the predetermined range of expected vertex angle values.

19. The method as recited in claim 17, wherein the polygon fitness to shape score comprises a product of a plurality of summed square distances between each pair of opposite sides of the polygon.

20. The method as recited in claim 1, wherein the minimum included segment threshold has a value of about 0.6.

* * * * *